US012799646B2

(12) United States Patent
Bridewell et al.

(10) Patent No.: US 12,799,646 B2
(45) Date of Patent: Nov. 17, 2026

(54) NONWOVEN WATER DISPERSIBLE ARTICLE FOR UNIT DOSE PACKAGING

(71) Applicant: MONOSOL, LLC, Portage, IN (US)

(72) Inventors: Victoria Bridewell, Portage, IN (US); Richard Goetz, Portage, IN (US); Nicholas Zeese, Portage, IN (US); Jonathon Knight, Portage, IN (US); Yoshimi Nonaka, Okayama (JP); Naoyuki Iwachido, Okayama (JP)

(73) Assignee: MONOSOL, LLC, Portage, IN (US)

( * ) Notice: Subject to any disclaimer, the term of this patent is extended or adjusted under 35 U.S.C. 154(b) by 251 days.

(21) Appl. No.: 17/605,199

(22) PCT Filed: Apr. 24, 2020

(86) PCT No.: PCT/US2020/029890
§ 371 (c)(1),
(2) Date: Oct. 20, 2021

(87) PCT Pub. No.: WO2020/219930
PCT Pub. Date: Oct. 29, 2020

(65) Prior Publication Data

US 2022/0228305 A1 Jul. 21, 2022

Related U.S. Application Data

(60) Provisional application No. 62/908,287, filed on Sep. 30, 2019, provisional application No. 62/838,282, filed on Apr. 24, 2019.

(51) Int. Cl.
*D04H 1/54* (2012.01)
*B32B 5/02* (2006.01)
(Continued)

(52) U.S. Cl.
CPC ........... *D04H 1/4309* (2013.01); *B32B 5/022* (2013.01); *B32B 5/08* (2013.01); *B32B 5/26* (2013.01);
(Continued)

(58) Field of Classification Search
CPC .......... D04H 1/4309; D04H 1/54; D04H 1/58; B32B 5/022; B32B 5/08; B32B 5/26;
(Continued)

(56) References Cited

U.S. PATENT DOCUMENTS

| | | | |
|---|---|---|---|
| 2,895,786 | A | 7/1959 | Schlack |
| 3,925,290 | A | 12/1975 | Kazuto et al. |

(Continued)

FOREIGN PATENT DOCUMENTS

| | | | |
|---|---|---|---|
| CN | 102321933 | A | 1/2012 |
| EP | 1375377 | A1 | 1/2004 |

(Continued)

OTHER PUBLICATIONS

Apr. 24, 2023 Examination Report issued by the European Patent Office for European Patent Application No. 20727748-4.

(Continued)

*Primary Examiner* — Matthew D Matzek
(74) *Attorney, Agent, or Firm* — Benesch Friedlander Coplan & Aronoff LLP

(57) ABSTRACT

The disclosure provides a nonwoven web, said nonwoven web including a plurality of fibers including a blend of fiber forming materials, the blend of fiber forming materials including a first polyvinyl alcohol polymer. The blend of fiber forming materials further comprises a second polyvinyl alcohol polymer or does not include carboxymethyl cellulose, hydroxypropyl methylcellulose or starch. The nonwoven web can be water-dispersible, optionally water-soluble, and/or flushable. The disclosure further provides a pouch
(Continued)

including a nonwoven web including a plurality of fibers according to the disclosure. In some embodiments, the water dispersible pouch can include a laminate comprising a water-soluble film and a nonwoven web of the disclosure.

42 Claims, 3 Drawing Sheets

(51) Int. Cl.

| | |
|---|---|
| ***B32B 5/08*** | (2006.01) |
| ***B32B 5/26*** | (2006.01) |
| ***B32B 27/12*** | (2006.01) |
| ***B32B 27/30*** | (2006.01) |
| ***D04H 1/4309*** | (2012.01) |
| ***D04H 1/58*** | (2012.01) |

(52) U.S. Cl.
CPC ............ *B32B 27/12* (2013.01); *B32B 27/306* (2013.01); *D04H 1/54* (2013.01); *D04H 1/58* (2013.01); *B32B 2250/02* (2013.01); *B32B 2250/03* (2013.01); *B32B 2250/20* (2013.01); *B32B 2250/40* (2013.01); *B32B 2262/0223* (2013.01); *B32B 2262/0261* (2013.01); *B32B 2262/0284* (2013.01); *B32B 2262/04* (2013.01); *B32B 2262/065* (2013.01); *B32B 2262/08* (2013.01); *B32B 2262/14* (2013.01); *B32B 2270/00* (2013.01); *B32B 2307/54* (2013.01); *B32B 2307/704* (2013.01); *B32B 2307/7163* (2013.01); *B32B 2307/7166* (2013.01); *B32B 2307/718* (2013.01); *B32B 2307/738* (2013.01); *B32B 2439/40* (2013.01); *B32B 2439/70* (2013.01); *B32B 2439/80* (2013.01)

(58) Field of Classification Search
CPC .................. B32B 27/12; B32B 27/306; B32B 2250/02; B32B 2250/03; B32B 2250/20; B32B 2250/40; B32B 2262/0223; B32B 2262/0261; B32B 2262/0284; B32B 2262/04; B32B 2262/065; B32B 2262/08; B32B 2262/14; B32B 2270/00; B32B 2307/54; B32B 2307/704; B32B 2307/7163; B32B 2307/7166; B32B 2307/718; B32B 2307/738; B32B 2439/40; B32B 2439/70; B32B 2439/80; B32B 2262/0276; B32B 2262/062; D01D 5/06; D01F 6/50; C11D 17/043; C11D 17/044; C11D 17/042
USPC ....................................................... 428/292.1
See application file for complete search history.

(56) References Cited

U.S. PATENT DOCUMENTS

| | | | | |
|---|---|---|---|---|
| 2003/0040574 A1 | 2/2003 | Schertz | | |
| 2013/0274415 A1* | 10/2013 | Schmitz | .................... | D01F 6/14<br>525/58 |
| 2015/0297494 A1* | 10/2015 | Mao | ......................... | A61Q 5/02<br>510/438 |
| 2016/0009895 A1* | 1/2016 | Yamamoto | ................ | D01F 6/14<br>264/211 |
| 2016/0101204 A1 | 4/2016 | Lynch et al. | | |
| 2017/0259976 A1* | 9/2017 | Lee | ........................ | C08K 3/014 |
| 2018/0223461 A1* | 8/2018 | Nandgaonkar | ...... | D04H 1/4309 |

FOREIGN PATENT DOCUMENTS

| | | | |
|---|---|---|---|
| EP | 1733776 | A2 | 12/2006 |
| EP | 3315641 | A1 | 5/2018 |
| GB | 1102794 | A | 2/1968 |
| JP | S525318 | A1 | 1/1977 |
| JP | H04245916 | A1 | 9/1992 |
| JP | 2001262456 | A | 9/2001 |
| JP | 2002-227030 | A | 8/2002 |
| JP | 2002227030 | A1 | 8/2002 |
| JP | 2002339152 | A | 11/2002 |
| RU | 2012131226 | A | 1/2014 |
| RU | 2658840 | C1 | 6/2018 |
| RU | 2674126 | C2 | 12/2018 |
| WO | 2006103974 | A1 | 10/2006 |
| WO | 2012003316 | A1 | 1/2012 |
| WO | 2015034975 | A1 | 3/2015 |
| WO | 2015088826 | A1 | 6/2015 |
| WO | 2015164159 | A1 | 10/2015 |
| WO | 2016057376 | A1 | 4/2016 |
| WO | 2020123889 | A1 | 6/2020 |

OTHER PUBLICATIONS

Apr. 8, 2023 Second Office Action issued by the China National Intellectual Property Association for Chinese Patent Application No. 202080042697-2. [No English translation available].

Oct. 10, 2022 Examination Report issued by the European Patent Office for European Patent Application No. 20727748-4.

Sep. 21, 2022 Office Action issued by the China National Intellectual Property Association for Chinese Patent Application No. 202080042697-2. [No English translation available].

International Search Report and Written Opinion for corresponding PCT Application Serial No. PCT/US2020/029890 mailed Aug. 10, 2020.

May 24, 2023 Publication of Application in Official Bulletin No. 15 issued by the Russian Federation for Russian Patent Application No. 2021134029. [No English translation available.] or [English abstract included.].

Office Action dated Jul. 30, 2023, for Chinese Application No. 202080042697.2, 18 pages.

Office Action dated Aug. 28, 2023, for Russian Application No. 2021134029, 22 pages.

Official Action issued in Japanese Patent Application No. 2021-563028, mailing date Jun. 28, 2024.

Office Action issued in Mexican Patent Application No. MX/a/2021/012620, mailing date Mar. 25, 2025.

Office Action issued Japanese Patent Application No. 2021-563028, dated Jan. 7, 2025.

Office Action issued Japanese Patent Application No. 2021-563028, dated Sep. 29, 2025.

Examination Report issued in Indian Patent Application No. 202117052470, dated Jan. 6, 2026.

* cited by examiner

NONWOVEN WATER DISPERSIBLE ARTICLE FOR UNIT DOSE PACKAGING

CROSS-REFERENCE TO RELATED APPLICATIONS

This application claims the benefit of PCT Patent Application Serial No. PCT/US2020/029890 entitled NONWOVEN WATER DISPERSIBLE ARTICLE FOR UNIT DOSE PACKAGING. Filed on Oct. 29, 2020, which claims the benefit under 35 U.S.C. § 119(e) of U.S. provisional patent application Ser. Nos. 62/838,282, filed Apr. 24, 2019, and 62/908,287, filed Sep. 30, 2019, the entire disclosures of which are incorporated herein by reference.

FIELD OF THE INVENTION

The present disclosure relates generally to nonwoven water dispersible articles. More particularly, the disclosure relates to nonwoven water dispersible articles comprising water-soluble fibers and unit dose packaging comprising same.

BACKGROUND

Water-soluble polymeric films are commonly used as packaging materials to simplify dispersing, pouring, dissolving and dosing of a material to be delivered. For example, pouches made from water-soluble film are commonly used to package household care compositions such as laundry and dish detergents. A consumer can directly add the pouched composition to a mixing vessel, such as a bucket, sink, or washing machine. Advantageously, this provides for accurate dosing while eliminating the need for the consumer to measure the composition. The pouched composition may also (i) reduce mess that would be associated with dispensing a similar composition from a vessel, such as pouring a liquid laundry detergent from a bottle, (ii) reduce waste that would be associated with dispensing a similar composition from a vessel, such as pouring a liquid laundry detergent from a bottle, and/or (iii) provide a safer dispensing option that would be associated with dispensing a chemical that could be harmful to a person, such as an agricultural chemical or an undiluted pool cleaning chemical. In sum, soluble pre-measured polymeric film pouches provide for convenience of consumer use in a variety of applications.

Some water-soluble polymeric films that are used to make currently marketed pouches may interact with the pouch components (e.g., detergents) or environmental moisture, which affects the properties of the pouch, for example, the solubility of the film may decrease over time when in contact with the contents therein, resulting in undesirable residue remaining after a wash and/or the mechanical properties of the film may deteriorate over time. In another type of problem, water-soluble films prepared from water-soluble polymers may stick to processing equipment and/or other water-soluble films. Such problems may particularly arise when the film is formed into pouches and the pouches are stored together in secondary packaging. In addition, some currently marketed pouches made of water-soluble polymeric films have an unpleasant rubbery or plastic-like feel when handled by the consumer. In another type of problem, when water-soluble pouches are provided to, e.g., bulk water, the water-soluble pouches may release the contents in such a way that a localized concentration of contents is provided, rather than providing a more homogeneous distribution of the contents throughout the bulk solution.

Thus, there exists a need in the art for water-dispersible packaging that is pleasant to handle, quickly releases the pouch contents to provide a more homogeneous distribution, which can remain water-soluble after storing in contact with the pouch contents while having a reduced tendency to stick to other water-soluble packaging.

SUMMARY OF THE DISCLOSURE

One aspect of the disclosure provides a nonwoven web, the web having a plurality of fibers, wherein the plurality of fibers comprise a first fiber comprising a blend of fiber forming materials including a first polyvinyl alcohol fiber forming material and a second polyvinyl alcohol fiber forming material, or the blend of fiber forming materials does not include carboxymethyl cellulose (CMC), hydroxypropyl methyl cellulose (HPMC), or starch. The polyvinyl alcohol fiber forming materials can include polyvinyl alcohol homopolymers and/or polyvinyl alcohol copolymers. In embodiments, the nonwoven webs are water-dispersible. In embodiments, the nonwoven webs are water-soluble. In embodiments, the nonwoven webs are flushable. In embodiments, the first fiber of the nonwoven webs are prepared by a wet cooled gel spinning process.

Another aspect of the disclosure provides a multilayer nonwoven web comprising a first nonwoven web according to the disclosure. In embodiments, the multilayer nonwoven web comprises a second nonwoven web according to the disclosure. In embodiments, the multilayer nonwoven web includes the first nonwoven web and the second nonwoven web in the form of a laminate. In embodiments, the multilayer nonwoven web comprises a film, optionally a water-soluble film, laminated to the first nonwoven web. In embodiments, the multilayer nonwoven webs are water-dispersible. In embodiments, the multilayer nonwoven webs are water-soluble. In embodiments, the multilayer nonwoven webs are flushable.

Another aspect of the disclosure provides a fiber, the fiber including a blend of fiber forming materials, the blend of fiber forming materials including a first polyvinyl alcohol polymer and a second polyvinyl alcohol polymer or the blend of fiber forming materials does not include CMC, HPMC, or starch. The polyvinyl alcohol fiber forming materials can include polyvinyl alcohol homopolymers and/or polyvinyl alcohol copolymer. In embodiments, the fibers are water-dispersible. In embodiments, the fibers are water-soluble. In embodiments, the fibers are flushable.

Another aspect of the disclosure provides a nonwoven web comprising plurality of fibers of the disclosure. In embodiments, the nonwoven webs are water-dispersible. In embodiments, the nonwoven webs are water-soluble. In embodiments, the nonwoven webs are flushable.

Another aspect of the disclosure provides a multilayer nonwoven web including a first layer of nonwoven web including a plurality of fibers of the disclosure. In embodiments, the multilayer nonwoven webs are water-dispersible. In embodiments, the multilayer nonwoven webs are water-soluble. In embodiments, the multilayer nonwoven webs are flushable.

Another aspect of the disclosure provides pouches comprising the nonwoven webs of the disclosure or multilayer nonwoven webs of the disclosure in the form of a pouch. In embodiments, the pouch is water-dispersible. In embodiments, the pouch is water-soluble. In embodiments, the pouch is flushable.

Another aspect of the disclosure provides a sealed article comprising a pouch of the disclosure. In embodiments, the sealed article includes a composition enclosed in the interior pouch volume.

Another aspect of the disclosure provides a method of preparing a sealed article according to the disclosure, the method including forming a nonwoven web of the disclosure into the form of a pouch, filling the pouch with a composition to be enclosed therein, and sealing the pouch to form a sealed article.

Another aspect of the disclosure provides a method of preparing a fiber of the disclosure using a wet cooled gel spinning process, the wet cooled gel spinning process including the steps of a) dissolving the fiber forming material in solution to form a polymer mixture, b) extruding the polymer mixture through a spinning nozzle to a solidification bath to form an extruded polymer mixture, c) passing the extruded polymer mixture through a solvent exchange bath, d) wet drawing the extruded polymer mixture, and e) finishing the extruded polymer mixture to provide the fibers.

Another aspect of the disclosure provides a method of controlling the hand-feel of a pouch or packet comprising preparing a pouch or packet from a water-dispersible nonwoven web, wherein the water-dispersible nonwoven web comprises a plurality of water-soluble fibers comprising a water-soluble fiber forming material.

Further aspects and advantages will be apparent to those of ordinary skill in the art from a review of the following detailed description. While the fibers, nonwoven webs, pouches, sealed articles and their methods of making are susceptible of embodiments in various forms, the description hereafter includes specific embodiments with the understanding that the disclosure is illustrative, and is not intended to limit the invention to the specific embodiments described herein.

DETAILED DESCRIPTION

Figure 1A:
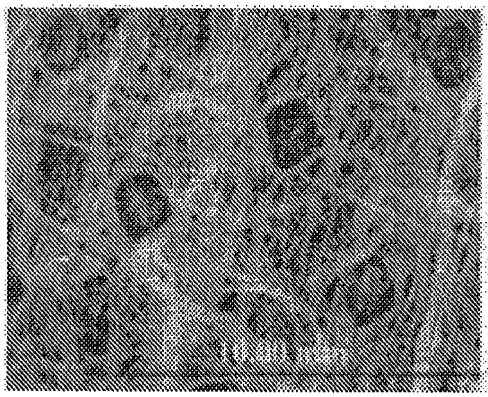
FIG. 1A is a microscopic image of Sample 1 of the Examples.
Figure 1B:
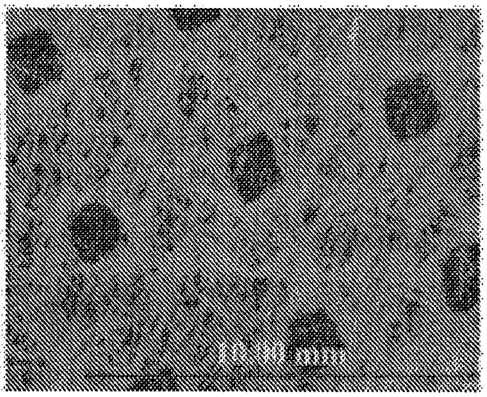
FIG. 1B is a microscopic image of Sample 2 of the Examples.
Figure 1C:
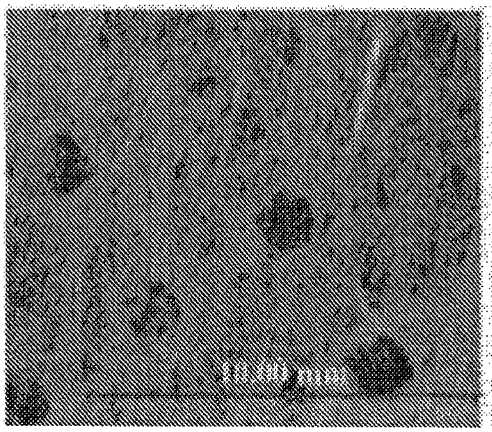
FIG. 1C is a microscopic image of Sample 3 of the Examples.
Figure 1D:
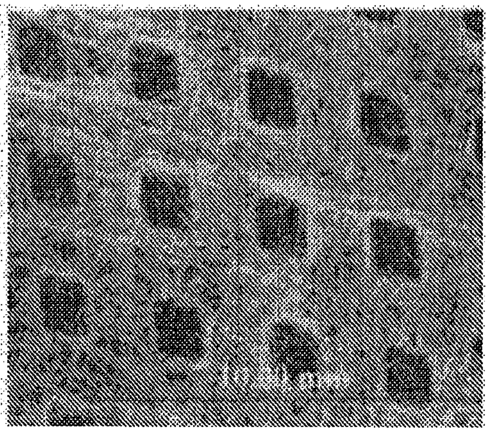
FIG. 1D is a microscopic image of Sample 5 of the Examples.
Figure 1E:
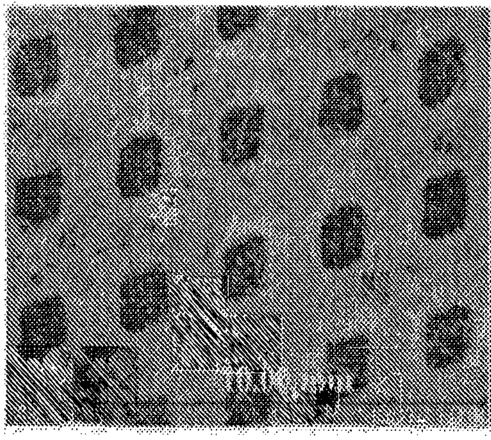
FIG. 1E is a microscopic image of Sample 6 of the Examples.
Figure 1F:
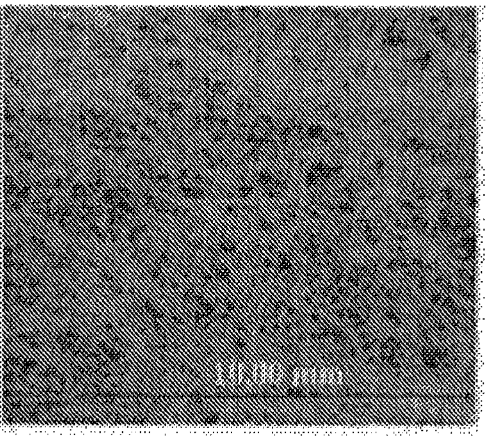
FIG. 1F is a microscopic image of Sample 4 of the Examples.

Provided herein are nonwoven webs comprising a plurality of fibers, wherein the plurality of fibers includes a first fiber prepared form a blend of fiber forming materials. The blend of fiber forming materials can include a) a first polyvinyl alcohol fiber forming material and a second polyvinyl alcohol fiber forming materials or b) a first polyvinyl alcohol fiber forming material and a second fiber forming material that is not carboxymethyl cellulose (CMC), hydroxypropyl methylcellulose (HPMC) or starch. In some embodiments, the plurality of water-soluble fibers include one or more polyvinyl alcohol fiber forming materials and/or polyvinyl pyrrolidone fiber forming materials. Optionally, the nonwoven web can include fibers prepared from a water-insoluble fiber forming material. In general, the nonwoven webs are water-dispersible. Optionally, the nonwoven webs can be water-soluble. Optionally, the nonwoven web can be flushable.

The water-dispersible nonwoven webs and pouches made therefrom can provide one or more advantages over water-soluble films and pouches, for example, improved feel to the user or consumer (e.g., a cloth-like hand-feel rather than a rubbery or plastic-like hand-feel), reduced pouch-to-pouch sticking (e.g., reduced likelihood of pouches sticking together during pouch production or in secondary packaging, providing reduced likelihood of rupture upon separation of pouches), decreased coefficient of friction (e.g., reduced likelihood of sticking to processing equipment and/or improved ability to follow shape of mold), increased heat or water shrinking, increased chemical resistance to harsh chemicals packaged within the nonwoven webs, improved or maintained mechanical properties after storage in higher moisture and higher temperature environments, and/or improved solubility and dissolution.

As used herein and unless specified otherwise, the term "water-soluble" refers to any nonwoven web or film having a dissolution time of 300 seconds or less at a specified temperature as determined according to MSTM-205 as set forth herein, or any fiber having complete dissolution time of less than 30 seconds at a specified temperature according to the method for determining single fiber solubility disclosed herein. For example, the solubility parameters can be characteristic of a nonwoven web or laminate structure having a thickness of 6 mil (about 152 μm), or a pouch made therefrom. As used herein, a fiber is "insoluble," "water-insoluble," or "insoluble in water" when the fiber has a complete dissolution time of greater than 30 seconds at a specified temperature according to the method for determining single fiber solubility disclosed herein. For example, the dissolution time of the nonwoven web or film optionally can be 200 seconds or less, 100 seconds or less, 60 seconds or less, or 30 seconds or less at a temperature of about 100° C., about 90° C., about 80° C., about 70° C., about 60° C., about 50° C., about 40° C., about 20° C., or about 10° C. In embodiments wherein the dissolution temperature is not specified, the water-soluble nonwoven web or film has a dissolution time of 300 seconds or less at a temperature no greater than about 100° C. A fiber can have a complete dissolution time of 30 seconds or less at a temperature of about 100° C., about 90° C., about 80° C., about 70° C., about 60° C., about 50° C., about 40° C., about 20° C., or about 10° C. In embodiments wherein the complete dissolution temperature is not specified, a water-soluble fiber has a complete dissolution time of 30 seconds or less at a temperature no greater than about 100° C. and a water-insoluble fiber has a complete dissolution time of greater than 30 seconds at a temperature no greater than about 100° C. As used herein and unless specified otherwise, the term "cold water-soluble" refers to any nonwoven web or film having a dissolution time of 300 seconds or less at 10° C. as determined according to MSTM-205. For example, the dissolution time optionally can be 200 seconds or less, 100 seconds or less, 60 seconds or less, or 30 seconds at 10° C. As used herein and unless specified otherwise, the term "cold water-soluble" in connection with a fiber refers to a fiber having a complete dissolution time of 30 seconds or less at a temperature of 10° C. or less, according to the Method for Determining Single Fiber Solubility disclosed herein. In embodiments, "water-soluble film" means that at a thickness of 1.5 mil, the film dissolves in 300 seconds or less at a temperature no greater than 100° C. For example, a 1.5 mil (about 38 μm) thick water-soluble film can have a dissolution time of 300 seconds or less, 200 seconds or less, 100 seconds or less, 60 seconds or less, or 30 seconds or less at a temperature of about 70° C., about 60° C., about 50° C., about 40° C., about 30° C., about 20° C., or about 10° C. according to MSTM-205.

As used herein and unless specified otherwise, the term "water-dispersible" refers to a nonwoven web, laminate structure, or pouch wherein upon submersion in water at a specified temperature the nonwoven web, laminate structure, or pouch physically disassociates into smaller constituent pieces. The smaller pieces may or may not be visible to the naked eye, may or may not remain suspended in the water, and may or may not ultimately dissolve. In embodiments wherein a dispersion temperature is not specified, the nonwoven web or pouch will disintegrate in 300 seconds or less at a temperature of about 100° C. or less, according to MSTM-205. For example, the disintegration time optionally can be 200 seconds or less, 100 seconds or less, 60 seconds or less, or 30 seconds or less at a temperature of about 80° C., about 70° C., about 60° C., about 50° C., about 40° C., about 20° C., or about 10° C., according to MSTM-205. For example, such dispersion parameters can be characteristic of a nonwoven web or laminate structure having a thickness of 6 mil (about 152 μm), or a pouch made therefrom.

As used herein, the term "flushable" refers to an article such as a nonwoven web, laminate structure, or pouch that is dispersible in aqueous environments, for example, a liquid sewage system, such that the disposal of the web(s), laminate(s), or pouch(es) does not result in the catching of such articles within the pipes of a plumbing system or building up over time to cause a blockage of such a pipe. The INDA/EDANA standard for flushability requires that greater than 95% of the starting material must pass through a 12.5 mm sieve after 60 minutes of slosh box testing using 28 RPM and 18° tilt angle. The Flushability Test set forth herein provides a more stringent flushability test. A commercially available nonwoven web in the form of a flushable wipe, herein referred to as Commercial Wipe A, is certified as flushable. Thus, as used herein and unless specified otherwise, the term "flushable" refers to an article such as a nonwoven web, laminate, or pouch that has a percent disintegration that meets or exceeds the percent degradation of Commercial Wipe A as measured by the Flushability Test as set forth herein. Flushable nonwoven webs, laminate structures, and pouches have the advantage of being more processable in recycling processes or can simply be flushed in, for example, septic and municipal sewage treatment systems such that, after use, the web, structure, or pouch does not need to be landfilled, incinerated, or otherwise disposed of.

As used herein and unless specified otherwise, the term "nonwoven web" refers to a web or sheet comprising, consisting of, or consisting essentially of fibers arranged (e.g., by a carding process) and bonded to each other. Thus, the term nonwoven web can be considered short hand for nonwoven fiber-based webs. Further, as used herein, "nonwoven web" includes any structure including a nonwoven web or sheet, including, for example, a nonwoven web or sheet having a film laminated to a surface thereof. Methods of preparing nonwoven webs from fibers are well known in the art, for example, as described in Nonwoven Fabrics Handbook, prepared by Ian Butler, edited by Subhash Batra et al., Printing by Design, 1999, herein incorporated by reference in its entirety. As used herein and unless specified otherwise, the term "film" refers to a continuous film or sheet, e.g., prepared by a casting or extrusion process.

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. For example, a thermoformed packet can "consist essentially of" a nonwoven web described herein for use of its thermoforming characteristics, while including a non-thermoformed film or nonwoven web (e.g., lid portion), and optional markings on the film, e.g. by inkjet printing. The disclosure illustratively disclosed herein suitably may be practiced in the absence of any element or step which is not specifically disclosed herein.

All percentages, parts and ratios referred to herein are based upon the total dry weight of the nonwoven web or film composition or total weight of the packet content composition of the present disclosure, as the case may be, and all measurements made are at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g. as a parameter of the subject matter described or part of a range associated with the subject matter described, an alternative which forms part of the description is a functionally equivalent range surrounding the specific numerical value (e.g. for a dimension disclosed as "40 mm" an alternative embodiment contemplated is "about 40 mm").

As used herein, the terms packet(s) and pouch(es) should be considered interchangeable. In certain embodiments, the terms packet(s) and pouch(es), respectively, are used to refer to a container made using the nonwoven web and/or film, and to a fully-sealed container preferably having a material sealed therein, e.g., in the form a measured dose delivery system. The sealed pouches can be made from any suitable method, including such processes and features such as heat sealing, solvent welding, and adhesive sealing (e.g., with use of a water-soluble adhesive).

As used herein and unless specified otherwise, the terms "wt. %" and "wt %" are intended to refer to the composition of the identified element in "dry" (non-water) parts by weight of the entire article or composition referred to, for example a nonwoven web or film, including residual moisture in the nonwoven web or film (when applicable), or laminate structure, or parts by weight of a composition enclosed within a pouch (when applicable).

As used herein and unless specified otherwise, the term "PHR" ("phr") is intended to refer to the composition of the identified element in parts per one hundred parts water-soluble polymer (whether PVOH or other polymers, unless specified otherwise) in the polymer-containing article referred to, e.g. a water-soluble film, a fiber, or a nonwoven web, or a solution used to make the fiber or film.

The nonwoven webs, pouches, and related methods of making and use are contemplated to include embodiments including any combination of one or more of the additional optional elements, features, and steps further described below (including those shown in the Examples and figures), unless stated otherwise.

Water-Soluble Film and Fiber Forming Materials

In general, the nonwoven web of the disclosure can include a plurality of fibers. In embodiments, the nonwoven web can be a water-dispersible or water-soluble nonwoven web and can include a plurality of water-soluble fibers including a single fiber forming material or a blend of fiber forming materials. In embodiments, the nonwoven web can be a water-dispersible or water-soluble nonwoven web and can include a plurality of water-soluble fibers including, for example, a single water-soluble fiber forming material or a blend of water-soluble fiber forming materials. In embodiments, the nonwoven web can be a water-dispersible nonwoven web and can include a plurality of water-dispersible fibers including water-soluble and/or water-insoluble fiber forming materials. As used herein, a water-dispersible nonwoven web including fibers having a single fiber forming material means that all fibers are prepared from the same fiber forming material (e.g., polymer(s)).

The materials that form the water-soluble fibers and water-soluble films can be water-soluble polymers. Water-soluble polymers for use in the water-soluble fibers, water-dispersible nonwoven webs, and water-soluble films can include, but are not limited to a polyvinyl alcohol, polyacrylate, water-soluble acrylate copolymer, polyvinyl pyrrolidone, polyethyleneimine, pullulan, water-soluble natural polymer including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water-soluble polymers, whether PVOH or otherwise are commercially available from a variety of sources.

In general, the fibers of the disclosure and film of the disclosure can include polyvinyl alcohol. Polyvinyl alcohol is a synthetic polymer generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as PVOH.

The fibers and/or films described herein can include one or more polyvinyl alcohol (PVOH) homopolymers, one or more polyvinyl alcohol copolymers, or a combination thereof. As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer") further includes copolymers consisting of a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units. In some embodiments, the fibers and/or films of the disclosure include polyvinyl alcohol homopolymers. In some embodiments, the fibers and/or films of the disclosure include hot water-soluble polyvinyl alcohol homopolymers.

In some embodiments, the polyvinyl alcohol includes a modified polyvinyl alcohol, for example, a copolymer. The modified polyvinyl alcohol can include a co-polymer or higher polymer (e.g., ter-polymer) including one or more monomers in addition to the vinyl acetate/vinyl alcohol groups. Optionally, the modification is neutral, e.g., provided by an ethylene, propylene, N-vinylpyrrolidone or other non-charged monomer species. Optionally, the modification is a cationic modification, e.g., provided by a positively charged monomer species. Optionally, the modification is an anionic modification. Thus, in some embodiments, the polyvinyl alcohol includes an anionic modified polyvinyl alcohol. An anionic modified polyvinyl alcohol can include a partially or fully hydrolyzed PVOH copolymer that includes an anionic monomer unit, a vinyl alcohol monomer unit, and optionally a vinyl acetate monomer unit (i.e., when not completely hydrolyzed). In some embodiments, the PVOH copolymer can include two or more types of anionic monomer units. General classes of anionic monomer units which can be used for the PVOH copolymer include the vinyl polymerization units corresponding to sulfonic acid vinyl monomers and their esters, monocarboxylic acid vinyl monomers, their esters and anhydrides, dicarboxylic monomers having a polymerizable double bond, their esters and anhydrides, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, maleic anhydride, fumaric acid, monoalkyl fumarate, dialkyl fumarate, itaconic acid, monoalkyl itaconate, dialkyl itaconate, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, glutaconic anhydride, alkyl acrylates, alkyl alkacrylates, vinyl sulfonic acid, allyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations of the foregoing (e.g., multiple types of anionic monomers or equivalent forms of the same anionic monomer). In some embodiments, the PVOH copolymer can include two or more types of monomer units selected from neutral, anionic, and cationic monomer units.

The level of incorporation of the one or more monomer units/level of modification in the PVOH copolymers is not particularly limited. In embodiments, the one or more monomer units/modifications are present in the PVOH copolymer in an amount in a range of about 1 mol. % or 2 mol. % to about 6 mol. % or 10 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments). In embodiments, the modification is an anionic modification and the anionic monomer units are present in the PVOH copolymer in an amount in a range of about 1 mol. % or 2 mol. % to about 6 mol. % or 10 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments).

Polyvinyl alcohols can be subject to changes in solubility characteristics. The acetate group in the co-poly(vinyl acetate vinyl alcohol) polymer (PVOH homopolymer) is known by those skilled in the art to be hydrolysable by either acid or alkaline hydrolysis. As the degree of hydrolysis increases, a polymer composition made from the PVOH homopolymer will have increased mechanical strength but reduced solubility at lower temperatures (e.g., requiring hot water temperatures for dissolution). Accordingly, exposure of a PVOH homopolymer to an alkaline environment (e.g., resulting from a laundry bleaching additive) can transform the polymer from one which dissolves rapidly and entirely in a given aqueous environment (e.g., a cold water medium) to one which dissolves slowly and/or incompletely in the aqueous environment, potentially resulting in undissolved polymeric residue at the end of a wash cycle.

PVOH copolymers with pendant carboxyl groups, such as, for example, vinyl alcohol/hydrolyzed methyl acrylate sodium salt polymers, can form lactone rings between neighboring pendant carboxyl and alcohol groups, thus reducing the water solubility of the PVOH copolymer. In the presence of a strong base, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymers, it is believed that such a PVOH copolymer can become more soluble due to chemical interactions between the polymer and an alkaline composition inside the pouch during storage. Consequently, as they age, the packets may become increasingly prone to premature dissolution during a hot wash cycle (nominally 40° C.), and may in turn decrease the efficacy of certain laundry actives due to the presence of the bleaching agent and the resulting decrease in pH.

Specific sulfonic acids and derivatives thereof having polymerizable vinyl bonds can be copolymerized with vinyl acetate to provide cold-water-soluble PVOH polymers which are stable in the presence of strong bases. The base-catalyzed alcoholysis products of these copolymers, which are used in the formulation of water-soluble film, are vinyl alcohol-sulfonate salt copolymers which are rapidly soluble. The sulfonate group in the PVOH copolymer can revert to a sulfonic acid group in the presence of hydrogen ions, but the sulfonic acid group still provides excellent cold-water solubility of the polymer. In embodiments, vinyl alcohol-sulfonate salt copolymers contain no residual acetate groups (i.e., are fully hydrolyzed) and therefore are not further hydrolysable by either acid or alkaline hydrolysis. Generally, as the amount of modification increases, the water solubility increases, thus sufficient modification via sulfonate or sulfonic acid groups inhibit hydrogen bonding and crystallinity, enabling solubility in cold water. In the presence of acidic or basic species, the copolymer is generally unaffected, with the exception of the sulfonate or sulfonic acid groups, which maintain excellent cold water solubility even in the presence of acidic or basic species. Examples of suitable sulfonic acid comonomers (and/or their alkali metal salt derivatives) include vinyl sulfonic acid, allyl sulfonic acid, ethylene sulfonic acid, 2-acrylamido-1-methylpropanesulfonic acid, 2-acrylamido-2-methylpropanesufonic acid, 2-methacrylamido-2-methylpropanesulfonic acid and 2-sulfoethyl acrylate, with the sodium salt of 2-acrylamido-2-methylpropanesulfonic acid (AMPS) being a preferred comonomer.

The water-soluble polymers, whether polyvinyl alcohol polymers or otherwise, can be blended. When the polymer blend includes a blend of polyvinyl alcohol polymers, the PVOH polymer blend can include a first PVOH polymer ("first PVOH polymer") which can include a PVOH homopolymer or a PVOH copolymer including one or more types of anionic monomer units (e.g., a PVOH ter- (or higher co-) polymer) and a second PVOH polymer ("second PVOH polymer") which can include a PVOH homopolymer or a PVOH copolymer including one or more types of anionic monomer units (e.g., a PVOH ter- (or higher co-) polymer). In some aspects, the PVOH polymer blend includes only the first PVOH polymer and the second PVOH polymer (e.g., a binary blend of the two polymers). Alternatively or additionally, the PVOH polymer blend or a fiber or film made therefrom can be characterized as being free or substantially free from other polymers (e.g., other water-soluble polymers generally, other PVOH-based polymers specifically, or both). As used herein, "substantially free" means that the first and second PVOH polymers make up at least 95 wt. %, at least 97 wt. %, or at least 99 wt. % of the total amount of water-soluble polymers in the water-soluble fiber or film. In other aspects, the water-soluble fiber or film can include one or more additional water-soluble polymers. For example, the PVOH polymer blend can include a third PVOH polymer, a fourth PVOH polymer, a fifth PVOH polymer, etc. (e.g., one or more additional PVOH homopolymers or PVOH copolymers, with or without anionic monomer units). For example, the water-soluble film can include at least a third (or fourth, fifth, etc.) water-soluble polymer which is other than a PVOH polymer (e.g., other than PVOH homopolymers or PVOH copolymers, with or without anionic monomer units).

The degree of hydrolysis (DH) of the PVOH homopolymers and PVOH copolymers included in the water-soluble fibers and films of the present disclosure can be in a range of about 75% to about 99.9% (e.g., about 79% to about 92%, about 80% to about 90%, about 88% to 92%, about 86.5% to about 89%, or about 88%, 90% or 92% such as for cold-water-soluble compositions; about 90% to about 99%, about 92% to about 99%, about 95% to about 99%, about 98% to about 99%, about 98% to about 99.9%, about 96%, about 98%, about 99%, or greater than 99%). As the degree of hydrolysis is reduced, a fiber or film made from the polymer will have reduced mechanical strength but faster solubility at temperatures below about 20° C. As the degree of hydrolysis increases, a fiber or film made from the polymer will tend to be mechanically stronger and the thermoformability will tend to decrease. The degree of hydrolysis of the PVOH can be chosen such that the water-solubility of the polymer is temperature dependent, and thus the solubility of a film made from the polymer and additional ingredients is also influenced. In one option the film is cold water-soluble. For a co-poly(vinyl acetate vinyl alcohol) polymer that does not include any other monomers (e.g., a homopolymer not copolymerized with an anionic monomer) a cold water-soluble fiber or film, soluble in water at a temperature of less than 10° C., can include PVOH with a degree of hydrolysis in a range of about 75% to about 90%, or in a range of about 80% to about 90%, or in a range of about 85% to about 90%. In another option the fiber or film is hot water-soluble. For a co-poly(vinyl acetate vinyl alcohol) polymer that does not include any other monomers (e.g., a homopolymer not copolymerized with an anionic monomer) a hot water-soluble fiber or film, soluble in water at a temperature of at least about 60° C., can include PVOH with a degree of hydrolysis of at least about 98%.

The degree of hydrolysis of the polymer blend can also be characterized by the arithmetic weighted, average degree of hydrolysis ($\overline{H^\circ}$). For example, $\overline{H^\circ}$ fora PVOH polymer that includes two or more PVOH polymers is calculated by the formula $\overline{H^\circ}\ \Sigma(Wi \cdot H_i)$ where $W_i$ is the weight percentage of the respective PVOH polymer and $H_i$ is the respective degrees of hydrolysis. When a polymer is referred to as having a specific degree of hydrolysis, the polymer can be a single polyvinyl alcohol polymer having the specified degree of hydrolysis or a blend of polyvinyl alcohol polymers having an average degree of hydrolysis as specified.

The viscosity of a PVOH polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a polymer is described as having (or not having) a particular viscosity, unless specified otherwise, it is intended that the specified viscosity is the average viscosity for the polymer, which inherently has a corresponding molecular weight distribution, i.e. the weighted natural log average viscosity as described below. It is well known in the art that the viscosity of PVOH polymers is correlated with the weight average molecular weight ($\overline{M}w$) of the PVOH polymer, and often the viscosity is used as a proxy for the $\overline{M}w$.

In embodiments, the PVOH resin can have a viscosity of about 1.0 to about 50.0 cP, about 1.0 to about 40.0 cP, or about 1.0 to about 30.0 cP, for example about 4 cP, 8 cP, 15 cP, 18 cP, 23 cP, or 26 cP. In embodiments, the PVOH homopolymers and/or copolymers can have a viscosity of about 1.0 to about 40.0 cP, or about 5 cP to about 23 cP, for example, about 1 cP, 1.5 cP, 2 cP, 2.5 cP, 3 cP, 3.5 cP, 4 cP, 4.5 cP, 5 cP, 5.5 cP, 6 cP, 6.5 cP, 7 cP, 7.5 cP, 8 cP, 8.5 cP, 9 cP, 9.5 cP, 10 cP, 11 cP, 12 cP, 13 cP, 14 cP, 15 cP, 17.5 cP, 18 cP, 19 cP, 20 cP, 21 cP, 22 cP, 23 cP, 24 cP, 25 cP, 26 cP, 27 cP, 28 cP, 29 cP, 30 cP, 31 cP, 32 cP, 33 cP, 34 cP, 35 cP, or 40 cP. In embodiments, the PVOH homopolymers and/or copolymers can have a viscosity of about 21 cP to 26 cP. In embodiments, the PVOH homopolymers and/or copolymers can have a viscosity of about 5 cP to about 14 cP. In embodiments, the PVOH homopolymers and/or copolymers can have a viscosity of about 5 cP to about 23 cP.

For reference, in a polymer blend, the first PVOH polymer is denoted as having a first 4% solution viscosity at 20° C. ($\mu_1$), and the second PVOH polymer is denoted as having a second 4% solution viscosity at 20° C. ($\mu_2$). In various embodiments, the first viscosity $\mu_1$ can be in a range of about 4 cP to about 70 cP (e.g., at least about 4, 8, 10, 12, or 16 cP and/or up to about 12, 16, 20, 24, 28, 30, 32, 35, 37, 40, 45, 48, 50, 56, 60, or 70 cP, such as about 4 cP to about 70 cP, about 4 cP to about 60 cP, about 4 cP to about 46 cP, about 4 cP to about 24 cP, about 10 cP to about 16 cP, or about 10 cP to about 20 cP, or about 20 cP to about 30 cP). Alternatively or additionally, the second viscosity $\mu_2$ can be in a range of about 4 cP to about 70 cP (e.g., at least about 4, 8, 10, 12, or 16 cP and/or up to about 12, 16, 20, 24, 28, 30, 32, 35, 37, 40, 45, 48, 50, 56, 60, or 70 cP, such as about 12 cP to about 30 cP, about 10 cP to about 16 cP, or about 10 cP to about 20 cP, or about 20 cP to about 30 cP). When the PVOH polymer blend includes three or more PVOH polymers selected from PVOH polymer and PVOH copolymers, the foregoing viscosity values can apply to each PVOH polymer or PVOH copolymer individually. Thus, the weight-average molecular weight of the water-soluble polymers, including the first PVOH copolymer and the second PVOH copolymer, can be in a range of about 30,000 to about 175,000, or about 30,000 to about 100,000, or about 55,000 to about 80,000, for example. When referring to average viscosity of the PVOH polymer blend, the weighted natural log average viscosity ($\overline{\mu}$) is used. The $\overline{\mu}$ for a PVOH polymer that includes two or more PVOH polymers is calculated by the formula $\overline{\mu}=e^{\mu W_i \cdot ln\ \mu_i}$ the viscosity for the respective PVOH polymers.

Water-Soluble Fibers

The fibers of the nonwoven webs of the disclosure can include water-soluble fibers. The water-soluble fibers can include any of the water-soluble fiber forming materials disclosed herein. The water-soluble fibers can include a single water-soluble polymer or a blend of water-soluble polymers. Suitable water-soluble fibers include, but are not limited to, polyvinyl alcohol homopolymer, polyvinyl alcohol copolymer, polyacrylate, water-soluble acrylate copolymer, polyvinyl pyrrolidone, polyethyleneimine, pullulan, water-soluble natural polymer including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble fibers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. In embodiments, the water-soluble fiber can include polyvinyl alcohol fiber forming materials. In a refinement of the foregoing embodiment, the water-soluble fiber can include a PVOH homopolymer fiber forming material. In another refinement of the foregoing embodiment, the water-soluble fiber can include a PVOH copolymer fiber forming material. In embodiments, the water-soluble fiber can include a blend of polyvinyl alcohol polymer fiber forming materials. In a refinement of the foregoing embodiment, the water-soluble fiber can include one or more PVOH homopolymers. In another refinement of the foregoing embodiment, the water-soluble fiber can include one or more PVOH copolymers. In yet another refinement of the foregoing embodiment, the water-soluble polymer can include one or more PVOH homopolymers and one or more PVOH copolymers. In embodiments, the water-soluble fiber can include a blend of polyvinyl alcohol fiber forming materials and a non-polyvinyl alcohol based water-soluble fiber forming material.

In embodiments wherein the water-soluble fiber includes a blend of a polyvinyl alcohol homopolymer and a polyvinyl alcohol copolymer, the relative amounts of homopolymer and copolymer are not particularly limited. The polyvinyl alcohol homopolymer can make up about 15 wt. % to about 70 wt. % of total weight of the water-soluble polymer blend, for example, at least about 15 wt. %, at least about 20 wt. %, at least about 25 wt. %, at least about 30 wt. %, at least about 40 wt. %, at least about 50 wt. %, or at least about 60 wt. % and up to about 70 wt. %, up to about 60 wt. %, up to about 50 wt. %, up to about 40 wt. %, or up to about 30 wt. %, based on the total weight of the water-soluble polymer blend, and can be a single homopolymer or a blend of one or more homopolymers (e.g., having a difference in viscosity and/or degree of hydrolysis). The remainder of the water-soluble polymer blend can be the water-soluble polyvinyl alcohol copolymer. Without intending to be bound by theory, it is believed that as the amount of homopolymer decreases below about 15 wt. %, the ability of the blend of polyvinyl alcohol homopolymer and copolymer to form a fiber decreases. The water-soluble polyvinyl alcohol copolymer can make up about 30 wt. % to about 85 wt. % of the total weight of the water-soluble polymer blend, for example, at least about 30 wt. %, at least about 40 wt. %, at least about 50 wt. %, at least about 60 wt. %, at least about 70 wt. %, at least about 75 wt. %, or at least about 80 wt. %, and up to about 85 wt. %, up to about 80 wt. %, up to about 70 wt. %, up to about 60 wt. %, up to about 50 wt. %, or up to about 40 wt. %, based on the total weight of the water-soluble polymer blend, and can be a single copolymer or a blend of one or more copolymers. The blend can consist of a polyvinyl alcohol homopolymer and a polyvinyl alcohol copolymer. The blend can consist of a polyvinyl alcohol homopolymer and a plurality of polyvinyl alcohol copolymers. The blend can consist of more than one polyvinyl alcohol homopolymer and more than one polyvinyl alcohol copolymer.

In embodiments, the nonwoven web can include a plurality of fibers, wherein the plurality of fibers comprise a first fiber including a blend of fiber forming materials, the blend of fiber forming materials including a first polyvinyl alcohol fiber forming material and (a) a second polyvinyl alcohol fiber forming material or (b) the blend of fiber forming materials does not include carboxymethyl cellulose, hydroxypropyl methylcellulose, or starch. In embodiments, the nonwoven web can be a water-dispersible nonwoven web including a plurality of fibers, wherein the plurality of fibers comprises a first water-dispersible fiber including a blend of fiber forming materials, the blend of fiber forming materials including a first water-soluble polyvinyl alcohol fiber forming material and (a) a second polyvinyl alcohol fiber forming material or (b) the blend of fiber forming materials does not include carboxymethyl cellulose, hydroxypropyl methylcellulose, or starch. In embodiments, the nonwoven web can include a plurality of fibers including a first fiber comprising a blend of fiber forming materials including a first polyvinyl alcohol and (a) a second polyvinyl alcohol fiber forming material or (b) the blend of fiber forming materials does not include carboxymethyl cellulose, hydroxypropyl methylcellulose, or starch, and a second fiber, wherein the first and second fibers can have a difference in length to diameter (L/D) ratio, tenacity, shape, rigidness, elasticity, solubility in water, melting point, glass transition temperature ($T_9$), water-soluble polymer, color, or a combination thereof. In embodiments, the nonwoven web can be a water-dispersible nonwoven web and can include a plurality of fibers including a first water-soluble fiber comprising a blend of fiber forming materials including a first polyvinyl alcohol and (a) a second polyvinyl alcohol fiber forming material or (b) the blend of fiber forming materials does not include carboxymethyl cellulose, hydroxypropyl methylcellulose, or starch, and a second fiber, wherein the first and second fibers can have a difference in length to diameter (L/D) ratio, tenacity, shape, rigidness, elasticity, solubility in water, melting point, glass transition temperature ($T_g$), water-soluble polymer, color, or a combination thereof.

Water-Insoluble Fibers

The nonwoven webs of the disclosure can also include water-insoluble fibers. Water-insoluble fibers generally include fibers made of fiber forming materials that, when provided as the sole fibers in a nonwoven web, the nonwoven web does not dissolve in 300 seconds or less at temperatures of 80° C. or less, as determined by MSTM-205. In general, water-insoluble fibers can include a sole water-insoluble polymer fiber forming material or a blend of water-insoluble polymer fiber forming materials. Suitable water-insoluble fiber forming materials include, but are not limited to, cotton, polyester, copolyester, polyethylene (e.g., high density polyethylene and low density polyethylene), polypropylene, wood pulp, fluff pulp, abaca, viscose, insoluble cellulose, insoluble starch, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, polyester, copolyester, polylactide (PLA), polyethylene terephthalate (PET), polypropylene (PP), and combinations thereof. In embodiments, the water-insoluble fiber does not include cotton or rayon. In embodiments, the water-insoluble fiber comprises wool, diacetate, triacetate, nylon, PLA, PET, PP, or a combination thereof.

Nonwoven Web

The nonwoven web of the disclosure is generally water-dispersible, optionally water-soluble, and optionally flushable. The nonwoven web of the disclosure generally includes a plurality of water-soluble fibers and, optionally, water-insoluble fibers. A nonwoven web generally refers to an arrangement of fibers bonded to one another, wherein the fibers are neither woven nor knitted. In general, the plurality of fibers can be arranged in any orientation. In embodiments, the plurality of fibers are arranged randomly (i.e., do not have an orientation). In embodiments, the plurality of fibers are arranged in a unidirectional orientation. In embodiments, the plurality of fibers are arranged in a bidirectional orientation. In some embodiments, the plurality of fibers are multi-directional, having different arrangements in different areas of the nonwoven web.

In general, the plurality of fibers in any given nonwoven web can include any fiber forming materials disclosed herein. The nonwoven web can include (1) a single fiber type including a single fiber forming material, (2) a single fiber type including a blend of fiber forming materials, (3) a blend of fiber types, each fiber type including a single fiber forming material, (4) a blend of fiber types, each fiber type including a blend of fiber forming materials, or (5) a blend of fiber types, each fiber type including a single fiber forming material or a blend of fiber forming materials. In embodiments including a blend of fiber types, the different fiber types can have a difference in a length to diameter (L/D) ratio, tenacity, shape, cross-sectional surface area, rigidness, elasticity, solubility, melting point, glass transition temperature ($T_g$), fiber forming material chemistries, color, or a combination thereof. In embodiments, the plurality of fibers includes a plurality of water-soluble fibers. The plurality of water-soluble fibers can include a single type of water-soluble fiber. In embodiments, plurality of water-soluble fibers can include at least two different types of water-soluble fibers. In embodiments, the water-dispersible nonwoven web can further include a plurality of water-insoluble fibers. In embodiments, the water-dispersible nonwoven web can include a single type of water-soluble fiber and one or more different types of water-insoluble fiber. In embodiments, the water-dispersible nonwoven web can include one or more different types of water-soluble fibers and one or more different types of water-insoluble fibers. In embodiments, the water-dispersible nonwoven web can consist of or consist essentially of one or more types of water-soluble fiber. For example, the fiber components in the water-dispersible nonwoven web can all be water-soluble fibers.

In embodiments, the nonwoven web comprises a plurality of fibers, wherein the plurality of fibers comprise a first fiber type comprising a blend of fiber forming materials comprising a first polyvinyl alcohol fiber forming material and (a) a second polyvinyl alcohol fiber forming material or (b) the blend does not include CMC, HPMC, or starch. In embodiments the nonwoven web is water-dispersible and comprises a plurality of water-soluble fibers, wherein the plurality of water-soluble fibers comprise a first water-soluble fiber type including a blend of fiber forming materials, the blend of fiber forming materials including a first water-soluble polyvinyl alcohol fiber forming material and (a) a second polyvinyl alcohol fiber forming material or (b) the blend does not include CMC, HPMC, or starch.

In embodiments, the first polyvinyl alcohol fiber forming material comprises a polyvinyl alcohol homopolymer or a polyvinyl alcohol copolymer. In embodiments, the second polyvinyl alcohol fiber forming material comprises a polyvinyl alcohol homopolymer or a polyvinyl alcohol copolymer. In embodiments, the first and/or second polyvinyl alcohol can comprise a modified polyvinyl alcohol copolymer. In refinements of the foregoing embodiment, the modified polyvinyl alcohol copolymer can be an anionic modified polyvinyl alcohol copolymer. In embodiments, the first polyvinyl alcohol fiber forming material comprises a polyvinyl alcohol homopolymer and the second polyvinyl alcohol fiber forming material comprises a polyvinyl alcohol copolymer, optionally, an anionic modified copolymer.

In embodiments, the first polyvinyl alcohol fiber forming material has a degree of hydrolysis in a range of about 75% to about 99.9%, optionally in a range of about 80% to about 90%, optionally in a range of about 92% to about 99%, optionally about 98% to about 99%, optionally about 98% to about 99.9%. In embodiments, the second first polyvinyl alcohol fiber forming material has a degree of hydrolysis in a range of about 75% to about 99.9%, optionally in a range of about 80% to about 90%, optionally in a range of about 92% to about 99%, optionally about 98% to about 99%, optionally about 98% to about 99.9%.

In embodiments, the plurality of fibers comprises the first fiber type and a second fiber type. Optionally, the first fiber type and/or the second fiber type are water-soluble fibers. In general, the first and second fiber types have a difference in length to distance (L/D) ratio, tenacity, shape, cross sectional area, rigidness, elasticity, solubility in water, melting point, glass transition temperature ($T_g$), fiber chemistry, color, or a combination thereof. In embodiments, the first and second fiber types have a difference in length to distance (L/D) ratio, tenacity, shape, solubility in water, glass transition temperature ($T_g$), fiber chemistry, color, or a combination thereof.

In embodiments, the plurality of fibers further comprise water-insoluble fibers. In embodiments, the water-insoluble fibers comprise about 20% to about 80% by weight of the total weight of the plurality of fibers. In embodiments, the water-insoluble fibers comprise cotton, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, polyester, copolyester, viscose, polylactide, polyethylene terephthalate, polypropylene or a combination thereof.

Flushable Nonwoven Webs & Flushability

The nonwoven webs, laminate materials, and pouches described herein can be flushable. Flushable nonwoven webs include a plurality of fibers, wherein the plurality of fibers can include water-soluble fibers and water insoluble fibers.

The water-soluble fiber of the flushable nonwoven web can include any of the water-soluble fiber forming materials disclosed herein. In embodiments, the water-soluble fibers include polyvinyl alcohol fiber forming materials. In a refinement of the foregoing embodiment, the water-soluble fiber includes a PVOH homopolymer. In another refinement of the foregoing embodiment, the water-soluble fiber includes a PVOH copolymer. In embodiments, the water-soluble fiber includes a blend of polyvinyl alcohol fiber forming materials. In a refinement of the foregoing embodiment, the water-soluble fiber includes one or more PVOH homopolymers. In another refinement of the foregoing embodiment, the water-soluble fiber includes one or more PVOH copolymers.

In embodiments, the water-soluble fiber includes a blend of water-soluble fiber forming materials. In refinements of the forgoing embodiments, the blend of water-soluble fiber forming materials can include a polyvinyl alcohol polymer or a blend of polyvinyl alcohol polymers comprising a polyvinyl alcohol homopolymer, a polyvinyl alcohol copolymer, or a combination thereof. In further refinements, the water-soluble fiber can include a blend of water-soluble polymers including a polyvinyl alcohol homopolymer and a polyvinyl alcohol copolymer. In yet another refinement of the foregoing embodiment, the water-soluble polymer includes one or more PVOH homopolymers and one or more PVOH copolymers. In some embodiments, the water-soluble fiber includes a blend of fiber forming materials including a first polyvinyl alcohol fiber forming material and (a) a second polyvinyl alcohol fiber forming material or (b) the blend of fiber forming material does not include CMC, HPMC, or starch.

In embodiments, the flushable nonwoven web can include a plurality of water-soluble fibers including a first water-soluble fiber and a second water-soluble fiber, wherein the first and second water-soluble fibers can have a difference in L/D ratio, length, tenacity, shape, rigidness, elasticity, solubility, melting point, glass transition temperature ($T_g$), fiber chemistry, color, or a combination thereof.

Suitable water-insoluble fiber forming materials for flushable fibers, nonwoven webs, laminates, and/or pouches of the disclosure include, but are not limited to, cotton, polyester, copolyester, polyethylene (e.g., high density polyethylene and low density polyethylene), polypropylene, wood pulp, fluff pulp, abaca, viscose, insoluble cellulose, insoluble starch, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, polyester, copolyester, viscose, polylactide, polyethylene terephthalate, polypropylene, and combinations thereof. In embodiments, the water-insoluble fiber forming material does not include cotton or rayon.

The amount of water-soluble fiber in the flushable nonwoven web can range from about at least about 20, 25, 30, 40, 50, or 60 wt % and/or up to about 100, 95, 90, 85, 80, 75, 70, 60, 50, or 40 wt %, based on the total weight of the fibers in the flushable nonwoven web, for example about 20, 25, 30, 35, 40, 45, 50, 55, 60, 65, 70, 75, 80, 85, 90, 95, or 100 wt %, based on the total weight of the fibers of the flushable nonwoven web, wherein the balance of fibers are water-insoluble fibers.

The amount of water-insoluble fiber in the flushable nonwoven web can range from about 0, 5, 10, 15, 20, 40, 50, or 60 wt % and/or up to about 75, 70, 60, 50, 40, 30, or 25 wt %, based on the total weight of the fibers of the flushable nonwoven web, for example about 0, 5, 10, 15, 20, 25, 30, 35, 40, 45, 50, 55, 60, 65, 70 or 75 wt %, based on the total weight of the fibers of the flushable nonwoven web, with the balance of fibers being water-soluble fibers.

The ratio of water-insoluble fiber to water-soluble fiber in the flushable nonwoven web can range from about 1:18 to about 4:1, about 1:10 to about 3:1, about 1:5 to about 2:1, or about 1:2 to about 2:1, for example about 1:18, 1:16, 1:14, 1:12, 1:10, 1:5, 1:3, 1:2, 1:1, 2:1, 3:1, or 4:1.

Without intending to be bound by theory, for nonwoven webs containing fibers of polyvinyl alcohol only, as flushability increases (i.e., higher disintegration values as determined by the Flushability Test herein), the mechanical stability decreases. Therefore, the inventors have found that by incorporating water-insoluble fibers into the nonwoven web the flushability can still increase without compromising the mechanical stability of the web.

For flushable nonwoven films including polyvinyl alcohol, flushability increases as water-solubility increases, but water-solubility and mechanical stability generally have an inverse relationship. Accordingly, the selection of the particular polyvinyl alcohol, as well as any additional water-soluble and/or water-insoluble fibers can be important to maintain the mechanical integrity of the web while also having suitable flushability characteristics. For example, parameters such as DH and percent modification of a polyvinyl alcohol homopolymer or copolymer can impact the flushability and mechanical properties of the fiber.

Auxiliary Agents

The water-soluble fibers, water-insoluble fibers, nonwoven webs, laminates, and/or water-soluble films can include other auxiliary agents and processing agents, such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. As used herein and unless specified otherwise, "auxiliary agents" include secondary additives, processing agents, and active agents. Specific such auxiliary agents and processing agents can be selected from those suitable for use in water-soluble fibers, water-insoluble fibers, nonwoven webs, or those suitable for use in water-soluble films.

In embodiments, the water-soluble fibers, water-insoluble fibers, nonwoven webs, and/or water-soluble films are free of auxiliary agents. As used herein and unless specified otherwise, "free of auxiliary agents" with respect to the fiber means that the fiber includes less than about 0.01 wt %, less than about 0.005 wt. %, or less than about 0.001 wt. % of auxiliary agents, based on the total weight of the fiber. As used herein and unless specified otherwise, "free of auxiliary agents" with respect to the nonwoven web means that the nonwoven web includes less than about 0.01 wt %, less than about 0.005 wt. %, or less than about 0.001 wt. % of auxiliary agents, based on the total weight of the nonwoven web. In embodiments, the water-soluble fibers comprise a plasticizer. In embodiments, the water-soluble fibers comprise a surfactant. In embodiments, the water-insoluble fibers comprise a plasticizer. In embodiments, the water-insoluble fibers comprise a surfactant. In embodiments, the nonwoven web includes a plasticizer. In embodiments, the nonwoven web includes a surfactant. In embodiments wherein a first fiber includes a blend of fiber forming materials including a first polyvinyl alcohol fiber forming material, the first fiber further includes a plasticizer, a surfactant, or a combination thereof. In embodiments wherein a first fiber includes a blend of fiber forming materials including a first polyvinyl alcohol fiber forming material, the first fiber further includes a plasticizer. In embodiments wherein a first fiber includes a blend of fiber forming materials including a first polyvinyl alcohol fiber forming material, the first fiber further includes a surfactant.

A plasticizer is a liquid, solid, or semi-solid that is added to a material (usually a resin or elastomer) making that material softer, more flexible (by decreasing the glass-transition temperature of the polymer), and easier to process. A polymer can alternatively be internally plasticized by chemically modifying the polymer or monomer. In addition or in the alternative, a polymer can be externally plasticized by the addition of a suitable plasticizing agent. Water is recognized as a very efficient plasticizer for PVOH and other polymers; including but not limited to water-soluble polymers, however, the volatility of water makes its utility limited since polymer films need to have at least some resistance (robustness) to a variety of ambient conditions including low and high relative humidity.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol (MPDiol®), ethanolamines, and a mixture thereof. The total amount of the non-water plasticizer provided in a fiber can be in a range of about 1 wt. % to about 45 wt. %, or about 5 wt. % to about 45 wt. %, or about 10 wt. % to about 40 wt. %, or about 20 wt. % to about 30 wt. %, about 1 wt. % to about 4 wt. %, or about 1.5 wt. % to about 3.5 wt. %, or about 2.0 wt. % to about 3.0 wt. %, for example about 1 wt. %, about 2.5 wt. %, about 5 wt. %, about 10 wt. %, about 15 wt. %, about 20 wt. %, about 25 wt. %, about 30 wt. %, about 35 wt. %, or about 40 wt. %, based on total fiber weight.

Surfactants for use in fibers are well known in the art. Surfactants for use in films are also well known in the art and can suitably be used in the fibers, films, and/or nonwoven webs of the disclosure. Optionally, surfactants are included to aid in the dispersion of the fibers during carding. Suitable surfactants for fibers of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, alkali metal salts of higher fatty acids containing about 8 to 24 carbon atoms, alkyl sulfates, alkyl polyethoxylate sulfates, alkylbenzene sulfonates, monoethanolamine, lauryl alcohol ethoxylate, propylene glycol, diethylene glycol, salts thereof and combinations of any of the forgoing.

Suitable surfactants can include the nonionic, cationic, anionic and zwitterionic classes. Suitable surfactants include, but are not limited to, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), and amine oxides, N-alkylbetaines and sulfobetaines (zwitterionics). Other suitable surfactants include dioctyl sodium sulfosuccinate, lactylated fatty acid esters of glycerin and propylene glycol, lactylic esters of fatty acids, sodium alkyl sulfates, polysorbate 20, polysorbate 60, polysorbate 65, polysorbate 80, lecithin, acetylated fatty acid esters of glycerin and propylene glycol, and acetylated esters of fatty acids, and combinations thereof. In various embodiments, the amount of surfactant in the fiber is in a range of about 0.01 wt. %, to about 2.5 wt. %, about 0.1 wt. % to about 2.5 wt. %, about 1.0 wt. % to about 2.0 wt. %, about 0.01 wt % to 0.25 wt %, or about 0.10 wt % to 0.20 wt %.

In embodiments, the nonwoven web can be colored, pigmented, and/or dyed to provide an improved aesthetic effect relative to water-soluble films. Suitable colorants can include an indicator dye, such as a pH indicator (e.g., thymol blue, bromothymol, thymolphthalein, and thymolphthalein), a moisture/water indicator (e.g., hydrochromic inks or leuco dyes), or a thermochromic ink, wherein the ink changes color when temperature increases and/or decreases. Suitable colorants include, but are not limited to a triphenylmethane dye, an azo dye, an anthraquinone dye, a perylene dye, an indigoid dye, a food, drug and cosmetic (FD&C) colorant, an organic pigment, an inorganic pigment, or a combination thereof. Examples of colorants include, but are not limited to, FD&C Red #40; Red #3; FD&C Black #3; Black #2; Mica-based pearlescent pigment; FD&C Yellow #6; Green #3; Blue #1; Blue #2; titanium dioxide (food grade); brilliant black; and a combination thereof.

When included in a fiber, the colorant can be provided in an amount of 0.01% to 25% by weight of the water-soluble polymer mixture, such as, 0.02%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, and 24% by weight of the water-soluble polymer mixture.

In embodiments, the nonwoven webs of the disclosure can include an active agent. The active agent can be added to the fiber itself, or during carding of the nonwoven web, and/or can be added to the nonwoven web prior to bonding. Active agents added to the fibers during carding can be distributed throughout the nonwoven web. Active agents added to the nonwoven web after carding but prior to bonding can be selectively added to one or both faces of the nonwoven web. Additionally, active agents can be added to the surface of pouches or other articles prepared from the nonwoven webs. In embodiments, the active agent is provided as part of the plurality of fibers, dispersed within the nonwoven web, provided on a face of the nonwoven web, or a combination thereof.

The active agent, when present in the nonwoven web in an amount of at least about 1 wt %, or in a range of about 1 wt % to about 99 wt %, provides additional functionality to the nonwoven web. In embodiments, the active agent can comprise one or more components including, but not limited to, enzymes, oils, flavors, colorants, odor absorbers, fragrances, pesticides, fertilizers, activators, acid catalysts, metal catalysts, ion scavengers, detergents, disinfectants, surfactants, bleaches, bleach components, fabric softeners or combinations thereof. In embodiments, the active agent can comprise a colorant, a surfactant, or a combination thereof. The active agent can take any desired form, including as a solid (e.g., powder, granulate, crystal, flake, or ribbon), a liquid, a mull, a paste, a gas, etc., and optionally can be encapsulated.

In certain embodiments, the active agent may comprise an enzyme. Suitable enzymes include enzymes categorized in any one of the six conventional Enzyme Commission (EC) categories, i.e., the oxidoreductases of EC 1 (which catalyze oxidation/reduction reactions), the transferases of EC 2 (which transfer a functional group, e.g., a methyl or phosphate group), the hydrolases of EC 3 (which catalyze the hydrolysis of various bonds), the lyases of EC 4 (which cleave various bonds by means other than hydrolysis and oxidation), the isomerases of EC 5 (which catalyze isomerization changes within a molecule) and the ligases of EC 6 (which join two molecules with covalent bonds). Examples of such enzymes include dehydrogenases and oxidases in EC 1, transaminases and kinases in EC 2, lipases, cellulases, amylases, mannanases, and peptidases (a.k.a. proteases or proteolytic enzymes) in EC 3, decarboxylases in EC 4, isomerases and mutases in EC 5 and synthetases and synthases of EC 6. Suitable enzymes from each category are described in, for example, U.S. Pat. No. 9,394,092, the entire disclosure of which is herein incorporated by reference.

Enzymes for use in laundry and dishwashing applications can include one or more of protease, amylase, lipase, dehydrogenase, transaminase, kinase, cellulase, mannanase, peptidase, decarboxylase, isomerase, mutase, synthetase, synthase, and oxido-reductase enzymes, including oxido-reductase enzymes that catalyze the formation of bleaching agents.

It is contemplated that an enzyme for use herein can come from any suitable source or combination of sources, for example bacterial, fungal, plant, or animal sources. In one type of embodiment, a mixture of two or more enzymes will come from at least two different types of sources. For example, a mixture of protease and lipase can come from a bacterial (protease) and fungal (lipase) sources.

Optionally, an enzyme for use herein, including but not limited to any enzyme class or member described herein, is one which works in alkaline pH conditions, e.g. for use in detergent applications including laundry detergent and/or dish detergent, e.g. a pH in a range of about 8 to about 11. Optionally, an enzyme for use herein, including but not limited to any enzyme class or member described herein, is one which works in a temperature in a range of about 5° C. to about 45° C.

Oils other than fragrances can include flavorants and colorants.

In one class of embodiments the active agent includes a flavor or combination of flavors. Suitable flavors include but are not limited to, spearmint oil, cinnamon oil, oil of wintergreen (methylsalicylate), peppermint oils, and synthetic and natural fruit flavors, including citrus oils.

In some embodiments, the active agent may be a colorant or combination of colorants. Examples of suitable colorants include food colorings, caramel, paprika, cinnamon, and saffron. Other examples of suitable colorants can be found in U.S. Pat. No. 5,002,789, hereby incorporated by reference in its entirety.

Another class of embodiments include one or more odor absorbers as active agents. Suitable odor absorbers for use as active agents according to the disclosure include, but are not limited to, zeolites, and complex zinc salts of ricinoleic acid. The odor absorbing active agent can also comprise fixatives that are well known in the art as largely odor-neutral fragrances, including but not limited to extracts of labdanum, styrax, and derivatives of abietic acid.

Another class of embodiments include one or more fragrances as active agents. As used herein, the term fragrance refers to any applicable material that is sufficiently volatile to produce a scent. Embodiments including fragrances as active agents can include fragrances that are scents pleasurable to humans, or alternatively fragrances that are scents repellant to humans, animals, and/or insects. Suitable fragrances include, but are not limited to, fruits including, but not limited to, lemon, apple, cherry, grape, pear, pineapple, orange, strawberry, raspberry, musk and flower scents including, but not limited to, lavender-like, rose-like, iris-like and carnation-like. Optionally the fragrance is one which is not also a flavoring. Other fragrances include herbal scents including, but not limited to, rosemary, thyme, and sage; and woodland scents derived from pine, spruce and other forest smells. Fragrances may also be derived from various oils, including, but not limited to, essential oils, or from plant materials including, but not limited to, peppermint, spearmint and the like. Suitable fragrant oils can be found in U.S. Pat. No. 6,458,754, hereby incorporated by reference in its entirety. Suitable fragrant oils include, but are not limited to, 4-(2,2,6-trimethylcyclohex-1-enyl)-2-en-4-one, acetaldehyde phenylethyl propyl acetal, 2,6,10-trimethyl-9-undecenal, hexanoic acid 2-propenyl ester, 1-octen-3-ol, trans-anethole, iso buthyl (z)-2-methyl-2-butenoate, anisaldehyde diethyl acetal, 3-methyl-5-propyl-cyclohezen-1-one, 2,4-dimethyl-3-cyclohexene-1-carbaldehyde, trans-4-decenal, decanal, 2-pentylcyclopentanone, ethyl anthranilate, eugenol, 3-(3-isopropylphenyl)butanoal, methyl 2-octynoate, isoeugenol, cis-3-hexenyl methyl carbonate, linalool, methyl-2-nonynonate, benzoic acid 2-hydroxymethyl ester, nonal, octanel, 2-nonennitrile, 4-nonanolide, 9-decen-1-ol, and 10-undecen-1-al. Applicable fragrances can also be found in U.S. Pat. Nos. 4,534,981, 5,112,688, 5,145,842, 6,844,302 and Perfumes Cosmetics and Soaps, Second Edition, edited by W. A. Poucher, 1959, all hereby incorporated by reference in their entireties. These fragrances include acacia, cassie, chypre, cyclamen, fern, gardenia, hawthorn, heliotrope, honeysuckle, hyacinth, jasmine, lilac, lily, magnolia, mimosa, narcissus, freshly-cut hay, orange blossom, orchids, reseda, sweet pea, trefle, tuberose, vanilla, violet, wallflower, and the like.

Fragrances can include perfumes. The perfume may comprise neat perfume, encapsulated perfume, or mixtures thereof. Preferably, the perfume includes neat perfume. A portion of the perfume may be encapsulated in a core-shell encapsulate. In another type of embodiment, the perfume will not be encapsulated in a core/shell encapsulate.

As used herein, the term "perfume" encompasses the perfume raw materials (PRMs) and perfume accords. The term "perfume raw material" as used herein refers to compounds having a molecular weight of at least about 100 g/mol and which are useful in imparting an odor, fragrance, essence or scent, either alone or with other perfume raw materials. As used herein, the terms "perfume ingredient" and "perfume raw material" are interchangeable. The term "accord" as used herein refers to a mixture of two or more PRMs.

Typical PRM comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994). The PRMs are characterized by their boiling points (B.P.) measured at the normal pressure (760 mm Hg), and their octanol/water partitioning coefficient (P). Based on these characteristics, the PRMS may be categorized as Quadrant I, Quadrant II, Quadrant III, or Quadrant IV perfumes.

Applicable insect repellant fragrances include one or more of dichlorvos, pyrethrin, allethrin, naled and/or fenthion pesticides disclosed in U.S. Pat. No. 4,664,064, incorporated herein by reference in its entirety. Suitable insect repellants are citronellal (3,7-dimethyl-6-octanal), N,N-diethyl-3-methylbenzamide (DEET), vanillin, and the volatile oils extracted from turmeric (Curcuma longa), kaffir lime (Citrus hystrix), citronella grass (Cymbopogon winterianus) and hairy basil (Ocimum americanum). Moreover, applicable insect repellents can be mixtures of insect repellents.

In one class of embodiments, the active agents according to the disclosure can comprise one or more pesticides. Suitable pesticides may include, but are not limited to, insecticides, herbicides, acaricides, fungicides, and larvacides.

Another class of embodiments include one or more fertilizers as active agents. As used herein, the term fertilizer applies to any applicable material that releases one or more of nitrogen, phosphorus, potassium, calcium, magnesium, sulfur, boron, chlorine, copper, iron, manganese, molybdenum, or zinc. Suitable fertilizers include, but are not limited to zeolites. For example, clinoptilolite is a zeolite that releases potassium and can also release nitrogen when preloaded with ammonium.

One class of embodiments comprise acid catalysts as active agents. As used herein, the term acid catalysts refers to any species that serves as a proton source, thereby facilitating a chemical reaction. In one type of embodiment, the acid catalyst will be a non-oxidizing organic acid. A suitable organic acid is para-toluenesulfonic acid. In some embodiments, active agents that are acid catalysts will facilitate reactions including, but not limited to, acetalization, esterification or transesterification. Additional acid catalyzed reactions are well known in the art.

In one class of embodiments, active agents will include metal catalysts. These catalysts mediate reactions including, but not limited to, oxidation or reduction, hydrogenation, carbonylation, C—H bond activation, and bleaching. Suitable metals for use as metal catalysts include, but are not limited to the VIIIA and IB transition metals, for example, iron, cobalt, nickel, copper, platinum, rhodium, ruthenium, silver, osmium, gold and iridium. The metal that mediates catalysis can be of any suitable oxidation state.

In alternative embodiments, the active agent may optionally be an ion scavenger. Suitable ion scavengers include, but are not limited to, zeolites. Optionally, zeolites can be added to water-soluble packets comprising laundry detergents or dish washing detergents enclosed within, as a water softener.

Inorganic and organic bleaches are suitable cleaning active agents for use herein. Inorganic bleaches include perhydrate salts including, but not limited to, perborate, percarbonate, perphosphate, persulfate and persilicate salts. The inorganic perhydrate salts are normally the alkali metal salts. Alkali metal percarbonates, particularly sodium percarbonate are suitable perhydrates for use herein. Organic bleaches can include organic peroxyacids including diacyl and tetraacylperoxides, especially, but not limited to, diperoxydodecanedioc acid, diperoxytetradecanedioc acid, and diperoxyhexadecanedioc acid. Dibenzoyl peroxide is a suitable organic peroxyacid according to the disclosure. Other organic bleaches include the peroxy acids, particular examples being the alkylperoxy acids and the arylperoxy acids.

In one class of embodiments, active agents can comprise bleach activators, including organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having from 1 to 10 carbon atoms, or from 2 to 4 carbon atoms, and/or optionally substituted perbenzoic acid. Suitable substances bear O-acyl and/or N-acyl groups of the number of carbon atoms specified and/or optionally substituted benzoyl groups. Suitable substances include, but are not limited to, polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

In embodiments that comprise fabric softeners as active agents, various through-the-wash fabric softeners, especially the impalpable smectite clays of U.S. Pat. No. 4,062,647, incorporated herein by reference in its entirety, as well as other softener clays known in the art, can optionally be used to provide fabric softener benefits concurrently with fabric cleaning. Clay softeners can be used in combination with amine and cationic softeners as disclosed, for example, in U.S. Pat. Nos. 4,375,416 and 4,291,071, incorporated herein by reference in their entireties.

In embodiments, the active agent can include disinfectants. Disinfectants suitable for use herein can include, but are not limited to, hydrogen peroxide, inorganic peroxides and precursors thereof, sodium metabisulfite, quaternary ammonium cation based compounds, chlorine, activated carbon, and hypochlorite.

In embodiments, the active agent can include surfactants. Suitable surfactants for use herein can include, but are not limited to, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), amine oxides, N-alkylbetaines and sulfobetaines (zwitterionics), dioctyl sodium sulfosuccinate, lactylated fatty acid esters of glycerin and propylene glycol, lactylic esters of fatty acids, sodium alkyl sulfates, polysorbate 20, polysorbate 60, polysorbate 65, polysorbate 80, lecithin, acetylated fatty acid esters of glycerin and propylene glycol, and acetylated esters of fatty acids, and combinations thereof.

Active agents may be solids or liquids. Active agents that are solids can have an average particle size (e.g. Dv50) of at least about 0.01 μm, or a size in a range of about 0.01 μm to about 2 mm, for example. Liquid active agents may be applied directly to the nonwoven web, mixed with a carrier powder, or microencapsulated. In embodiments that comprise a carrier powder, the average particle size of the carrier powder can be at least about 0.01 μm, or in a range of about 0.01 μm to about 2 mm, for example.

In one class of embodiments the active agent is encapsulated, allowing for the controlled release of the active agent. Suitable microcapsules can include or be made from one or more of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, zein, and combinations thereof. In one type of embodiment, the microcapsule is characterized by a mean particle size (e.g. Dv50) of at least about 0.1 micron, or in a range of about 0.1 micron to about 200 microns, for example. In alternate embodiments, the microcapsules can form agglomerates of individual particles, for example wherein the individual particles have a mean particle size of at least about 0.1 micron, or in a range of about 0.1 micron to about 200 microns.

In embodiments wherein the active agent is applied to one or more faces of a nonwoven web or to a packet, the active agent can be applied by any suitable means. In a one embodiment, one or more stationary powder spray guns are used to direct an active agent powder stream towards the web or packet, from one or more than one direction, while the web or packet is transported through the coating zone by means of a belt conveyor. In an alternative embodiment, a pouch is conveyed through a suspension of an active agent powder in air. In yet another alternative embodiment the packets are tumble-mixed with the active agent powder in a trough-like apparatus. In another embodiment, which can be combined with any other embodiment, electrostatic forces are employed to enhance the attraction between the active agent powder and the packet. This type of process is typically based on negatively charging the powder particles and directing these charged particles to the grounded packets. In other alternative embodiments, the active agent powder is applied to the packet by a secondary transferring tool including, but not limited to rotating brushes which are in contact with the powder or by powdered gloves which can transfer the powder from a container to the packet. In yet another embodiment the active agent powder is applied by dissolving or suspending the powder in a non-aqueous solvent or carrier which is then atomized and sprayed onto the packet. In one type of embodiment, the solvent or carrier subsequently evaporates, leaving the active agent powder behind. In one class of embodiments, the active agent powder is applied to the packet in an accurate dose. This class of embodiments utilizes closed-system dry lubricant application machinery, such as PekuTECH's powder applicator PM 700 D. In this process the active agent powder, optionally batch-wise or continuously, is fed to a feed trough of application machinery. The packets are transferred from the output belt of a standard rotary drum pouch machine onto a conveyor belt of the powder application machine, wherein a controlled dosage of the active agent is applied to the packet. The packet is thereafter conveyed to a suitable secondary packaging process.

Liquid active agents can be applied to a nonwoven web or packet, for example, by spin casting, spraying a solution such as an aerosolized solution, roll coating, flow coating, curtain coating, extrusion, knife coating, and combinations thereof.

Fiber and Nonwoven Web Formation

The plurality of fibers can be prepared by any process known in the art, for example, wet cool gel spinning, melt blowing, spun bonding, electro-spinning, rotary spinning, continuous filament producing operations, tow fiber producing operations, and combinations thereof.

In embodiments, the plurality of fibers include fibers, such as water-soluble fibers, prepared according to a wet cooled gel spinning process, the wet cooled gel spinning process including the steps of (a) dissolving the fiber forming material(s) (e.g., water-soluble polymer (or polymers)) in a solvent to form a polymer mixture, the polymer mixture optionally including auxiliary agents;
(b) extruding the polymer mixture through a spinning nozzle to a solidification bath to form an extruded polymer mixture;
(c) passing the extruded polymer mixture through a solvent exchange bath;
(d) optionally wet drawing the extruded polymer mixture; and
(e) finishing the extruded polymer mixture to provide the fibers.

The solvent in which the water-soluble polymer is dissolved can suitably be any solvent in which the polymer is soluble. In embodiments wherein the polymer is water-soluble, the solvent in which the water-soluble polymer is dissolved includes a polar aprotic solvent. In embodiments, the solvent in which the water-soluble polymer is dissolved includes dimethyl sulfoxide (DMSO).

In general, the solidification bath includes a cooled solvent for gelling the extruded polymer mixture. The solidification bath can generally be at any temperature that facilitates solidification of the extruded polymer mixture. Suitable solidification bath temperatures can be about 15° C. or less, about 10° C. or less, about 5° C. or less, or 0° C. or less, for example, in a range of about 15° C. to about −20° C., about 12° C. to about −15° C., about 10° C. to about −10° C., about 10° C. to about 0° C., about 6° C. to about 0° C., about 6° C. to about 2° C., about 5° C. to about 0° C., or about 5° C. to about 2° C. In embodiments, the solidification bath can have a temperature of about 5° C. The solidification bath can include a mixture of a solvent in which the fiber forming material is soluble and a solvent in which the fiber forming material is not soluble. The solvent in which the fiber forming material is not soluble is generally the primary solvent, wherein the solvent in which the fiber forming material is not soluble makes up greater than 50% of the mixture. The solvent in which the fiber forming material is not soluble and the solvent in which the fiber forming material is soluble can be provided in a ratio of about 95:5 to about 55:45, by volume, for example about 95:5, about 90:10, about 85:15, about 80:20, about 75:25, about 70:30, about 65:45, about 60:40, or about 55:45, by volume. In embodiments wherein the polymer is water-soluble, the solvent in which the water-soluble polymer is not soluble comprises methanol, acetone, mineral spirits, mineral oil, or a combination thereof. In embodiments, the solvent in which the water-soluble polymer is not soluble comprises methanol, acetone, or a combination thereof. In embodiments, the solvent in which the water-soluble polymer is not soluble comprises methanol. In embodiments, the solvent in which the water-soluble polymer is not soluble comprises acetone. In embodiments, the solidification bath includes a mixture of methanol and DMSO at a ratio of about 80:20, by volume.

Figure 2:
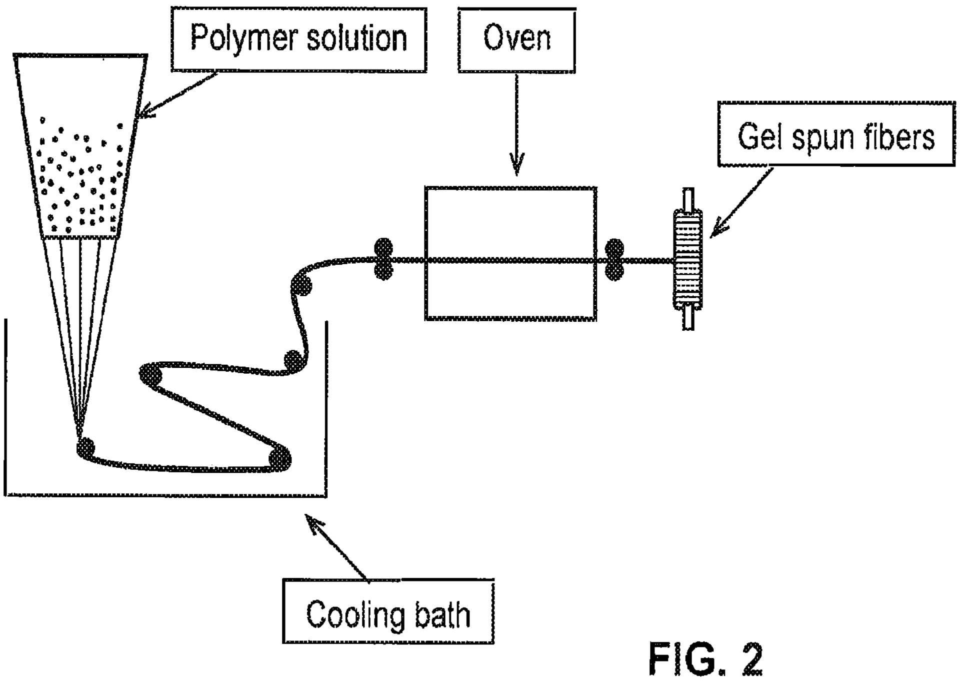
FIG. 2 is a diagram of a representative process for preparing water-soluble fibers of the disclosure.

After passing through the solidification bath, the extruded polymer mixture gel can be passed through one or more solvent replacement baths. The solvent replacement baths are provided to replace the solvent in which the fiber forming material is soluble with the solvent in which the fiber forming material is not soluble to further solidify the extruded polymer mixture and replace the solvent in which the fiber forming material is soluble with a solvent that will more readily evaporate, thereby reducing the drying time. Solvent replacement baths can include a series of solvent replacement baths having a gradient of solvent in which the fiber forming material is soluble with the solvent in which the fiber forming material is not soluble, a series of solvent replacement baths having only the solvent in which the fiber forming material is not soluble, or a single solvent replacement bath having only the solvent in which the fiber forming material is not soluble. In embodiments, at least one solvent replacement bath can consist essentially of a solvent in which the fiber forming material is not soluble. A representative process for preparing water-soluble fibers of the disclosure is shown in FIG. 2.

Finished fibers are sometimes referred to as stable fibers, shortcut fibers, or pulp. In embodiments, finishing includes drying the extruded polymer mixture. In embodiments, finishing includes cutting or crimping the extruded polymer mixture to form individual fibers. Wet drawing of the extruded polymer mixture provides a substantially uniform diameter to the extruded polymer mixture and, thus, the fibers cut therefrom. Drawing is distinct from extruding, as is well known in the art. In particular, extruding refers to the act of making fibers by forcing the resin mixture through the spinneret head whereas drawing refers to mechanically pulling the fibers in the machine direction to promote polymer chain orientation and crystallinity for increased fiber strength and tenacity. As used herein, fiber diameters are "substantially uniform" if the variance in diameter between fibers is less than 10%, for example 8% or less, 5% or less, 2% or less, or 1% or less. Wet drawing of the extruded polymer mixture can suitably be performed before passing the extruded polymer mixture through a solvent exchange bath, after passing the extruded polymer mixture through a solvent exchange bath, or between passing the extruded polymer mixture through a first solvent exchange bath and a second solvent exchange bath.

In embodiments wherein the fibers are prepared from a wet cooled gel spinning process, the fiber forming material can be generally any water-soluble polymer or blend thereof, e.g., two or more different polymers, as generally described herein. In refinements of the foregoing embodiment, the polymer(s) can have any degree of polymerization (DP), for example, in a range of 10 to 10,000,000, for example, at least 10, at least 20, at least 50, at least 100, at least 200, at least 300, at least 400, at least 500, at least 750, or at least 1000 and up to 10,000,000, up to 5,000,000, up to 2,500,00, up to 1,000,000, up to 900,000, up to 750,000, up to 500,000, up to 250,000, up to 100,000, up to 90,000, up to 75,000, up to 50,000, up to 25,000, up to 12,000, up to 10,000, up to 5,000, or up to 2,500, for example in a range of 100010 about 50,000, 1000 to about 25,000, 1000 to about 12,000, 1000 to about 5,000, 1000 to about 2,500, about 50 to about 12,000, about 50 to about 10,000, about 50 to about 5,000, about 50 to about 2,500, about 50 to about 1000, about 50 to about 900, about 100 to about 800, about 150 to about 700, about 200 to about 600, or about 250 to about 500. In embodiments, the DP is at least 1,000. As is known in the art, nonwoven webs can be prepared by carding and bonding staple fibers. In an alternative, nonwoven webs can be prepared from continuous fibers. Auxiliary agents, as described above, can be added to the fibers themselves or to the nonwoven web during the carding and/or bonding process.

Methods of preparing staple fibers and continuous fibers are well known in the art. Once the staple fibers or continuous fibers are carded, the nonwoven web is bonded. Methods of bonding staple fibers are well known in the art and can include through air bonding (thermal), calendar bonding (thermal with pressure), and chemical bonding. The nonwoven web of the disclosure can be thermally or chemically bonded. The nonwoven web can be generally porous with varying pore size, morphology and web heterogeneity, as shown in FIG. 1. Fiber physical properties and the type of bonding can affect the porosity of the resulting nonwoven web. Calendar bonding is achieved by applying heat and pressure, and typically maintains the pore size, shape, and alignment produced by the carding process. The conditions for calendar bonding can be readily determined by one of ordinary skill in the art. In general, if the heat and/or pressure applied is too low, the fibers will not sufficiently bind to form a free-standing web and if the heat and/or pressure is too high, the fibers will begin to meld together. The fiber chemistry dictates the upper and lower limits of heat and/or pressure for calendar bonding. Without intending to be bound by theory, it is believed that at temperatures above 235° C., polyvinyl alcohol based fibers degrade. Methods of embossment for calendar bonding of fibers are known. The embossing can be a one-sided embossing or a double-sided embossing. Typically, embossing of water-soluble fibers includes one-sided embossing using a single embossing roll consisting of an ordered circular array and a steel roll with a plain surface. As embossing is increased (e.g., as surface features are imparted to the web), the surface area of the web is increased. Without intending to be bound by theory it is expected that as the surface are of the web is increased, the solubility of the web is increased. Accordingly, the solubility properties of the nonwoven web can be advantageously tuned by changing the surface area through embossing. As shown in FIGS. 1A, 1B, 1C, 1D, and 1E, embossing during calendar bonding can impart observable divots in the nonwoven web.

In contrast to calendar bonding, chemical bonding typically uses a binder solution of the waste polymer left over from preparing the fibers to coat the carded fibers under pressure, which can result in smaller, less ordered pores relative to the pores as carded. Generally, the solvent can be any solvent that solubilizes the binder. Typically, the solvent of the chemical bonding solution is water. Without intending to be bound by theory, it is believed that if the polymer solution used for chemical bonding is sufficiently concentrated and/or sufficient pressure is applied, a nonporous water-dispersible nonwoven web can be formed. The solvent used in chemical bonding induces partial solubilization of the existing fibers in the web to weld and bond the fibers together. The polyvinyl alcohol binder provided in the solution assists in the welding process to provide a more mechanically robust web. The temperature of the polymer solution is not particularly limited and can be provided at room temperature (about 23° C.).

In some embodiments, a second layer of fibers can be used to bond the nonwoven web. Without intending to be bound by theory, it is believed that fibers prepared from by a melt blown process, for example, water-soluble fibers, can be used to bond the nonwoven web using an in-line process. In particular, a nonwoven web can be passed under a melt blown process station such that the melt blown fibers are deposited after melt extrusion and as the melt blown fibers cool and solidify, they bond to each other and to the nonwoven web on which they are deposited. Melt blown fibers can be micro- to nano-scale in length and can be provided on the nonwoven web such that the melt blown fibers make up about 15%, about 12%, about 10%, about 8%, about 6%, or about 5%, by weight of the final nonwoven web, based on the total weight of the fibers in the final nonwoven web. Without intending to be bound by theory it is believed that the inclusion of about 5% to about 15% of melt blown fibers can increase the mechanical integrity of the nonwoven web, without substantially changing the solubility properties of the nonwoven web. In general, when a polyvinyl alcohol fiber forming material is used to prepare a melt blown fiber, the polyvinyl alcohol polymer will be a homopolymer as melt blown processes require low viscosity and high melt flow index polymers.

Pore sizes can be determined using high magnification and ordered surface analysis techniques including, but not limited to Brunauer-Emmett-Teller theory (BET), small angle X-ray scattering (SAXS), and molecular adsorption.

The nonwoven webs of the disclosure can generally have any thickness. Suitable thicknesses can include, but are not limited to, about 5 to about 10,000 μm (1 cm), about 5 to about 5,000 μm, about 5 to about 1,000 μm, about 5 to about 500 μm, about 200 to about 500 μm, about 5 to about 200 μm, about 20 to about 150 μm, about 20 to about 100 μm, or about 40 to about 90 μm, or about 50 to 80 μm, or about or about 60 to 65 μm for example 50 μm, 65 μm, 76 μm, 88 μm, or 152 μm. The nonwoven webs of the disclosure can be characterized as high loft or low loft. In general, loft refers to the ratio of thickness to mass per unit area (i.e., basis weight). High loft nonwoven webs can be characterized by a high ratio of thickness to mass per unit area. As used herein, "high loft" refers to a nonwoven web of the disclosure having a basis weight as defined herein and a thickness exceeding 200 μm. The thickness of the nonwoven web can be determined by according to ASTM D5729-97, ASTM D5736, and ISO 9073-2:1995 and can include, for example, subjecting the nonwoven web to a load of 2 N and measuring the thickness. High loft materials can be used according to known methods in the art, for example, cross-lapping, which uses a cross-lapper to fold the unbounded web over onto itself to build loft and basis weight or achieved via through air bonding. Without intending to be bound by theory, in contrast to water-soluble films wherein the solubility of the film can be dependent on the thickness of the film; the solubility of a nonwoven web is not believed to be dependent on the thickness of the web. In this regard, it is believed that because the individual fibers provide a higher surface area than a water-soluble film, regardless of the thickness of the film and the nonwoven web, the parameter that limits approach of water to the fibers and, thereby, dissolution of the fibers is the basis weight (i.e., fiber density in the nonwoven).

The solubility of the nonwoven webs of the disclosure is generally a function of the type of fiber(s) used to prepare the web as well as the basis weight of the water-dispersible web. Without intending to be bound by theory, for a nonwoven web comprising a sole fiber type comprising a sole fiber forming material, it is believed that the solubility profile of a nonwoven web follows the same solubility profile of the fiber(s) used to prepare the nonwoven web, and the solubility profile of the fiber generally follows the same solubility profile of the fiber forming polymer(s) from which the fiber is prepared. For example, for nonwoven webs comprising PVOH fibers, the degree of hydrolysis of the PVOH polymer can be chosen such that the water-solubility of the nonwoven web is also influenced. In general, at a given temperature, as the degree of hydrolysis of the PVOH polymer increases from partially hydrolyzed (88% DH) to fully hydrolyzed (≥98% DH), water solubility of the polymer generally decreases. Thus, in one option, the nonwoven web can be cold water-soluble. For a co-poly(vinyl acetate vinyl alcohol) polymer that does not include any other monomers (e.g., not copolymerized with an anionic monomer) a cold water-soluble web, soluble in water at a temperature of less than 10° C., can include fibers of PVOH with a degree of hydrolysis in a range of about 75% to about 90%, or in a range of about 80% to about 90%, or in a range of about 85% to about 90%. In another option the nonwoven web can be hot water-soluble. For a co-poly(vinyl acetate vinyl alcohol) polymer that does not include any other monomers (e.g., not copolymerized with an anionic monomer) a hot water-soluble web, soluble in water at a temperature of at least about 60° C., can include fibers of PVOH with a degree of hydrolysis of at least about 98%.

Modification of PVOH generally increases the solubility of the PVOH polymer. Thus, it is expected that at a given temperature the solubility of a water-dispersible nonwoven web prepared from a PVOH copolymer, would be higher than that of a nonwoven web prepared from a PVOH homopolymer having the same degree of hydrolysis as the PVOH copolymer. Following these trends, a water-dispersible nonwoven web having specific solubility characteristics can be designed.

Surprisingly, as demonstrated in Example 8 herein, it was found that for a nonwoven web including a blend of fiber types, each fiber type having a sole fiber forming material, the solubility of the nonwoven web does not follow the rule of mixtures as would be expected for a blend of fiber types. Rather, for a nonwoven web including blend of two fiber types, when the two fiber types were provided in a ratio other than 1:1, the solubility of the nonwoven tended toward the solubility of the less soluble fiber (i.e., the that requires higher temperatures to completely dissolve, and dissolves more slowly at temperatures below the complete dissolution temperature). For nonwoven webs including 1:1 blends of fibers, the solubility of the nonwoven web was generally lower than the solubility of the nonwoven webs including blends other than 1:1 blends (i.e., at a given temperature, the nonwoven webs including the 1:1 blends took longer to rupture, disintegrate, and dissolve than the nonwoven webs including, e.g., 3:1 and 1:3 ratios of fiber types). This trend was especially pronounced at temperatures lower than the complete dissolution temperature of the less soluble fiber.

Inclusion of a water-insoluble fiber in a water-dispersible nonwoven web can also be used to design a nonwoven web having specific solubility and/or delayed release properties (e.g., when the nonwoven web is included in a water-dispersible pouch). Without intending to be bound by theory, it is believed that as the weight percent of water-insoluble fiber included in a nonwoven web is increased (based on the total weight of the nonwoven web), the solubility of the nonwoven web generally decreases and the delayed release properties of a pouch comprising a nonwoven web generally increase. Upon contact with water at a temperature at or above the solubility temperature of the water-soluble fiber, a nonwoven web comprising a water-soluble fiber and water-insoluble fiber will begin to thin as the water-soluble fiber dissolves, thereby breaking down the web structure and/or increasing the pore size of the pores of the nonwoven web. In general, the larger the break-down of the web structure or increase in the pore size, the faster the water can access the contents of the pouch and the faster the contents of the pouch will be released. Similarly, delayed release of the contents of a pouch comprising the water-dispersible nonwoven web of the disclosure can be achieved by using a blend of water-soluble fibers having different solubility properties and/or different solubility temperatures. In general, for nonwoven webs including water-soluble fibers comprising a polyvinyl alcohol fiber forming materials, at water temperatures of 50% or more of the complete dissolution temperature of the water-soluble fibers (e.g., at 40° C. for a fiber having a complete dissolution temperature of 70° C.), the fibers will undergo polymer network swelling and softening, but the overall structure will remain intact. In embodiments wherein the water-dispersible nonwoven web includes a water-soluble fiber and a water-insoluble fiber, the ratio of soluble fiber to insoluble fiber is not particularly limited. The water-soluble fiber can comprise about 1% to about 99%, about 20% to about 80%, about 40% to about 90%, about 50% to about 90%, or about 60% to about 90% by weight of the total weight of the fibers and the water-insoluble fiber can comprise about 1% to about 99%, about 20% to about 80%, about 10% to about 60%, about 10% to about 50%, or about 10% to about 40% by weight of the total weight of the fibers.

Further, as shown in Example 7, as the basis weight of the web increases the rate of dissolution of the web decreases, provided the fiber composition and bonding parameters remain constant, as there is more material to be dissolved. For example, at a given temperature, a water-soluble web prepared from fibers comprising PVOH polymer(s) and having a basis weight of, e.g., 40 g/m$^2$, is expected to dissolve slower than an otherwise-identical water-soluble web having a basis weight of, e.g., 30 g/m$^2$. This relationship was especially prominent when the temperature of the water for dissolution was lower than the complete dissolution temperature of the fibers that made up the nonwoven web. Accordingly, basis weight can also be used to modify the solubility characteristics of the water-dispersible nonwoven web. The water-dispersible nonwoven web can generally have any basis weight in a range of about 1 g/m$^2$ to about 700 $g/m^2$, about 1 $g/m^2$ to about 600 $g/m^2$, about 1 $g/m^2$ to about 500 $g/m^2$, about 1 $g/m^2$ to about 400 $g/m^2$, about 1 $g/m^2$ to about 300 $g/m^2$, about 1 $g/m^2$ to about 200 $g/m^2$, about 1 $g/m^2$ to about 100 $g/m^2$, about 30 $g/m^2$ to about 100 $g/m^2$, about 20 $g/m^2$ to about 100 $g/m^2$, about 20 $g/m^2$ to about 80 $g/m^2$, about 25 $g/m^2$ to about 70 $g/m^2$, or about 30 $g/m^2$ to about 70 $g/m^2$.

Additionally, calendar settings generally have a secondary impact on the solubility profile of a nonwoven web of the disclosure. As shown in Example 7, for nonwoven webs having identical fiber chemistry and similar basis weights, at a given calendar pressure, the solubility time of a nonwoven web generally increases with increasing calendar temperature. This relationship was especially prominent when the temperature of the water for dissolution was lower than the complete dissolution temperature of the fibers that made up the nonwoven web.

Without intending to be bound by theory, it is believed that solubility (in terms of time to dissolution, for example according to MSTM-205) of a water-soluble nonwoven web is expected to surpass that of a water-soluble film of the same size (L×W) and/or mass, prepared from the same PVOH polymer. This is due to the higher surface area found in the nonwoven compared to a film, leading to faster solubilization. As shown in the Examples, below, a nonwoven web prepared from a PVOH homopolymer having a degree of hydrolysis of 88% dissolves in 14 seconds, while a water-soluble film of similar size and prepared from the same PVOH homopolymer having a degree of hydrolysis of 88% dissolves in ~100 seconds.

The water-soluble fibers and water-insoluble fibers used to prepare the water-dispersible nonwoven webs of the disclosure can generally have any tenacity. The tenacity of the fiber correlates to the coarseness of the fiber. As the tenacity of the fiber decreases the coarseness of the fiber increases. Fibers used to prepare the water-dispersible nonwoven webs of the disclosure can have a tenacity in a range of about 1 to about 100 cN/dtex, or about 1 to about 75 cN/dtex, or about 1 to about 50 cN/dtex, or about 1 to about 45 cN/dtex, or about 1 to about 40 cN/dtex, or about 1 to about 35 cN/dtex, or about 1 to about 30 cN/dtex, or about 1 to about 25 cN/dtex, or about 1 to about 20 cN/dtex, or about 1 to about 15 cN/dtex, or about 1 to about 10 cN/dtex, or about 3 to about 8 cN/dtex, or about 4 to about 8 cN/dtex, or about 6 to about 8 cN/dtex, or about 4 to about 7 cN/dtex, or about 10 to about 20, or about 10 to about 18, or about 10 to about 16, or about 1 cN/dtex, about 2 cN/dtex, about 3 cN/dtex, about 4 cN/dtex, about 5 cN/dtex, about 6 cN/dtex, about 7 cN/dtex, about 8 cN/dtex, about 9 cN/dtex, about 10 cN/dtex, about 11 cN/dtex, about 12 cN/dtex, about 13 cN/dtex, about 14 cN/dtex, or about 15 cN/dtex. In embodiments including a first fiber having a blend of fiber forming materials including a first polyvinyl alcohol fiber forming material, the first fiber can have a tenacity in a range of about 3 cN/dtex to about 10 cN/dtex, optionally about 7 cN/dtex to about 10 cN/dtex, optionally about 4 cN/dtex to 8 about cN/dtex, or optionally about 6 cN/dtex to about 8 cN/dtex.

In embodiments wherein the water-soluble fibers are prepared from a wet cooled gel spinning process, the resulting fibers can generally have any tenacity as described herein. In refinements of the foregoing embodiment, the fibers can have a tenacity in a range of about 3 to about 15, about 3 to about 13, about 3 cN/dtex to about 10 cN/dtex, about 5 cN/dtex to about 10 cN/dtex, or about 6 cN/dtex to about 10 cN/dtex, about 7 cN/dtex to about 10 cN/dtex, about 4 cN/dtex to about 8 cN/dtex, or about 6 cN/dtex to about 8 cN/dtex. In embodiments including a first fiber having a blend of fiber forming materials including a first polyvinyl alcohol fiber forming material, wherein the first fiber is prepared from a wet cooled gel spinning process, the first fiber can have a tenacity in a range of about 3 cN/dtex to about 10 cN/dtex, optionally about 7 cN/dtex to about 10 cN/dtex, optionally about 4 cN/dtex to about 8 cN/dtex, or optionally about 6 cN/dtex to about 8 cN/dtex.

The tenacity of the nonwoven web can be the same or different from the tenacity of the fibers used to prepare the web. Without intending to be bound by theory, it is believed that the tenacity of the nonwoven web is related to the strength of the nonwoven web, wherein a higher tenacity provides a higher strength to the nonwoven web. In general, the tenacity of the nonwoven web can be modified by using fibers having different tenacities. The tenacity of the nonwoven web may also be affected by processing. In general, water-dispersible webs of the disclosure can have relatively high tenacities, i.e., the water-dispersible nonwoven web is a self-supporting web that can be used as the sole material for preparing an article and/or pouch. In contrast, nonwoven webs prepared according to melt blown, electro-spinning, and/or rotary spinning processes typically have low tenacities, and may not be self-supporting or capable of being used as a sole web for forming an article or pouch.

In general, the coefficient of dynamic friction and the ratio of the coefficient of static friction to the coefficient of dynamic friction for a nonwoven web of the disclosure will be lower than the coefficient of dynamic friction and the ratio of the coefficient of static friction to the coefficient of dynamic friction for a water-soluble film due to the increased surface roughness of the nonwoven web relative to a water-soluble film, which provides decreased surface contact to the nonwoven web. Advantageously, this surface roughness can provide an improved feel to the consumer (i.e., a cloth-like hand-feel instead of a rubbery hand-feel), improved aesthetics (i.e., less glossy than a water-soluble film), and/or facilitate processability in preparing thermoformed, and/or vertical formed, filled, and sealed, and/or multichamber packets which require drawing the web along a surface of the processing equipment/mold. Accordingly, the fibers should be sufficiently coarse to provide a surface roughness to the resulting nonwoven web without being so coarse as to produce drag.

The fibers used to prepare the nonwoven webs of the disclosure can generally have any fineness. The fineness of the fiber correlates to how many fibers are present in a cross-section of a yarn of a given thickness. Fiber fineness is the ratio of fiber mass to length. The main physical unit of fiber fineness is 1 tex, which is equal to 1000 m of fiber weighing 1 g. Typically, the unit dtex is used, representing 1 g/10,000 m of fiber. The fineness of the fiber can be selected to provide a nonwoven web having suitable stiffness/hand-feel of the nonwoven web, torsional rigidity, reflection and interaction with light, absorption of dye and/or other actives/additives, ease of fiber spinning in the manufacturing process, and uniformity of the finished article. In general, as the fineness of the fibers increases the nonwovens resulting therefrom demonstrate higher uniformity, improved tensile strengths, extensibility and luster. Additionally, without intending to be bound by theory it is believed that finer fibers will lead to slower dissolution times as compared to larger fibers based on density. Further, without intending to be bound by theory, when a blend of fibers is used, the average fineness of the fibers can be determined using a weighted average of the individual fiber components. Fibers can be characterized as very fine (dtex≤1.22), fine (1.22≤dtex≤1.54), medium (1.54≤dtex≤1.93), slightly coarse (1.93≤dtex≤2.32), and coarse (dtex≥2.32). The nonwoven web of the disclosure can include fibers that are very fine, fine, medium, slightly coarse, or a combination thereof.

The shape of the fibers used to prepare the nonwoven webs of the disclosure is not particularly limited and can have cross-sectional shapes including, but not limited to, round, oval (also referred to as ribbon), triangular (also referred to as delta), trilobal, and/or other multi-lobal shapes. It will be understood that the shape of the fiber need not be perfectly geometric, for example, a fiber having a round cross-sectional shape need not have a perfect circle as the cross-sectional area, and a fiber having a triangular cross-sectional shape generally has rounded corners.

It will be understood that the diameter of a fiber refers to the cross-section diameter of the fiber along the longest cross-sectional axis. When a fiber is described as having (or not having) a particular diameter, unless specified otherwise, it is intended that the specified diameter is the average diameter for the specific fiber type referenced, i.e., a plurality of fibers prepared from polyvinyl alcohol fiber forming material has an arithmetic average fiber diameter over the plurality of fibers. For shapes not typically considered to have a "diameter", e.g., a triangle or a multi-lobal shape, the diameter refers to the diameter of a circle circumscribing the fiber shape.

The water-soluble fibers and water-insoluble fibers used to prepare the water-dispersible nonwoven webs of the disclosure typically have a diameter in a range of about 10 micron to 300 micron, for example, at least 10 micron, at least 25 micron, at least 50 micron, at least 100 micron, or at least 125 micron and up to about 300 micron, up to about 275 micron, up to about 250 micron, up to about 225 micron, or up to about 200 micron. In embodiments, the water-soluble fibers used to prepare the nonwoven webs of the disclosure can have a diameter greater than 100 micron to about 300 micron. In embodiments, the fibers of the disclosure can have a diameter in a range of about 10 to about 300 micron, about 25 to about 300 micron, about 50 to about 300 micron, greater than 100 micron to about 300 micron, or about 75 to about 100 micron. In embodiments, the diameters of the plurality of the water-soluble fibers used to prepare the nonwoven webs of the disclosure have diameters that are substantially uniform. Without intending to be bound by theory, it is believed that during the wet cooled gel spinning process, the drawing of the water-soluble polymer mixture can be used to control the diameter of the resulting fibers, as well as the uniformity of the diameter size of the resulting fibers. In embodiments wherein a first fiber includes a blend of fiber forming materials including a first polyvinyl alcohol fiber forming material, the first fibers have a diameter in a range of about 10 micron to about 300 micron, about 50 micron to about 300 micron, or greater than 100 micron to about 300 micron. In embodiments wherein a first fiber includes a blend of fiber forming materials including a first polyvinyl alcohol fiber forming material, the first fibers have diameters that are substantially uniform.

The water-soluble fibers and water-insoluble fibers used to prepare the nonwoven webs of the disclosure can generally be of any length. In embodiments, the length of the water-soluble fibers can be in a range of about 30 mm to about 100 mm, about 10 mm to about 60 mm, or about 30 mm to about 60 mm, for example, at least about 30 mm, at least about 35 mm, at least about 40 mm, at least about 45 mm, or at least about 50 mm, and up to about 100 mm, up to about 95 mm, up to about 90 mm, up to about 80 mm, up to about 70 mm, or up to about 60 mm. In embodiments, the length of the water-soluble fibers can be less than about 30 mm or in a range of about 0.25 mm to less than about 30 mm, for example, at least about 0.25 mm, at least about 0.5 mm, at least about 0.75 mm, at least about 1 mm, at least about 2.5 mm, at least about 5 mm, at least about 7.5 mm, or at least about 10 mm and up to about 29 mm, up to about 28 mm, up to about 27 mm, up to about 26 mm, up to about 25 mm, up to about 20 mm, or up to about 15 mm. In embodiments wherein a first fiber includes a blend of fiber forming materials including a first polyvinyl alcohol fiber forming material, the first fibers have a length in a range of about 30 mm to about 100 mm, or about 30 mm to about 60 mm, or less than about 30 mm, or in a range of about 0.25 mm to less than 30 mm. The water-soluble fibers can be prepared to any length by cutting and/or crimping the extruded water-soluble polymer mixture prepared using the wet cooled gel spinning process. In contrast, processes such as spun bond, melt blown, electro-spinning, and rotary spinning are continuous processes wherein a continuous filament is prepared and provided directly into a web form. Accordingly, such processes provide no opportunity for cutting the filament into a desired fiber length.

Figure 3:
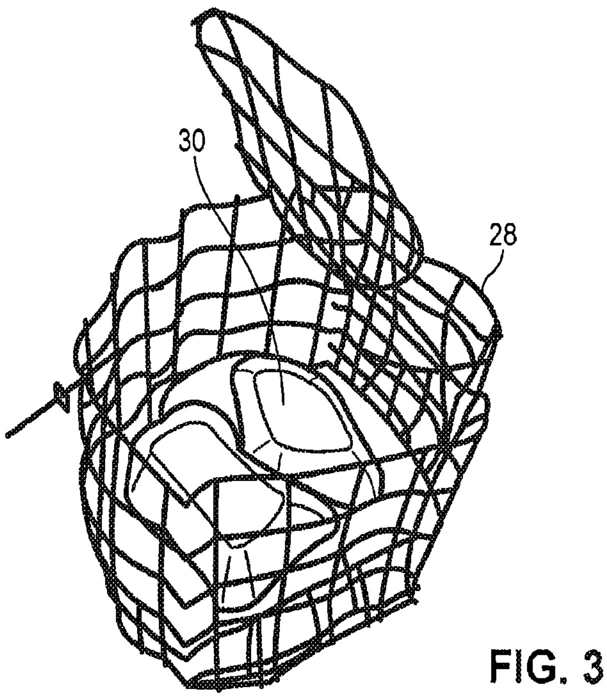
FIG. 3 is an illustration of a wire frame cage (shown with the top open, to better illustrate water-soluble pouches contained therein) for use in the Liquid Release Test described herein.
Figure 5A:
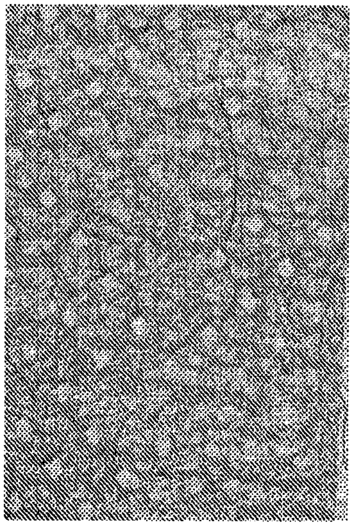
FIG. 5A is a micrograph image of a nonwoven web of the disclosure having a softness rating of 1.
Figure 5B:
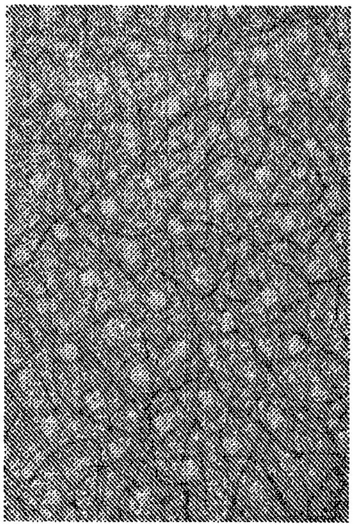
FIG. 5B is a micrograph image of a nonwoven web of the disclosure having a softness rating of 5.

The water-soluble fibers and water-insoluble fibers used to prepare the nonwoven webs of the disclosure can generally have any length to diameter (L/D) ratio. Advantageously, the tactility of a nonwoven web of the disclosure can be controlled using the L/D ratio of the fibers and the respective amounts of fibers having various L/D ratios in the nonwoven composition. In general, as the L/D of the fiber decreases, the stiffness and resistance to bending increases, providing a rougher hand feel. The fibers of the disclosure generally impart a rough feel to a nonwoven web including same, when the fibers have a low L/D ratio in a range of about 0.5 to about 15, or about 0.5 to about 25, or about 1 to about 5. Such low L/D fibers can be provided in a nonwoven web in an amount in a range of about 0 to about 50% by weight, based on the total weight of the fibers in the nonwoven web, for example, in a range of about 0.5 wt. % to about 25 wt. %, or about 1 wt. % to about 15 wt. %. If the amount of low L/D fibers in a nonwoven web is not known, the amount can be estimated by visual inspection of a micrograph of a nonwoven web. As shown in FIG. 3, the population of fibers having a visibly larger diameter and shorter cut rate, based on the total fiber population can be observed. FIG. 5A is a micrograph of a nonwoven web having 0% of low L/D fibers and a softness rating of 1, whereas FIG. 5B is a micrograph of a nonwoven web having 25% of low L/D fibers and a softness rating of 5. In embodiments wherein a first fiber includes a blend of fiber forming materials including a first polyvinyl alcohol fiber forming material, at least a portion of the first fibers can have a L/D ratio of about 0.5 to about 25, or about 0.5 to about 15, or about 1 to about 5.

The wet cooled gel spinning process advantageously provides one or more benefits such as providing a fiber that includes a blend of water-soluble polymers, providing control over the diameter of the fibers, providing relatively large diameter fibers, providing control over the length of the fibers, providing control over the tenacity of the fibers, providing high tenacity fibers, providing fibers from polymers having a large degree of polymerization, providing fibers which can be used to provide a self-supporting nonwoven web, and/or providing fibers from a broader range of materials than can be used in traditional thermal extrusion techniques (e.g., melt blown and spun bond), for example, using higher molecular weight polymers and/or polymers with higher melting points/melt viscosities than can be used with the traditional thermal extrusion techniques. Continuous processes such as spun bond, melt blown, electro-spinning and rotary spinning generally do not allow for blending of water-soluble polymers (e.g., due to difficulties matching the melt index of various polymers), forming large diameter (e.g., greater than 50 micron) fibers, controlling the length of the fibers, providing high tenacity fibers, and the use of polymers having a high degree of polymerization. A comparison of the various processes is provided in the table below:

| | | | | | | Fiber/nonwoven parameters | | | | |
|---|---|---|---|---|---|---|---|---|---|---|
| Nonwoven process | | Fiber form | Bonding | Material | Nonwoven property | polymer | fiber diameter | fiber length | fiber tenacity | Nonwoven tenacity |
| Non-direct process | Wet cooled gel spinning | staple, shortcut, pulp | thermal, mechanical, chemical | solvent-soluble polymer/ thermo-plastic polymer | Possible to blend polymers into single fiber<br>Possible to blend different fibers<br>Possible to adjust property by process (physical property, solubility, thickness, density)<br>Uniform fiber structure<br>High physical strength | Any water-soluble polymer or blend thereof<br>Available to polymers with high DP such as greater than or equal to 1000<br>Can be PVOH homopolymer or copolymer | 10-300 µm: Uniform diameter<br>Easy to control to obtain diameter desired for specific application | Any length 0.25 mm-100 mm filament (i.e., not cut to a specific size)<br>Fibers provide better disintegrablility than filaments<br>Controllable | High tenacity | High tenacity controllable self-supporting |
| Direct process | Spun bond | filament | thermal, chemical | solvent-soluble polymer/ thermo-plastic polymer | High tenacity<br>Faster production speed | Limited viscosity for melt spinning: degree of polymerization of 200-500<br>Lower DP than 200 is not available because its viscosity is too low.<br>Higher DP than 500 is not available because its viscosity is too high.<br>PVOH homopolymers do not have thermal stability required.<br>PVOH copolymers with about 25 mol % or greater modification is not desirable because the solubility is too low.<br>Wet spun bond of water-soluble PVOH is not industrially achievable | 1-50 µm Cannot control/ modify diameter during processing | Filament | Low | Relatively high |
| | Melt blown | filament | thermal, chemical | thermo-plastic polymer | Thin, soft, flexible<br>High surface area, small pore size<br>Breathable | | | | | Relatively low |
| | Electro spinning, Rotary spinning | filament | thermal, chemical | solvent-soluble polymer/ thermo-plastic polymer | Thin, soft, flexible<br>Very high surface area, small pore size<br>Breathable | | 1 nm-1 µm Cannot control/ modify diameter during processing | Filament, (spherical or short length in some cases) relatively un-uniform | very low | Very low. not self-supporting |

※Non-direct process: fiber is wound after spinning and formed into shortcut or staple, and then it is processed into web ※Direct process: web is made directly from spinning process In embodiments, the nonwoven web of the disclosure can include a plurality of water-soluble fibers prepared by a wet cooled gel spinning process in combination with a continuous filament prepared by a continuous process selected from the group consisting of melt blowing, spun bonding, electrospinning, rotary spinning, continuous filament producing operations, tow fiber producing operations, and combinations of one or more of the foregoing processes. A water-dispersible nonwoven web including a plurality of water-soluble fibers prepared by a wet cooled gel spinning process and a filament prepared by a continuous process can be formed using an in-line process. For example, a first nonwoven web of fibers can be prepared and then the prepared web can proceed under a second station where filaments are prepared by a continuous process and then deposited on the nonwoven web prepared from the fibers. The first nonwoven web prepared from the fibers can be bonded before or after the filaments are provided on first nonwoven web. As used herein, "filament" refers to the extruded product of a water-soluble polymer mixture prepared from a continuous process, wherein the extruded product does not have a defined length range. The use of filament over fiber is not intended to convey any information regarding a specific length. For example, a fiber can have any length, theoretically up to or greater than the length of a filament prepared from a continuous process. Thus, as used herein, filament and fiber are intended to distinguish a product that has a defined length range (i.e., fiber) from a product that does not have a defined length range (i.e., filament).

A water-dispersible nonwoven web including a plurality of water-soluble fibers prepared by a wet cooled gel spinning process and a filament/fiber prepared by a continuous process can also be formed using an indirect process. Melt blown fibers prepared on the nano- or micro-scale can be prepared and mixed with the plurality of water-soluble fibers prepared by the wet cooled gel spinning process prior to bonding of the fibers prepared by the wet cooled gel spinning process. Such a blend of fibers can provide a water-dispersible nonwoven web having improved mechanical strength (relative to an equivalent water-dispersible nonwoven web prepared with the water-soluble fibers prepared by the wet cooled gel spinning process alone) and stability which can be advantageous, for example, in preparing a wipe (e.g., a cleaning wipe, a personal care wipe, and the like). In general, the blend of water-soluble fibers prepared by the wet cooled gel spinning process and melt blown fibers can include the melt blown fibers in an amount of about 50 wt. % or less, based on the total weight of the total fibers, for example, in a range of about 1 wt. % to about 50 wt. %, about 5 wt. % to about 50 wt. %, about 10 wt. % to about 40 wt. %, about 15 wt. % to about 30 wt. %, about 20 wt. % to about 30 wt %, for example, about 1 wt. %, about 5 wt. %, about 10 wt. %, about 15 wt. %, about 20 wt. %, about 25 wt. %, about 30 wt. %, about 40 wt. %, or about 50 wt. %, based on the total weight of the total fibers. The blend of water-soluble fibers prepared by the wet cooled gel spinning process and melt blown fibers can be bonded using any suitable bonding method known in the art, such as the physical and chemical bonding processes described herein.

Water-soluble fibers can be characterized by a water-breaking temperature. The "water-breaking temperature" refers to the lowest temperature necessary for complete dissolution in practical applications as estimated using the following method: 100 mm length of water-soluble fibers are placed in a water solution of initial temperature of 1.5° C. under a load of 1 mg/dtex; the temperature of the water solution is increased systematically as a function of time (1.5° C. every 2.5 min until the breaking temperature is achieved); upon the fiber breaking under the load of 2 mg/dtex, the water temperature is recorded and reported as the water breaking temperature. Water-soluble fibers can also be characterized by a complete dissolution temperature, as described in the Method for Determining Single Fiber Solubility described herein.

Advantageously, the nonwoven webs of the disclosure can demonstrate preferential shrinking in the presence of heat and/or water (e.g., humidity). Accordingly, the nonwoven webs can be heat and/or water shrunk when formed into packets. Further advantageously, the nonwoven webs of the disclosure can demonstrate increased robustness (i.e., mechanical properties) and improved solubility performance after storage in high heat and moisture environments (e.g., 38° C. and 80% relative humidity (RH)). Such increased robustness and improved solubility performance is surprising as the expectation based on compositionally similar water-soluble films is that the robustness and solubility performance would be unaffected by storage in high heat and moisture conditions. In particular, after removal of comparable water-soluble films from a conditioning environment, the water-soluble films will re-equilibrate with the surrounding environment leading to no long term or permanent changes in the performance properties of the films.

The nonwoven web of the disclosure can be used as a single layer or can be layered with other nonwoven webs and/or water-soluble films. In some embodiments, the water-dispersible nonwoven web includes a single layer of water-dispersible nonwoven web. In some embodiments, the water-dispersible nonwoven web is a multilayer water-dispersible nonwoven web comprising two or more layers of water-dispersible nonwoven webs. The one or more layers can be laminated to each other. In refinements of the foregoing embodiment, the two or more layers can be the same (e.g., be prepared from the same fibers and basis weight). In refinements of the foregoing embodiment, the two or more layers can be different (e.g., be prepared from different types of fibers and/or have different basis weights). In embodiments, the nonwoven web can be laminated to a water-soluble film. In refinements of the foregoing embodiments, the nonwoven web and water-soluble film can be prepared from the same polymer (e.g., a PVOH polymer having a specific viscosity, degree of hydrolysis, and amount of modification if a modified polymer). In refinements of the foregoing embodiments, the nonwoven web and water-soluble film can be prepared from different polymers (e.g., the polymer used to prepare the fibers of the nonwoven web can have different fiber chemistries (e.g., modifications), viscosities, degree of polymerization, degree of hydrolysis and/or solubility than the polymer that makes up the water-soluble film). Advantageously, multilayered nonwoven webs and laminates can be used to tune the moisture vapor transmission rate (MVTR) of a pouch or packet made therefrom. Multilayer materials can be prepared according to various processes known in the art, for example, melt extrusion, coating (e.g., solvent coating, aqueous coating, or solids coating), spray adhesion, material transfer, hot lamination, cold lamination, and combinations thereof.

In embodiments, the nonwoven web can be a multilayer nonwoven web comprising a first nonwoven web comprising a plurality of fibers, the plurality of fibers comprising a first fiber comprising a blend of fiber forming materials including a first polyvinyl alcohol fiber forming material and (a) a second polyvinyl alcohol fiber forming material or (b) the blend of fiber forming materials does not include carboxymethyl cellulose, hydroxypropyl methylcellulose, or starch. In refinements of the foregoing embodiment, the multilayer nonwoven web can include a second nonwoven web comprising a plurality of fibers, the plurality of fibers comprising a second fiber comprising a blend of fiber forming materials including a third polyvinyl alcohol fiber forming material and (a) a fourth polyvinyl alcohol fiber forming material or (b) the blend of fiber forming materials does not include carboxymethyl cellulose, hydroxypropyl methylcellulose, or starch. In refinements of the foregoing embodiments, the first and second nonwoven webs can include the same fibers and have the same basis weights. In alternate refinements of the foregoing embodiments, the first and second nonwoven webs can include different fibers and have the same basis weights. In alternate refinements of the foregoing embodiments, the first and second nonwoven webs can include different fibers and have different basis weights. In refinements of the foregoing embodiments, the first and second nonwoven webs can be laminated to each other. In refinements of the foregoing embodiments, the first nonwoven web can have a water-soluble film laminated thereto. In refinements of the foregoing embodiment, the fiber forming materials of the first fibers of the first nonwoven web can be the same material as the film forming material of the water-soluble film. In an alternate embodiment, the fiber forming materials of the first fibers of the first nonwoven web can be a different material as the film forming material of the water-soluble film.

In general, a multilayer nonwoven web can have a basis weight that is the sum of the basis weights of the individual layers. Accordingly, a multilayer nonwoven web will take longer to dissolve than any of the individual layers provided as a single layer. In embodiments, the multilayer nonwoven can have a basis weight in a range of about 1 g/m$^2$ to about 100 g/m$^2$. Additionally, without intending to be bound by theory, it is believed that when pore sizes and pore arrangements are heterogeneous between layers, the pores in each layer will not align, thereby providing a multilayer nonwoven web having smaller pores than the individual layers. Accordingly, a nonporous water-dispersible nonwoven web can be prepared by layering multiple porous water-dispersible nonwoven webs.

The nonwoven web can also be laminated to a water-soluble film. The laminate can be formed using any known methods in the art including, but not limited to heat and pressure, chemical bonding, and/or solvent welding. Chemical bonding can include ionically or covalently functionalizing a surface of the nonwoven web and/or a surface of the water-soluble film such that when the surface of the nonwoven web comes in contact with the surface of the water-soluble film a chemical reaction occurs and covalently bonds the nonwoven web and water-soluble film together. The multilayer nonwoven web can include three or more layers. In embodiments, the multilayer nonwoven web can include a first layer comprising a water-soluble film, a second layer comprising a nonwoven web, and a third layer comprising a water-soluble film. In embodiments, the multilayer nonwoven web can include a first layer comprising a nonwoven web, a second layer comprising a water-soluble film, and a third layer comprising a nonwoven web.

Advantageously, the laminate can be prepared concurrently with pouch formation, e.g., using the heat applied during thermoforming to bond the nonwoven web and water-soluble film layers together. The water-soluble film can have the same solubility and/or chemical compatibility characteristics as the nonwoven web or the water-soluble film can have different solubility and/or chemical compatibility characteristics from the nonwoven web. In embodiments, the water-soluble film has the same solubility and/or chemical compatibility characteristics as the nonwoven web. In some embodiments, the water-soluble film has different solubility and/or chemical compatibility characteristics from the nonwoven web. Advantageously, when the water-soluble film has different solubility and/or chemical compatibility characteristics from the nonwoven web the laminate can be used to form a pouch having an interior surface with a first solubility and/or chemical compatibility and an exterior surface having a second solubility and/or chemical compatibility.

The water-soluble film used for a laminate can generally be any water-soluble film, e.g. one previously known in the art. The polymer used to form the water-soluble film can be any water-soluble polymer, or combination thereof, e.g. one described herein. The water-soluble film can contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of a water-soluble polymer, e.g., a PVOH polymer or polymer blend.

The water-soluble film can contain other auxiliary agents and processing agents, such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Embodiments including plasticizers are preferred. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt % of the film, individually or collectively.

The plasticizer can include, any plasticizer disclosed herein, for example, including but not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol (MPDiol®), ethanolamines, and a mixture thereof. A preferred plasticizer is glycerin, sorbitol, triethyleneglycol, propylene glycol, dipropylene glycol, 2-methyl-1,3-propanediol, trimethylolpropane, or a combination thereof. The total amount of the non-water plasticizer can be in a range of about 10 wt. % to about 40 wt. %, or about 15 wt. % to about 35 wt. %, or about 20 wt. % to about 30 wt. %, for example about 25 wt. %, based on total film weight.

Suitable surfactants can include the nonionic, cationic, anionic and zwitterionic classes. Suitable surfactants include any surfactant described herein. In various embodiments, the amount of surfactant in the water-soluble film is in a range of about 0.1 wt % to 2.5 wt %, optionally about 1.0 wt % to 2.0 wt %. In embodiments, the amount of surfactant in the water-soluble film is expressed in parts per 100 parts total water-soluble polymer (phr) in the water-soluble film and is present in a range of about 0.5 phr to about 4 phr, about 0.75 phr to about 3.0 phr, about 1.0 phr to about 2.5 phr, about 1.0 phr to about 2.0 phr, or about 1.5 phr.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. In one type of embodiment, the amount of lubricant/release agent in the water-soluble film is in a range of about 0.02 wt % to about 1.5 wt %, optionally about 0.1 wt % to about 1 wt %.

Fillers can be included in the water-soluble films and can include bulking agents, extenders, antiblocking agents, detackifying agents and combinations thereof. Suitable fillers/bulking agents/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc, mica, stearic acid and metal salts thereof, for example, magnesium stearate. Preferred materials are starches, modified starches and silica. In one type of embodiment, the amount of filler/extender/antiblocking agent/detackifying agent in the water-soluble film can be in a range of about 1 wt. % to about 6 wt. %, or about 1 wt. % to about 4 wt. %, or about 2 wt. % to about 4 wt. %, or about 1 phr to about 6 phr, or about 1 phr to about 4 phr, or about 2 phr to about 4 phr, for example.

In some embodiments, the water-soluble film can include 2 or more phr (e.g., 2 phr to 6 phr or 2 phr to 4 phr) of a filler. In some embodiments, the film includes 2 or more phr (e.g., 2 phr to 6 phr or 2 phr to 4 phr) of a filler and the filler includes a bulking agent, an antiblocking agent, or a combination thereof. Without intending to be bound by theory, it is believed that the inclusion of 2 or more phr (e.g., 2 phr to 6 phr or 2 phr to 4 phr) of a filler can be useful to prevent weeping or migration of plasticizer out of the film, when the plasticizer is included in an amount of greater than or equal to 30 phr, for example, in a range of 30 phr to 50 phr.

An anti-block agent (e.g. $SiO_2$ and/or stearic acid)) can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR.

A suitable median particle size for the anti-block agent includes a median size (e.g. Dv50) in a range of about 3 to about 11 microns, or about 4 microns to about 11 microns, or about 4 to about 8 microns, or about 5 to about 6 microns, for example 5, 6, 7, 8, or 9 microns. A suitable $SiO_2$ is an untreated synthetic amorphous silica designed for use in aqueous systems.

The water-soluble film can further have a residual moisture content of at least 4 wt. %, for example in a range of about 4 to about 10 wt. %, as measured by Karl Fischer titration.

The water-dispersible nonwoven web can be made by any suitable method, including carding, as is well known in the art as described in Nonwoven Fabrics Handbook, prepared by Ian Butler, edited by Subhash Batra et al., Printing by Design, 1999, herein incorporated by reference in its entirety. The water-soluble films can be made by any suitable method, including a solution casting method. The water-dispersible nonwoven web and/or laminate can be used to form a container (pouch) by any suitable process, including vertical form, fill, and sealing (VFFS), or thermoforming. The water-dispersible nonwoven web and/or laminate can be sealed by any suitable process including, for example, solvent sealing or heat sealing of the water-dispersible nonwoven web and/or laminate layers, e.g., around a periphery of a container. The pouches can be used for dosing materials to be delivered into bulk water, for examples.

Biodegradability

Polyvinyl alcohol polymers are generally biodegradable as they decompose in the presence of water and enzymes under aerobic, anaerobic, soil, and compost conditions (in the presence of water). In general, as the degree of hydrolysis of a polyvinyl alcohol polymer increases up to about 80%, the biodegradation activity of the polyvinyl alcohol polymer increases. Without intending to be bound by theory, it is believed that increasing the degree of hydrolysis above 80% does not appreciably affect biodegradability. Additionally, the stereoregularity of the hydroxyl groups of polyvinyl alcohol polymers has a large effect on the biodegradability activity level and the more isotactic the hydroxyl groups of the polymer sequence, the higher degradation activity becomes. Without intending to be bound by theory, for soil and/or compost biodegradation it is believed that a nonwoven web prepared from a polyvinyl alcohol fiber will have higher biodegradation activity levels relative to a water-soluble film prepared from a similar polyvinyl alcohol polymer, due to the increase in the polymer surface area provided by the nonwoven web, relative to a film. Further, without intending to be bound by theory, it is believed that while the degree of polymerization of the polyvinyl alcohol polymer has little to no effect on the biodegradability of a film or nonwoven web prepared with the polymer, the polymerization temperature may have an effect on the biodegradability of a film or nonwoven because the polymerization temperature can affect the crystallinity and aggregating status of a polymer. In particular as the crystallinity decreases, the polymer chain hydroxyl groups become less aligned in the polymer structure and the polymer chains become more disordered allowing for chains to accumulate as amorphous aggregates, thereby decreasing availability of ordered polymer structures such that the biodegradation activity is expected to decrease for soil and/or compost biodegradation mechanisms wherein the polymer is not dissolved. Without intending to be bound by theory, it is believed that because the stereoregularity of the hydroxyl groups of polyvinyl alcohol polymers has a large effect on biodegradability activity levels, the substitution of functionalities other than hydroxyl groups (e.g., anionic AMPS functional groups, carboxylate groups, or lactone groups) is expected to decrease the biodegradability activity level, relative to a polyvinyl alcohol homopolymer having the same degree of hydrolysis, unless the functional group itself is also biodegradable, in which case biodegradability of the polymer can be increased with substitution. Further, it is believed that while the biodegradability activity level of a substituted polyvinyl alcohol can be less than that of the corresponding homopolymer, the substituted polyvinyl alcohol will still exhibit biodegradability.

Methods of determining biodegradation activity are known in the art, for example, as described in Chiellini et al., Progress in Polymer Science, Volume 28, Issue 6, 2003, pp. 963-1014, which is incorporated herein by reference in its entirety. Further methods and standards can be found in ECHA's Annex XV Restriction Report—Microplastics, Version number 1, Jan. 11, 2019, which is incorporated herein by reference in its entirety. Suitable standards include OECD 301B (ready biodegradability), OECD 301B (enhanced biodegradation), OECD 302B (inherent biodegradability), OECD 311 (anaerobic), ASTM D5988 (soil).

In embodiments, the fibers and nonwoven webs of the disclosure can be of the standard ready biodegradation, enhanced biodegradation, or inherent biodegradation. As used herein, the term "ready biodegradation" refers to a standard that is met if the material (e.g., a fiber) reached 60% biodegradation (mineralization) within 28 days of the beginning of the test, according to the OECD 301B test as described in said ECHA's Annex XV. As used herein, the term "enhanced biodegradation" refers to a standard that is met if the material (e.g., a fiber) reaches 60% biodegradation within 60 days from the beginning of the test, according to the OECD 301B test as described in said ECHA's Annex XV. In embodiments, the fibers and nonwoven webs of the disclosure meet the standards of ready biodegradation. In embodiments, the fibers and nonwoven webs of the disclosure meet the standards of ready biodegradation or enhanced degradation. In embodiments, the fibers and nonwoven webs of the disclosure meet the standards of inherent biodegradation. In embodiments, the fibers and nonwoven webs of the disclosure meet the standards of enhanced degradation. In embodiments, the fibers and nonwoven webs of the disclosure meet the standards of inherent biodegradation, enhanced biodegradation, or ready biodegradation. In embodiments, the laminate (nonwoven and film) of the disclosure meet the standards of ready biodegradation or enhanced biodegradation.

Uses

The nonwoven webs of the disclosure are generally suitable for a variety of commercial applications. Suitable commercial applications for the nonwoven webs of the disclosure can include, but are not limited to, water-dispersible or flushable pouches and packets; medical uses such as surgical masks, medical packaging, shoe covers, wound dressing, and drug delivery; filtration systems such as for gasoline and oil, mineral processing, vacuum bags, air filters, and allergen membranes or laminates; personal care products such as for baby wipes, makeup removing wipes, exfoliating clothes, and makeup applicators; office products such as shopping bags or envelopes; and others such as lens cleaning wipes, cleanroom wipes, potting material for plants, antibacterial wipes, agricultural seed strips, fabric softener sheets, garment/laundry bags, food wrapping, floor care wipes, pet care wipes, polishing tools, dust removal, and hand cleaning.

Sealed Pouches

The disclosure further provides a pouch comprising a nonwoven web according to the disclosure. In some embodiments, the pouch can include a laminate comprising a water-soluble film and a water-dispersible nonwoven web of the disclosure. The pouch can be a water-dispersible pouch, optionally a water-soluble pouch and/or a flushable pouch. The disclosure further provides a method of preparing a packet comprising a nonwoven web of the disclosure, the method comprising forming a nonwoven web into the form of a pouch, filling the pouch with a composition to be enclosed therein, and sealing the pouch to form a packet. In some embodiments, sealing includes heat sealing, solvent welding, adhesive sealing, or a combination thereof.

The nonwoven webs and laminates disclosed herein are useful for creating a sealed article in the form of a pouch defining an interior pouch volume to contain a composition therein for release into an aqueous environment. A "sealed article" optionally encompasses sealed compartments having a vent hole, for example, in embodiments wherein the compartment encloses a solid that off-gasses, but more commonly will be a completely sealed compartment.

The pouches may comprise a single compartment or multiple compartments. A water-dispersible pouch can be formed from two layers of water-dispersible nonwoven web or laminate sealed at an interface, or by a single nonwoven web or laminate that is folded upon itself and sealed. The nonwoven web or laminate forms at least one side wall of the pouch, optionally the entire pouch, and preferably an outer surface of the at least one sidewall. In another type of embodiment, the nonwoven web or laminate forms an inner wall of the packet, e.g. as a dividing wall between compartments. The nonwoven web or laminate can also be used in combination with a water-soluble film, e.g., as an exterior wall, inner wall, and/or compartment lid.

The composition enclosed in the pouch is not particularly limited, for example including any of the variety of compositions described herein. In embodiments comprising multiple compartments, each compartment may contain identical and/or different compositions. In turn, the compositions may take any suitable form including, but not limited to liquid, solid, gel, paste, mull, pressed solids (tablets) and combinations thereof (e.g. a solid suspended in a liquid).

In some embodiments, the pouches comprise multiple compartments. The multiple compartments are generally superposed such that the compartments share a partitioning wall interior to the pouch. The compartments of multi-compartment pouches may be of the same or different size(s) and/or volume(s). The compartments of the present multi-compartment pouches can be separate or conjoined in any suitable manner. In embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, the second and/or third and/or subsequent compartments are orientated side-by-side or in concentric orientations. The compartments may be packed in a string, each compartment being individually separable by a perforation line. Hence each compartment may be individually torn-off from the remainder of the string by the end-user. In some embodiments, the first compartment may be surrounded by at least the second compartment, for example in a tire-and-rim configuration, or in a pouch-in-a-pouch configuration.

The geometry of the compartments may be the same or different. In embodiments the optionally third and subsequent compartments each have a different geometry and shape as compared to the first and second compartment. In these embodiments, the optionally third and subsequent compartments are arranged in a design on the first or second compartment. The design may be decorative, educative, or illustrative, for example to illustrate a concept or instruction, and/or used to indicate origin of the product.

Methods of Making Pouches

Pouches and packets may be made using any suitable equipment and method. For example, single compartment pouches may be made using vertical form filling, horizontal form filling, or rotary drum filling techniques commonly known in the art. Such processes may be either continuous or intermittent. The nonwoven web, layered nonwoven web and film, or laminate structure may be dampened, and/or heated to increase the malleability thereof. The method may also involve the use of a vacuum to draw the nonwoven web, layered nonwoven web and film, or laminate structure into a suitable mold. The vacuum drawing the nonwoven web or laminate into the mold can be applied for about 0.2 to about 5 seconds, or about 0.3 to about 3, or about 0.5 to about 1.5 seconds, once the nonwoven web, layered nonwoven web and film, or laminate structure is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 ml to 150 ml, or about 20 ml to about 100 ml, and that the mold sizes are adjusted accordingly.

Thermoforming

A thermoformable nonwoven web or laminate is one that can be shaped through the application of heat and a force. Thermoforming a nonwoven web, layered nonwoven web and film, or laminate structure is the process of heating the nonwoven web, layered nonwoven web and film, or laminate structure, shaping it (e.g. in a mold), and then allowing the resulting nonwoven web or laminate to cool, whereupon the nonwoven web or laminate will hold its shape, e.g. the shape of the mold. The heat may be applied using any suitable means. For example, the nonwoven web or laminate may be heated directly by passing it under a heating element or through hot air, prior to feeding it onto a surface or once on a surface. Alternatively, it may be heated indirectly, for example by heating the surface or applying a hot item onto the nonwoven web or laminate. In embodiments, the nonwoven web or laminate is heated using an infrared light. The nonwoven web or laminate may be heated to a temperature in a range of about 50° C. to about 200° C., about 50° C. to about 170° C., about 50° C. to about 150° C., about 50° C. to about 120° C., about 60° C. to about 130° C., about 70° C. to about 120° C., or about 60° C. to about 90° C. Thermoforming can be performed by any one or more of the following processes: the manual draping of a thermally softened nonwoven web or laminate over a mold, or the pressure induced shaping of a softened nonwoven web or laminate to a mold (e.g., vacuum forming), or the automatic high-speed indexing of a freshly extruded sheet having an accurately known temperature into a forming and trimming station, or the automatic placement, plug and/or pneumatic stretching and pressuring forming of a nonwoven web or laminate.

Alternatively, the nonwoven web or laminate can be wetted by any suitable means, for example directly by spraying a wetting agent (including water, a polymer composition, a plasticizer for the nonwoven web or laminate composition, or any combination of the foregoing) onto the nonwoven web or laminate, prior to feeding it onto the surface or once on the surface, or indirectly by wetting the surface or by applying a wet item onto the nonwoven web or laminate.

Once a nonwoven web or laminate has been heated and/or wetted, it may be drawn into an appropriate mold, preferably using a vacuum. The filling of the molded nonwoven web or laminate can be accomplished by utilizing any suitable means. In embodiments, the most preferred method will depend on the product form and required speed of filling. In embodiments, the molded nonwoven web or laminate is filled by in-line filling techniques. The filled, open packets are then closed forming the pouches, using a second nonwoven web or laminate, by any suitable method. This may be accomplished while in horizontal position and in continuous, constant motion. The closing may be accomplished by continuously feeding a second nonwoven web or laminate, preferably water-soluble nonwoven web or laminate, over and onto the open packets and then preferably sealing the first and second nonwoven web or laminate together, typically in the area between the molds and thus between the packets.

Sealing the Pouches

Any suitable method of sealing the pouch and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts (optionally also providing heat) can be used, for example.

In embodiments, an inner nonwoven web or laminate is sealed to outer nonwoven web(s) or laminate(s) by solvent sealing. The sealing solution is generally an aqueous solution. In embodiments, the sealing solution includes water. In embodiments, the sealing solution includes water and further includes one or more polyols, diols and/or glycols such as 1,2-ethanediol (ethylene glycol), 1,3-propanediol, 1,2-propanediol, 1,4-butanediol (tetramethylene glycol), 1,5-pantanediol (pentamethylene glycol), 1,6-hexanediol (hexamethylene glycol), 2,3-butanediol, 1,3-butanediol, 2-methyl-1,3-propanediol, various polyethylene glycols (e.g., diethylene glycol, triethylene glycol), and combinations thereof. In embodiments, the sealing solution includes erythritol, threitol, arabitol, xylitol, ribitol, mannitol, sorbitol, galactitol, fucitol, iditol, inositol, volemitol, isomal, maltitol, lactitol. In embodiments, the sealing solution includes a water-soluble polymer.

The sealing solution can be applied to the interfacial areas of the inner nonwoven web or laminate in any amount suitable to adhere the inner and outer nonwoven webs or laminates. As used herein, the term "coat weight" refers to the amount of sealing solution applied to the nonwoven web or laminate in grams of solution per square meter of nonwoven web or laminate. In general, when the coat weight of the sealing solvent is too low, the nonwoven webs or laminates do not adequately adhere and the risk of pouch failure at the seams increases. Further, when the coat weight of the sealing solvent is too high, the risk of the solvent migrating from the interfacial areas increases, increasing the likelihood that etch holes may form in the sides of the pouches. The coat weight window refers to the range of coat weights that can be applied to a given film while maintaining both good adhesion and avoiding the formation of etch holes. A broad coat weight window is desirable as a broader window provides robust sealing under a broad range of operations. Suitable coat weight windows are at least about 3 $g/m^2$, or at least about 4 $g/m^2$, or at least about 5 $g/m^2$, or at least about 6 $g/m^2$.

Cutting the Packets

Formed packets may be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

Forming and Filling Multi-Compartment Pouches

The different compartments of a multi-compartment pouches may be made together in a side-by-side style or concentric style wherein the resulting, cojoined pouches may or may not be separated by cutting. Alternatively, the compartments can be made separately.

In embodiments, pouches may be made according to a process comprising the steps of: a) forming a first compartment (as described above); b) forming a recess within or all of the closed compartment formed in step (a), to generate a second molded compartment superposed above the first compartment; c) filling and closing the second compartments by means of a third nonwoven web, laminate, or film; d) sealing the first, second and third nonwoven web, laminate, or film; and e) cutting the nonwoven webs or laminates to produce a multi-compartment pouch. The recess formed in step (b) may be achieved by applying a vacuum to the compartment prepared in step (a).

In embodiments, second, and/or third compartment(s) can be made in a separate step and then combined with the first compartment as described in European Patent Application Number 08101442.5 or U.S. Patent Application Publication No. 2013/240388 A1 or WO 2009/152031.

In embodiments, pouches may be made according to a process comprising the steps of: a) forming a first compartment, optionally using heat and/or vacuum, using a first nonwoven web or laminate on a first forming machine; b) filling the first compartment with a first composition; c) optionally filling the second compartment with a second composition; d) sealing the first and optional second compartment with a second nonwoven web or laminate to the first nonwoven web or laminate; and e) cutting the nonwoven webs or laminates to produce a multi-compartment pouch.

In embodiments, pouches may be made according to a process comprising the steps of: a) forming a first compartment, optionally using heat and/or vacuum, using a first nonwoven web or laminate on a first forming machine; b) filling the first compartment with a first composition; c) on a second forming machine, deforming a second nonwoven web or laminate, optionally using heat and vacuum, to make a second and optionally third molded compartment; d) filling the second and optionally third compartments; e) sealing the second and optionally third compartment using a third nonwoven web or laminate; f) placing the sealed second and optionally third compartments onto the first compartment; g) sealing the first, second and optionally third compartments; and h) cutting the nonwoven web or laminate to produce a multi-compartment pouch.

The first and second forming machines may be selected based on their suitability to perform the above process. In embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

In embodiments, the nonwoven web or laminate and/or pouch is sprayed or dusted with a suitable material, such as an active agent, a lubricant, an aversive agent, or mixtures thereof. In embodiments, the nonwoven web or laminate and/or pouch is printed upon, for example, with an ink and/or an active agent.

Vertical Form, Fill and Seal

In embodiments, the nonwoven web or laminate of the disclosure can be formed into a sealed article. In embodiments, the sealed article is a vertical form, filled, and sealed article. The vertical form, fill, and seal (VFFS) process is a conventional automated process. VFFS includes an apparatus such as an assembly machine that wraps a single piece of the nonwoven web or laminate around a vertically oriented feed tube. The machine heat seals or otherwise secures the opposing edges of the nonwoven web or laminate together to create the side seal and form a hollow tube of nonwoven web or laminate. Subsequently, the machine heat seals or otherwise creates the bottom seal, thereby defining a container portion with an open top where the top seal will later be formed. The machine introduces a specified amount of flowable product into the container portion through the open top end. Once the container includes the desired amount of product, the machine advances the nonwoven web or laminate to another heat sealing device, for example, to create the top seal. Finally, the machine advances the nonwoven web or laminate to a cutter that cuts the film immediately above the top seal to provide a filled package.

During operation, the assembly machine advances the nonwoven web or laminate from a roll to form the package. Accordingly, the nonwoven web or laminate must be able to readily advance through the machine and not adhere to the machine assembly or be so brittle as to break during processing.

Pouch Contents

In any embodiment, the pouch can contain (enclose) a composition in the defined interior volume of the pouch. The composition can be selected from a liquid, solid or combination thereof. In embodiments wherein the composition includes a liquid, the nonwoven web can be a nonporous nonwoven web or a porous nonwoven web laminated with a water-soluble film, the water-soluble film forming the inner surface of the pouch. In embodiments wherein the composition is a solid, the pouch can comprise a nonporous nonwoven web, a porous nonwoven web laminated with a water-soluble film, or a porous nonwoven web. In embodiments wherein the pouch includes a porous nonwoven web, the particle size of the solid composition is smaller than the pore size of the nonwoven web.

In embodiments, the sealed articles of the disclosure can enclose in the interior pouch volume a composition comprising a liquid laundry detergent, an agricultural composition, an automatic dish washing composition, household cleaning composition, a water-treatment composition, a personal care composition, a food and nutritive composition, an industrial cleaning composition, a medical composition, a disinfectant composition, a pet composition, an office composition, a livestock composition, an industrial composition, a marine composition, a mercantile composition, a military composition, a recreational composition, or a combination thereof. In embodiments, the water-dispersible sealed articles of the disclosure can enclose in the interior pouch volume a composition comprising a liquid laundry detergent, an agricultural composition, an automatic dish washing composition, a household cleaning composition, a water-treatment composition, a personal care composition, a food and nutritive composition, an industrial cleaning composition, or a combination thereof. In embodiments, the water-dispersible sealed articles of the disclosure can enclose in the interior pouch volume a composition comprising a liquid laundry detergent, an agricultural composition, an automatic dish washing composition, a household cleaning composition, a water-treatment composition, a personal care composition, or a combination thereof. In embodiments, the water-dispersible sealed articles of the disclosure can enclose in the interior pouch volume a composition comprising an agricultural composition or a water-treatment composition.

As used herein, "liquid" includes free-flowing liquids, as well as pastes, gels, foams and mousses. Non-limiting examples of liquids include light duty and heavy duty liquid detergent compositions, dish detergent for hand washing and/or machine washing; hard surface cleaning compositions, fabric enhancers, detergent gels commonly used for laundry, bleach and laundry additives, shaving creams, skin care, hair care compositions (shampoos and conditioners), and body washes. Such detergent compositions may comprise a surfactant, a bleach, an enzyme, a perfume, a dye or colorant, a solvent and combinations thereof. Optionally, the detergent composition is selected from the group consisting of a laundry detergent, a dishwashing detergent, a hard surface cleaning composition, fabric enhancer compositions, shaving creams, skin care, hair care compositions (shampoos and conditioners), and body washes, and combinations thereof.

Non-limiting examples of liquids include agricultural compositions, automotive compositions, aviation compositions, food and nutritive compositions, industrial compositions, livestock compositions, marine compositions, medical compositions, mercantile compositions, military and quasi-military compositions, office compositions, recreational and park compositions, pet compositions, and water-treatment compositions, including cleaning and detergent compositions applicable to any such use.

Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

The composition may be a non-household care composition. For example, a non-household care composition can be selected from agricultural compositions, aviation compositions, food and nutritive compositions, industrial compositions, livestock compositions, marine compositions, medical compositions, mercantile compositions, military and quasi-military compositions, office compositions, recreational and park compositions, pet compositions, and water-treatment compositions, including cleaning and detergent compositions applicable to any such use while excluding fabric and household care compositions In one type of embodiment, the composition can include an agrochemical, e.g. one or more insecticides, fungicides, herbicides, pesticides, miticides, repellants, attractants, defoliaments, plant growth regulators, fertilizers, bactericides, micronutrients, and trace elements. Suitable agrochemicals and secondary agents are described in U.S. Pat. Nos. 6,204,223 and 4,681,228 and EP 0989803 A1. For example, suitable herbicides include paraquat salts (for example paraquat dichloride or paraquat bis(methylsulphate), diquat salts (for example diquat dibromide or diquat alginate), and glyphosate or a salt or ester thereof (such as glyphosate isopropylammonium, glyphosate sesquisodium or glyphosate trimesium, also known as sulfosate). Incompatible pairs of crop protection chemicals can be used in separate chambers, for example as described in U.S. Pat. No. 5,558,228. Incompatible pairs of crop protection chemicals that can be used include, for example, bensulfuron methyl and molinate; 2,4-D and thifensulfuron methyl;2,4-D and methyl 2-[[[[N-4-methoxy-6-methyl-1,3,5-triazine-2-yl)-N-methylamino]carbonyl]amino]-sulfonyl]benzoate; 2,4-D and metsulfuron methyl; maneb or mancozeb and benomyl; glyphosate and metsulfuron methyl; tralomethrin and any organophosphate such as monocrotophos or dimethoate; bromoxynil and N-[[4,6-dimethoxypyrimidine-2-yl)-amino]carbonyl]-3-(ethylsulfonyl)-2-pyridine-sulfonamide; bromoxynil and methyl 2-[[[[(4-methyl-6-methoxy)-1,3,5-triazin-2-yl)amino]carbonyl]amino]sulfonyl]-benzoate; bromoxynil and methyl 2-[[[[N-(4-methoxy-6-methyl-1,3,5-triazin-2-yl)-N-methylamino]carbonyl]amino]-sulfonyl]benzoate. In another, related, type of embodiment, the composition can include one or more seeds, optionally together with soil, and further optionally together with one or more additional components selected from mulch, sand, peat moss, water jelly crystals, and fertilizers, e.g. including types of embodiments described in U.S. Pat. No. 8,333,033.

In another type of embodiment, the composition is a water-treatment agent. Such agents can include harsh chemicals, such as aggressive oxidizing chemicals, e.g. as described in U.S. Patent Application Publication No. 2014/0110301 and U.S. Pat. No. 8,728,593. For example, sanitizing agents can include hypochlorite salts such as sodium hypochlorite, calcium hypochlorite, and lithium hypochlorite; chlorinated isocyanurates such as dichloroisocyanuric acid (also referred to as "dichlor" or dichloro-s-triazinetrione, 1,3-dichloro-1,3,5-triazinane-2,4,6-trione) and trichloroisocyanuric acid (also referred to as "trichlor" or I,3,5-trichloro-I,3,5-triazinane-2,4,6-trione). Salts and hydrates of the sanitizing compounds are also contemplated. For example, dichloroisocyanuric acid may be provided as sodium dichloroisocyanurate, sodium dichloroisocyanurate acid dihydrate, among others. Bromine containing sanitizing agents may also be suitable for use in unit dose packaging applications, such as I,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin; and 2-bromo-2-nitro-1,3-propanediol, among others. The oxidizing agent can be one described in U.S. Pat. No. 7,476,325, e.g. potassium hydrogen peroxymonosulfate. The composition can be a pH-adjusting chemical, e.g. as described in U.S. Patent Application Publication No. 2008/0185347, and can include, for example, an acidic component and an alkaline component such that the composition is effervescent when contacted with water, and adjusts the water pH. Suitable ingredients include sodium bicarbonate, sodium bisulfate, potassium hydroxide, sulfamic acid, organic carboxylic acids, sulfonic acids, and potassium dihydrogen phosphate. A buffer blend can include boric acid, sodium carbonate, glycolic acid, and oxone monopersulfate, for example.

A water-treatment agent can be or can include a flocculant, e.g. as described in U.S. Patent Application Publication No. 2014/0124454. The flocculant can include a polymer flocculant, e.g. polyacrylamide, a polyacrylamide copolymer such as an acrylamide copolymers of diallydimethylammonium chloride (DADMAC), dimethylaminoethylacrylate (DMAEA), dimethylaminoethylmethacrylate (DMAEM), 3-methylamidepropyltrimethylammonium chloride (MAPTAC) or acrylic acid; a cationic polyacrylamide; an anionic polyacrylamide; a neutral polyacrylamide; a polyamine; polyvinylamine; polyethylene imine; polydimethyldiallylammonium chloride; poly oxyethylene;

polyvinyl alcohol; polyvinyl pyrrolidone; polyacrylic acid; polyphosphoric acid; polystyrene sulfonic acid; or any combination thereof. A flocculant can be selected from chitosan acetate, chitosan lactate, chitosan adipate, chitosan glutamate, chitosan succinate, chitosan malate, chitosan citrate, chitosan fumarate, chitosan hydrochloride, and combinations thereof. The water-treating composition can include a phosphate removing substance, e.g. one or more selected from a zirconium compound, a rare earth lanthanide salt, an aluminum compound, an iron compound, or any combination thereof.

The composition can be a limescale removing composition, e.g. citric or maleic acid or a sulphate salt thereof, or any mixture thereof, e.g. as described in U.S. Patent Application No. 2006/0172910.

Various other types of compositions are contemplated for use in the packets described herein, including particulates, for example down feathers, e.g. as described in US RE29059 E; super absorbent polymers, e.g. as described in U.S. Patent Application Publication Nos. 2004/0144682 and 2006/0173430; pigments and tinters, e.g. as described in U.S. Pat. No. 3,580,390 and U.S. Patent Application Publication No. 2011/0054111; brazing flux (e.g. alkali metal fluoroaluminates, alkali metal fluorosilicates and alkali metal fluorozincates), e.g. as described in U.S. Pat. No. 8,163,104; food items (e.g., coffee powder or dried soup) as described in U.S. Patent Application Publication No. 2007/0003719; and wound dressings, e.g. as described in U.S. Pat. No. 4,466,431.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerin esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶ 65-77); cationic starches (see: U.S. 2004/0204337 A1 and US 2007/0219111 A1); scum dispersants (see: U.S. 2003/0126282 A2, 1189-90); substantive dyes; hueing dyes (see: U.S. 2014/0162929 A1); colorants; opacifier; antioxidant; hydrotropes such as toluenesulfonates, cumenesulfonates and naphthalenesulfonates; color speckles; colored beads, spheres or extrudates; clay softening agents; anti-bacterial agents. Any one or more of these ingredients is further described in described in US Patent Application Publication Number U.S. 2010/305020 A1, U.S. Publication Number 2003/0139312A1 and U.S. Patent Application Publication Number U.S. 2011/0023240 A1. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Dissolution and Disintegration Test (MSTM-205)

A nonwoven web, water-soluble film, or laminate structure can be characterized by or tested for Dissolution Time and Disintegration Time according to the MonoSol Test Method 205 (MSTM 205), a method known in the art. See, for example, U.S. Pat. No. 7,022,656. The description provided below refers to a nonwoven web, while it is equally applicable to a water-soluble film or laminate structure.

Apparatus and Materials:

600 mL Beaker
Magnetic Stirrer (Labline Model No. 1250 or equivalent)
Magnetic Stirring Rod (5 cm)
Thermometer (0 to 100° C.±1° C.)
Template, Stainless Steel (3.8 cm×3.2 cm)
Timer (0-300 seconds, accurate to the nearest second)
Polaroid 35 mm slide Mount (or equivalent)
MonoSol 35 mm Slide Mount Holder (or equivalent)
Distilled water For each nonwoven web to be tested, three test specimens are cut from a nonwoven web sample that is a 3.8 cm×3.2 cm specimen. Specimens should be cut from areas of web evenly spaced along the traverse direction of the web. Each test specimen is then analyzed using the following procedure.

Lock each specimen in a separate 35 mm slide mount.

Fill beaker with 500 mL of distilled water. Measure water temperature with thermometer and, if necessary, heat or cool water to maintain the temperature at the temperature for which dissolution is being determined, e.g., 20° C. (about 68° F.).

Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.

Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the nonwoven web surface is perpendicular to the flow of the water.

In one motion, drop the secured slide and clamp into the water and start the timer. Rupture occurs when the sample has become compromised within the slide, for example, when a hole is created. Disintegration occurs when the nonwoven web breaks apart and no sample material is left in the slide. When all visible nonwoven web is released from the slide mount, raise the slide out of the water while continuing to monitor the solution for undissolved nonwoven web fragments. Dissolution occurs when all nonwoven web fragments are no longer visible and the solution becomes clear. Rupture and dissolution can happen concurrently for nonwoven samples wherein the fibers are prepared from polyvinyl alcohol having a low degree of hydrolysis (e.g., about 65-88%). Dissolution times are recorded independently of rupture times when there is a 5 second or greater difference between rupture and dissolution.

Thinning time can also be determined using MSTM-205. Thinning of a nonwoven web occurs when some of the fibers making up the nonwoven web dissolve, while other fibers remain intact. The thinning of the web occurs prior to disintegration of the web. Thinning is characterized by a decrease in opacity, or increase in transparency, of the nonwoven web. The change from opaque to increasingly transparent and can be visually observed. During MSTM- 205, after the secured slide and clamp have been dropped into the water the opacity/transparency of the nonwoven web is monitored. At the time point wherein no change in opacity/transparency is observed (i.e., the web does not become any less opaque or more transparent), the time is recorded as the thinning time.

The results should include the following: complete sample identification; individual and average disintegration and dissolution times; and water temperature at which the samples were tested.

Method for Determining Single Fiber Solubility

The solubility of a single fiber can be characterized by the water breaking temperature. The fiber breaking temperature can be determined as follows. A load of 2 mg/dtex is put on a fiber having a fixed length of 100 mm. Water temperature starts at 1.5° C. and is then raised by 1.5° C. increments every 2 minutes until the fiber breaks. The temperature at which the fiber breaks is denoted as the water breaking temperature.

The solubility of a single fiber can also be characterized by the temperature of complete dissolution. The temperature of complete dissolution can be determined as follows. 0.2 g of fibers having a fixed length of 2 mm are added to 100 mL of water. Water temperature starts at 1.5° C. and is then raised by 1.5° C. increments every 2 minutes until the fiber completely dissolves. The sample is agitated at each temperature. The temperature at which the fiber completely dissolves in less than 30 seconds is denoted as the complete dissolution temperature.

Diameter Test Method

The diameter of a discrete fiber or a fiber within a nonwoven web is determined by using a scanning electron microscope (SEM) or an optical microscope and an image analysis software. A magnification of 200 to 10,000 times is chosen such that the fibers are suitably enlarged for measurement. When using the SEM, the samples are sputtered with gold or a palladium compound to avoid electric charging and vibrations of the fiber in the electron beam. A manual procedure for determining the fiber diameters is used from the image (on monitor screen) taken with the SEM or the optical microscope. Using a mouse and a cursor tool, the edge of a randomly selected fiber is sought and then measured across its width (i.e., perpendicular to the fiber direction at that point) to the other edge of the fiber. A scaled and calibrated image analysis tool provides the scaling to get an actual reading in microns. For fibers within a nonwoven web, several fibers are randomly selected across the sample of nonwoven web using the SEM or the optical microscope. At least two portions of the nonwoven web material are cut and tested in this manner. Altogether at least 100 such measurements are made and then all data are recorded for statistical analysis. The recorded data are used to calculate average (mean) of the fibers, standard deviation of the fibers, and median fiber diameters.

Tensile Strength, Modulus, and Elongation Test

A nonwoven web, water-soluble film, or laminate structure characterized by or to be tested for tensile strength according to the Tensile Strength (TS) Test, modulus (or tensile stress) according to the Modulus (MOD) Test, and elongation according to the Elongation Test is analyzed as follows. The description provided below refers to a nonwoven web, while it is equally applicable to a water-soluble film or laminate structure. The procedure includes the determination of tensile strength and the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of nonwoven web data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a nonwoven web are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation), tensile strength (i.e., stress required to break film), and elongation % (sample length at break relative to the initial sample length). In general, the higher the elongation % for a sample, the better the processability characteristics for the nonwoven web (e.g., increased formability into packets or pouches).

Determination of Basis Weight

Basis weight is determined according to ASTM D3776/D3776M-09a (2017). Briefly, a specimen having an area of at least 130 $cm^2$ or a number of smaller die cut specimens taken from different locations in the sample and having a total area of at least 130 $cm^2$ are cut. The specimen(s) are weighed to determine mass on a top loading analytical balance with a resolution of ±0.001 g. The balance is protected from air drafts and other disturbances using a draft shield. Specimens of fabric may be weighed together. The mass is calculated in ounces per square yard, ounces per linear yard, linear yards per pound, or grams per square meter to three significant figures.

Determination of Moisture Vapor Transmission Rate

Moisture Vapor Transmission Rate (MVTR) is determined according to MSTM-136. The MVTR defines how much moisture per day moves through a film sample. The description provided below refers to a nonwoven web, while it is equally applicable to a water-soluble film or laminate structure.

Apparatus and Materials:

- Permatran-W Model 3/34 (or equivalent)
- Compressed Gas Cylinder of Nitrogen (99.7% or above)
- Regulator-Tee (part number 027-343)
- Main Line Supply regulator
- HPLC Grade Water (or equivalent)
- 10 cc Syringe with Luerlok Tip (part number 800-020)
- Powder-free gloves
- High vacuum grease (part number 930-022)
- (2) Test Cells
- Cutting template
- Cutting board
- Razor blade with handle
- Cut-resistant glove Preparation of the Permatran W-Model 3/34: Make sure nitrogen pressure level is above 300 psi, the pressure on the carrier gas regulator-tee reads 29 psi (must not exceed 32 psi) and the main line supply regulator pressure is set to 35 psi. Open the door on the instrument panel to access humidifier to check the water level. If water level is low, fill a syringe with HPLC-grade water and insert the leur fitting on the syringe into the "fill Port" for the reservoir. Open the "Fill Valve" by turning it 2-3 turns counterclockwise then push in the plunger on the syringe to force the water into the reservoir. Close the "Fill Valve" and remove syringe. Note: do not allow water level to exceed line marked adjacent to reservoir.

Preparation and Testing of Samples: For each nonwoven web to be tested, take the sample web and lay it flat on the cutting board. Place the template on top of the web and use the razor blade with a handle to cut out the sample. Make sure cut-resistant glove is worn when cutting the sample out. Set the sample aside. Grease around the sealing surfaces of the test cell's top piece with high vacuum grease. Mount the film sample on top of the test cell's top piece. Note: Orientation can be important. If a homogeneous material, orientation is not critical. If a multi-layered and laminated material, place the multilayered film or laminate with barrier coating or laminate up, towards the top of the cell. For example, a one-side, wax coated PVOH web should be mounted with the wax side up, placing the wax towards the carrier gas (Nitrogen). Place the test cell's top piece on top of the test cell's bottom piece. Make sure the test cell is clamped together with a good seal. Press the cell load/unload button to open cell tray. Grasp the test cell by the front and back edges and lower it straight down. Close the cell tray completely by gently pushing straight towards panel. Press the cell load/unload button to clamp the cell. Note: You should hear a click. Repeat for second sample.

After the samples are loaded and the instrument is ready, the test parameters must be set. Note: There are two types of test parameters, cell parameters and instrument parameters. Cell parameters are specific to each cell while instrument parameters are common for all cells. Touch the "Test Button" on the screen. Under "Auto Test" select "Tab A". Touch "Cell Tab". Fill out the following by touching each bubble: ID, Area (cm'2), Thickness (mil). Note: Area of template is 50 $cm^2$. Repeat for "Tab B". Touch "Instrument Tab". Fill out the following by touching each bubble: Cell Temp (° C.) and Test Gas RH (%). Note: Make sure 100% RH is set to off. Cell temperature can be set to a minimum of 10° C. to maximum of 40° C. Test Gas RH can be set to minimum 5% to 90%. If 100% RH is needed, it requires a different method. Repeat for "Tab B". Once the test parameters are set, select "Start Selected" or "Start All" depending on sample number. Note: The indicator light for each cell on front panel will be green indicating the start of test.

Surface Resistivity Measurements

Surface resistivity of nonwoven webs and films can be measured according to ASTM D257.

Softness Rating

The hand feel of a nonwoven web, laminate, or pouch of the disclosure is related to the softness of the sample and can be evaluated using relative testing methods. A tester carrying out the softness evaluation used clean hands to feel the samples in whatever manner or method the individual chose, to determine a softness rating for the nonwoven webs and articles of the disclosure as compared to a control material comprising a nonwoven web consisting of fibers consisting of polyvinyl alcohol homopolymers having a degree of hydrolysis of 88%, the fibers having a 2.2 dtex/51 mm cut, having a softness rating of 1 (softest) and a control material comprising a nonwoven web consisting of fibers consisting of 75% polyvinyl alcohol homopolymers having a degree of hydrolysis of 88%, the fibers having a 2.2/51 mm cut, and 25% of 22 dtex/38 mm PET fiber, having a softness rating of 5 (roughest/coarsest). The hand panel was conducted in a blind study so that the raters could not be swayed by their perception of sample names. Samples were rated from 1 to 5.

Flushability Test

The ability of the nonwoven webs and/or laminates of the disclosure to be flushed in a septic or municipal sewage treatment system can be determined according to a modified INDA/EDANA—Criteria for recognition as a flushable product, as provided below. The below test references nonwoven web samples, however it will be understood that the method can also be used for laminate structures.

Equipment:

- Rocking digital platform shaker
- Two clear, plastic, 12×5×3.9 inches containers
- Two sieves (12.5 mm apertures)
- Dried nonwoven web samples
- 100° C. oven Parameters:

- Rocking platform set to 18 RPM and 11° tilt period
- 1 L tap water per container
- 30 min testing period Testing Procedure:

1. Place two containers on rocking platform. This method tests two samples at a time.
2. Measure 1 L of tap water in beaker and pour into one plastic container. Repeat for other container. Make sure tap water in containers is at 15° C.±1° C. before starting test.
3. Record weight of the initial dried test sample (initial sample mass (g)) and weight of sieves (initial sieve mass (g)) and record independently.
4. Set appropriate parameters on digital rocking platform.
5. Place each test sample in their corresponding container and immediately start the agitation process (rocking of the platform),
6. Once the process is complete (after 30 minutes), take each container and pour through their corresponding sieves. Pouring at a height of 10 cm above sieve plate.
7. Rinse container into sieve to ensure all of the remaining test sample was removed.
8. Place sieve in 100° C. oven for 45 minutes to ensure all water evaporates.
9. Record weight of sieve and remaining test sample together (total final mass (g)).
10. Calculate the total retained sample mass (final sample mass (g)):
    Final sample mass (g)=total final mass (g)−initial sieve mass (g)
10. Calculate the percent (%) disintegration:
    % Disintegration=[1−(final sample mass (g)/initial sample mass (g))]×100
11. Make sure sieves are cleaned, dried, and re-weighed before starting next test.
12. Repeat test until replicate of N=3 is complete for each specific test sample.

A sample is sufficiently flushable to be disposed of by flushing in a septic or municipal sewage treatment system when the sample has a percent disintegration equal to or greater than of at least 20%. In embodiments, the nonwoven webs, laminates, and pouches of the disclosure can have a percent disintegration of at least 20%, at least 30%, at least 35%, at least 40%, at least 45%, at least 50%, at least 55%, at least 60%, at least 65%, at least 70%, at least 75%, at least 80%, at least 85%, at least 90%, or at least 95% as measured by the Flushability Test.

Liquid Release Test

FIG. 3 is an illustration of a wire frame cage (shown with the top open, to better illustrate water-soluble pouches contained therein) for use in the Liquid Release Test described herein.

Figure 4:
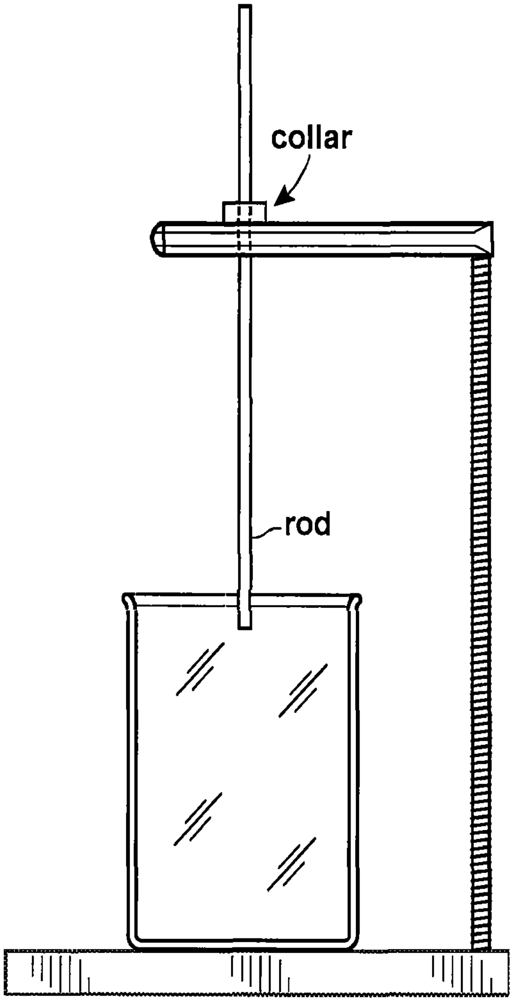
FIG. 4 shows an apparatus for performing the Liquid Release Test, including a beaker resting on a stand, the stand holding a rod for lowering a cage into the beaker, the rod being fixable by a collar with a set screw (not shown).

FIG. 4 shows an apparatus for performing the Liquid Release Test, including a beaker resting on a stand, the stand holding a rod for lowering a cage into the beaker, the rod being fixable by a collar with a set screw (not shown).

A water-soluble film and/or pouch characterized by or to be tested for delayed solubility according to the Liquid Release Test is analyzed as follows using the following materials:

2 L beaker and 1.2 liters of deionized (DI) water

Water-soluble pouch to be tested; the pouch is preconditioned for two weeks at 38° C.; for results to be comparative, all films tested should have the same thickness, for example, 88 μm or 76 μm.

Thermometer

Wire cage

Timer

Before running the experiment, ensure that enough DI water is available to repeat the experiment five times, and ensure that the wire cage and beaker are clean and dry.

The wire frame cage is a plastic coated wire cage (4"×3.5"×2.5") with no sharp edges, or equivalent. The gauge of the wire should be about 1.25 mm and the wire should have openings the size of 0.5 inch (1.27 cm) squares. An example image of a cage 28 with test pouches 30 is shown in FIG. 3.

To set up for the test, carefully place the water-soluble pouch in the cage while not scratching the pouch on the cage and allowing free space for the pouch to move. Do not bind the pouch tightly with the wire cage, while still ensuring it is secure and will not come out of the cage. The orientation of the pouch in the cage should be such that the natural buoyancy of the pouch, if any, is allowed (i.e. the side of the pouch that will float to the top should be placed towards the top). If the pouch is symmetrical, the orientation of the pouch generally would not matter.

Next, fill the 2 L beaker with 1200 milliliters of 20° C. DI water.

Next, lower the wire frame cage with the enclosed pouch into the water. Ensure that the cage is 1 inch (2.54 cm) from the bottom of the beaker. Be sure to fully submerge the pouch on all sides. Ensure that the cage is stable and will not move and start a timer as soon as the pouch is lowered into the water. The position of the cage with respect to the water in the beaker can be adjusted and maintained by any suitable means, for example by using a clamp fixed above the beaker, and a rod attached to the top of the cage. The clamp can engage the rod to fix the position of the cage, and tension on the clamp can be lowered in order to lower the cage into the water. Other means of frictional engagement can be used in the alternative to a clamp, for example a collar with a set screw, as shown in FIG. 4 (set screw not shown). FIG. 4 shows a beaker 30 resting on a stand 40, the stand holding a rod 50 for lowering a cage 10 (not shown) into the beaker 30, the rod 50 being able to hold a fixed vertical position by use of a collar 60 having a set screw (not shown) that engages the rod 50, for example by friction or by engagement with a hole (not shown) in the rod 50.

Liquid content release is defined as the first visual evidence of the liquid leaving the submerged pouch.

The following embodiments are specifically contemplated:

In some embodiments, the nonwoven web includes a polymer blend. The polymer blend can include a first anionic group modified polyvinyl alcohol polymer in an amount in a range of about 30 wt % to about 85 wt %, or about 50 wt % to about 85 wt % based on the weight of the nonwoven web, and a second polyvinyl alcohol homopolymer in an amount in a range of about 15 wt % to about 70 wt %, or about 15 wt % to about 50 wt % based on the weight of the nonwoven web. The basis weight of the nonwoven web comprising the polymer blend can be in a range of about 10 $g/m^2$ to about 80 $g/m^2$, about 20 $g/m^2$ to about 70 $g/m^2$, about 30 $g/m^2$ to about 60 $g/m^2$, or about 40 $g/m^2$ to about 50 $g/m^2$, for example about 10, 15, 20, 25, 30, 35, 40, 45, 50, 55, 60, 65, 70, 75, or 80 $g/m^2$. The static coefficient of friction of the nonwoven web comprising the polymer blend can be less than about 0.90, less than about 0.85, or less than about 0.80, for example, about 0.10, 0.25, 0.50, 0.60, 0.70, 0.71, 0.72, 0.73, 0.74, 0.75, 0.76, 0.77, 0.78, 0.79, 0.80, 0.81, 0.82, 0.83, 0.84, 0.85, or 0.90. The ratio of the static coefficient of friction to the dynamic coefficient of friction for the nonwoven web comprising the polymer blend can be in a range of about 0.90 to about 1.10, or about 0.95 to about 1.05, for example, about 0.90, 0.95, 0.98, 0.99, 1.00, 1.01, 1.02, 1.05, or 1.10. The yellowness of the nonwoven web comprising the polymer blend can be less than about 5, less than about 4, or less than about 3, as measured using ASTM E313. For example, the yellowness of the nonwoven web comprising the polymer blend can be about 2.50, 2.75, 3.00, 3.10, 3.15, 3.20, 3.25, 3.30, 3.40, 3.50, 3.75, 4.00, 4.25, 4.50, 4.75, or 5.00. The whiteness of the nonwoven web comprising the polymer blend can be in a range of about 40 to about 70, about 45 to about 65, or about 50 to about 60, as measured using ASTM E313. For example, the whiteness of the nonwoven web comprising the polymer blend can be about 40, 42, 45, 48, 49, 50, 52, 55, 56, 58, 60, 62, 65, 67, or 70. The brightness of the nonwoven web comprising the polymer blend can be in a range of about 40 to about 70, about 45 to about 65, or about 50 to about 60, as measured using TAPPI 452. For example, the brightness of the nonwoven web comprising the polymer blend can be about 40, 42, 45, 47, 49, 50, 52, 54, 55, 56, 58, 60, 62, 65, 67, or 70.

In some embodiments, the nonwoven web includes a single polyvinyl alcohol homopolymer polymer. The degree of hydrolysis of the PVOH homopolymer can be in a range of about 85% to about 99%, for example, about 85%, 88%, 90%, 92%, 94%, 96%, 98%, or 99%. The basis weight of the nonwoven web comprising the single PVOH homopolymer can be in a range of about 10 $g/m^2$ to about 60 $g/m^2$, about 20 $g/m^2$ to about 50 $g/m^2$, or about 30 $g/m^2$ to about 40 $g/m^2$, for example, about 10, 15, 20, 25, 30, 35, 40, 45, 50, 55, or 60 $g/m^2$. The static coefficient of friction of the nonwoven web comprising the single PVOH homopolymer can be less than about 0.90, less than about 0.70, or less than about 0.40, for example, about 0.10, 0.25, 0.30, 0.35, 0.40, 0.45, 0.50, 0.55, 0.60, 0.65, 0.70, 0.75, 0.80, 0.85, or 0.90. The ratio of the static coefficient of friction to the dynamic coefficient of friction for the nonwoven web comprising the single PVOH homopolymer can be in a range of about 0.90 to about 1.10, or about 0.95 to about 1.05, for example, about 0.90, 0.95, 0.98, 0.99, 1.00, 1.01, 1.02, 1.04, 1.05, 1.06, 1.07, 1.08, 1.09 or 1.10. The yellowness of the nonwoven web comprising the polymer blend can be less than about 5, less than about 4, or less than about 3, as measured using ASTM E313. For example, the yellowness of the nonwoven web comprising the single PVOH homopolymer can be about 1.00, 1.25, 1.50, 1.75, 2.00, 2.50, 2.55, 2.60, 2.75, 3.00, 3.25, 3.30, 3.40, 3.50, 3.75, 4.00, 4.25, 4.50, 4.75, or 5.00. The whiteness of the nonwoven web comprising the single PVOH homopolymer can be in a range of about 40 to about 70, about 45 to about 65, or about 50 to about 60, as measured using ASTM E313. For example, the whiteness of the nonwoven web comprising the polymer blend can be about 40, 42, 45, 48, 49, 50, 51, 52, 54, 55, 56, 58, 60, 62, 65, 67, or 70. The brightness of the nonwoven web comprising the single PVOH homopolymer can be in a range of about 40 to about 70, about 45 to about 65, or about 50 to about 60, as measured using TAPPI 452. For example, the brightness of the nonwoven web comprising the polymer blend can be about 40, 42, 45, 47, 49, 50, 52, 54, 55, 56, 58, 59, 60, 62, 65, 67, or 70.

One or more optional features that can be used individually or in combination are described in the following paragraphs. Optionally, the fibers of the disclosure consist of a single fiber forming material. Optionally, the fibers of the disclosure consist of a polyvinyl alcohol homopolymer. Optionally, the polyvinyl alcohol homopolymer can have a degree of hydrolysis in a range of 85% to 99.9%, for example, 88%, 96%, 98%, or 99.9%. Optionally, the fibers of the disclosure can include a blend of fiber forming materials. Optionally, the blend of fiber forming materials can include a polyvinyl alcohol homopolymer in combination with a polyvinyl alcohol copolymer or a second polyvinyl alcohol homopolymer. Optionally, the polyvinyl alcohol homopolymers can have a degree of hydrolysis in a range of 85% to 99.9%, for example, 88%, 96%, 98%, or 99.9%. Optionally, the polyvinyl alcohol copolymer can be an anionic modified polyvinyl alcohol copolymer. Optionally, the anionic modified polyvinyl alcohol copolymer can be an AMPS copolymer having a degree of modification of about 2 mol % to about 10 mol %, for example, 2 mol %. Optionally, the fibers including a blend of fiber forming materials can include a homopolymer in an amount of 30 wt % and a copolymer in an amount of 70 wt. %, based on the total weight of the fiber forming materials. Optionally, the fibers including a blend of polyvinyl alcohol homopolymers can include a first polyvinyl alcohol homopolymer in an amount of about 25 wt % to 75 wt %, for example, about 25 wt %, 50 wt %, or 75 wt % based on the total weight of the fiber forming materials, and a second polyvinyl alcohol homopolymer in an amount of about 75 wt % to about 25 wt %, for example about 75 wt %, 50 wt %, or 25 wt %, based on the total weight of the fiber forming materials. Optionally, the fibers can have a complete dissolution temperature in a range of about 20° C. to about 90° C., for example, about 20° C., about 40° C., about 70° C., or about 90° C. Optionally, the nonwoven web can be a multilayer nonwoven web. Optionally, the multilayer nonwoven web can include a first nonwoven web including a sole fiber type and a second nonwoven web including a sole fiber type. Optionally, the multilayer nonwoven web can include a first nonwoven web including a blend of fiber types and a second nonwoven web including a sole fiber type. Optionally, the carded webs can be calendared. Optionally, the carded webs can be needle punched prior to calendaring.

Optionally, the nonwoven web can have a dynamic coefficient of friction in a range of about 0.30 to about 0.90, for example, 0.31, 0.62, 0.77, 0.78, 0.82, or 0.86. Optionally, the nonwoven web can have a static coefficient of friction in a range of about 0.30 to about 0.90, for example, 0.34, 0.65, 0.78, 0.79, 0.83, or 0.90. Optionally, the nonwoven web can have a ratio of static to dynamic coefficient of friction in a range of about 1.00 to about 1.10, for example, 1.01, 1.02, 1.04, 1.05, or 1.09. Optionally, the nonwoven web can have a max stress in a range of about 1.00 to about 11.2 $N/mm^2$ in the machine direction, for example, about 1.00 $N/mm^2$, 1.53 $N/mm^2$, 1.64 $N/mm^2$, 5.99 $N/mm^2$, 7.36 $N/mm^2$, or 11.11 $N/mm^2$. Optionally, the nonwoven web can have a max stress in the transverse direction of about 0.20 to about 5.90 $N/mm^2$, for example, about 0.22 $N/mm^2$, 0.42 $N/mm^2$, 0.51 $N/mm^2$, 2.76 $N/mm^2$, 4.28 $N/mm^2$, or 5.86 $N/mm^2$. Optionally, the nonwoven web can have a ratio of max stress in the machine direction to max stress in the transverse direction of about 1.4 to about 4.7, for example, 1.40, 1.90, 2.67, 3.02, 3.91, or 4.64. Optionally, the nonwoven web can have a strain at break in the machine direction of about 6.80 to 359.00%, for example 6.83%, 58.19%, 59.91%, 129.73%, 144.39%, and 358.84%. Optionally, the nonwoven web can have a strain at break in the transverse direction of about 130.00 to about 300.00%, for example, about 130.17%, 163.84%, 173.75%, 195.34%, 250.02%, or 299.42%. Optionally, the nonwoven web can have a strain at break in the machine direction to strain at break in the transverse direction of about 0.04 to about 1.9, for example, about 0.04, 0.20, 0.23, 0.79, 1.11, or 1.85. Optionally, the nonwoven webs can have yellowness values in a range of about 2.5 to about 3.255, for example, about 2.56, 2.58, 3.2, 3.21, and 3.52. Optionally the nonwoven webs can have whiteness values in a range of about 42.00 to about 57.00, for examples, about 42.36, 48.90, 51.24, 51.74, 54.41, or 56.90. Optionally, the nonwoven webs can have brightness values in a range of about 47.80 to about 62.4, for example, about 47.88, 54.67, 56.01, 56.50, 59.42, or 62.35. Optionally, the nonwoven web can have a surface resistivity in a range of about $1\times10^{10}$ to $1\times10^{12}\Omega$, for example $1\times10^{10}\ \Omega$, $1\times10^{11}\Omega$, or $1\times10^{12}\Omega$.

Optionally, the nonwoven web can be a single layer nonwoven web consisting of a single fiber type, the single fiber type consisting of a single fiber forming material and have a basis weight in a range of about 15 to about 50 GSM, for example, 15.5 GSM, 16.8 GSM, 17 GSM, 17.5 GSM, 18.9 GSM, 19.3 GSM, 19.5 GSM, 19.6 GSM, 19.7 GSM, 21.0 GSM, 22.2 GSM, 22.9 GSM, 23.1 GSM, 23.5 GSM, 25.1 GSM, 27.7 GSM, 32.4 GSM, 33.4 GSM, 38.0 GSM, 39.7 GSM, 40.0 GSM, 40.1 GSM, 41.8 GSM, 42.5 GSM, 43.8 GSM, 45.3 GSM, or 44.7 GSM. Optionally, the nonwoven web can be a single layer nonwoven web consisting of a single fiber type, the single fiber type consisting of a single polyvinyl alcohol fiber forming material having a degree of hydrolysis in a range of 88% to 96% and having a time to rupture at 23° C. in a range of about 5.00 seconds (s) to about 140.00 s, for example, 8.00 s, 8.67 s, 10.33 s, 13.33 s, 13.67 s, 15.67 s, 16.67 s, 18.33 s, 20.67 s, 21.33 s, 22.33 s, 24.67 s, 68.33 s, 73.67 s, 85.33 s, 90.00 s, 90.33 s, 92.33 s, 97.00 s, 128.33 s, 131.00 s, 133.67 s, 136.33 s, 138.67 s, or 140.00 s. Optionally, the nonwoven web can be a single layer nonwoven web consisting of a single fiber type, the single fiber type consisting of a single polyvinyl alcohol fiber forming material having a degree of hydrolysis in a range of 88% to 96% and having a disintegration time at 23° C. in a range of about 19.00 s to about 209.00 s, for example, 19.00 s, 21.33 s, 23.00 s, 24.00 s, 28.00 s, 28.67 s, 29.00 s, 34.67 s, 35.00 s, 30.67 s, 31.33 s, 42.67 s, 127.50 s, 134.50 s, 140.50 s, 175.67 s, 189.00 s, 191.67 s, 193.33 s, or 209.00 s. Optionally, the nonwoven web can be a single layer nonwoven web consisting of a single fiber type, the single fiber type consisting of a single polyvinyl alcohol fiber forming material having a degree of hydrolysis in a range of 88% to 96% and having a time to rupture at 40° C. in a range of about 1.30 s to about 11.00 s, for example, 1.22 s, 1.33 s, 2.00 s, 2.33 s, 2.67 s, 3.00 s, 3.33 s, 4.33 s, 5.00 s, 5.33 s, 5.67 s, 6.33 s, 6.67 s, 8.67 s, 9.00 s, or 11.00 s. Optionally, the nonwoven web can be a single layer nonwoven web consisting of a single fiber type, the single fiber type consisting of a single polyvinyl alcohol fiber forming material having a degree of hydrolysis in a range of 88% to 96% and having a disintegration time at 40° C. in a range of about 3.00 s to about 27.00 s, for example, 3.00 s, 3.33 s, 3.67 s, 4.00 s, 4.67 s, 5.00 s, 5.33 s, 6.67 s, 7.00 s, 7.67 s, 8.33 s, 9.67 s, 10.67 s, 13.33 s, 14.33 s, 15.33 s, 15.67 s, 16.00 s, 20.33 s, or 26.67 s. Optionally, the nonwoven web can be a single layer nonwoven web consisting of a single fiber type, the single fiber type consisting of a single polyvinyl alcohol fiber forming material having a degree of hydrolysis of 98% and having a time to rupture at 80° C. in a range of about 2.00 s to about 7.00 s, for example, 2.33 s, 2.67 s, 3.33 s, 4.33 s, or 7.00 s. Optionally, the nonwoven web can be a single layer nonwoven web consisting of a single fiber type, the single fiber type consisting of a single polyvinyl alcohol fiber forming material having a degree of hydrolysis of 98% and having a disintegration time at 80° C. in a range of about 5.00 s to about 34.00 s, for example, 5.33 s, 7.67 s, 9.00 s, 10.33 s, 15.33 s, or 33.67 s. Optionally, the nonwoven web can be a single layer nonwoven web consisting of a single fiber type, the single fiber type consisting of a single polyvinyl alcohol fiber forming material having a degree of hydrolysis of 99.9% and having a time to rupture at 90° C. in a range of 5.00 s to about 90.00 s, for example, 5.33 s, 7.67 s, 9.33 s, or 89.67 s. Optionally, the nonwoven web can be a single layer nonwoven web consisting of a single fiber type, the single fiber type consisting of a single polyvinyl alcohol fiber forming material having a degree of hydrolysis of 99.9% and having a disintegration time at 90° C. in a range of about 9.5 s to about 180.00 s, for example, 9.67 s, 15.67 s, 36.00 s, or 179.5 s.

Optionally, the nonwoven web can be a single layer nonwoven web including a blend of fiber types, including a first fiber comprising a PVOH homopolymer having an 88% DH and a second fiber comprising a PVOH homopolymer having a 96% DH, wherein the first fiber type is provided in a range of 25% to 75%, for example, 25%, 50%, or 75% by weight of the total fibers and the second fiber type is provided in a range of 75% to 25% by weight, for example 25%, 50%, or 75% of the total fibers. Optionally, the nonwoven web including a blend of fiber types having a first fiber comprising a PVOH homopolymer having an 88% DH and a second fiber comprising a PVOH homopolymer having a 96% DH can have a basis weight in a range of about 32.5 GSM to about 50.0 GSM, for example, 32.9 GSM, 40.2 GSM, 43.7 GSM, 43.8 GSM, 43.9 GSM, 41.6 GSM, 44.5 GSM, 44.9 GSM, 45.3 GSM, 45.9 GSM, or 47.9 GSM. Optionally, the nonwoven web including a blend of fiber types having a first fiber comprising a PVOH homopolymer having an 88% DH and a second fiber comprising a PVOH homopolymer having a 96% DH can have a time to rupture at 23° C. in a range of about 69.00 s to about 122.00 s, for example, 69.00 s, 76.33 s, 78.33 s, 87.00 s, 93.33 s, 93.67 s, 99.00 s, 101.00 s, 102.67 s, 107.67 s, 108.67 s, or 121.33 s. Optionally, the nonwoven web including a blend of fiber types having a first fiber comprising a PVOH homopolymer having an 88% DH and a second fiber comprising a PVOH homopolymer having a 96% DH can have a disintegration time in a range of about 121.00 s to about 164.00 s, for example, 121.00 s, 122.67 s, 134.67 s, 145.00 s, 146.67 s, 154.33 s, 156.00 s, 161.33 s, or 164.00 s. Optionally, the nonwoven web including a blend of fiber types having a first fiber comprising a PVOH homopolymer having an 88% DH and a second fiber comprising a PVOH homopolymer having a 96% DH can have a time to rupture at 43° C. in a range of about 4.00 s to about 8.00 s, for example, about 4.33 s, 5.00 s, 5.33 s, 5.67 s, 6.00 s, 7.00 s, or 7.67 s. Optionally, the nonwoven web including a blend of fiber types having a first fiber comprising a PVOH homopolymer having an 88% DH and a second fiber comprising a PVOH homopolymer having a 96% DH can have a disintegration time at 40° C. in a range of about 9.5 s to about 19.00 s, for example, about 9.67 s, 10.00 s, 11.00 s, 12.00 s, 12.67 s, 13.00 s, 18.00 s, or 19.00 s.

Optionally, the nonwoven web can be a multilayer nonwoven web comprising one or more layers of a nonwoven comprising a sole fiber having a sole fiber forming material comprising a PVOH homopolymer having an 88% DH and one or more layers of a second nonwoven comprising a sole fiber forming material comprising a PVOH homopolymer having a 96% DH and a basis weight of 40 GSM. Optionally, the multilayer nonwoven includes two layers of a nonwoven comprising a sole fiber having a sole fiber forming material comprising a PVOH homopolymer having an 88% OH. Optionally, the multilayer nonwoven includes two layers of a nonwoven comprising a sole fiber having a sole fiber forming material comprising a PVOH homopolymer having a 96% DH. Optionally, the multilayer nonwoven includes one layer of a nonwoven comprising a sole fiber having a sole fiber forming material comprising a PVOH homopolymer having an 88% DH and one layer of a nonwoven comprising a sole fiber having a sole fiber forming material comprising a PVOH homopolymer having a 96% DH. Optionally, the multilayer nonwoven web comprising one or more layers of a nonwoven comprising a sole fiber having a sole fiber forming material comprising a PVOH homopolymer having an 88% DH and one or more layers of a second nonwoven comprising a sole fiber forming material comprising a PVOH homopolymer having a 96% DH can have a time to rupture at 23° C. in a range of about 18.5 s to about 108.5 s, for example, about 18.67 s, 23.00 s, 94.67 s, 101.00 s, 103.33 s, or 108.33 s. Optionally, the multilayer nonwoven web comprising two layers of a nonwoven comprising a sole fiber having a sole fiber forming material comprising a PVOH homopolymer having an 88% DH can have a disintegration time at 23° C. of about 38.5 s to about 47.00 s, for example, 38.67 s or 46.67 s. Optionally, the multilayer nonwoven web comprising one or more layers of a nonwoven comprising a sole fiber having a sole fiber forming material comprising a PVOH homopolymer having an 88% DH and one or more layers of a second nonwoven comprising a sole fiber forming material comprising a PVOH homopolymer having a 96% DH can have a time to rupture at 40° C. of about 2.00 s to about 7.5 s, for example, about 2.33 s, about 3.33 s, about 5.00 s, about 5.67 s, about 6.33 s, or about 7.33 s. Optionally, the multilayer nonwoven web comprising one or more layers of a nonwoven comprising a sole fiber having a sole fiber forming material comprising a PVOH homopolymer having an 88% DH and one or more layers of a second nonwoven comprising a sole fiber forming material comprising a PVOH homopolymer having a 96% DH can have a disintegration time at 40° C. or about 4.00 s to about 17.00 s, for example, 4.00 s, 14.33 s, 15.67 s, 16.00 s, or 17.00 s.

Optionally, the nonwoven web can be a single layer nonwoven web including a blend of fibers having a first PVOH fiber comprising a fiber forming material including a PVOH homopolymer having a 96% DH and a second non-PVOH fiber comprising a fiber forming material selected from the group consisting of polyethylene terephthalate, polylactide, viscose, cellulose, and cotton, the nonwoven web having a basis weight of 50 GSM. Optionally, the single layer nonwoven web including a blend of fibers including the first PVOH fiber and the second non-PVOH fiber can have a time to rupture at 23° C. in a range of about 123.00 s to about 158.00 s, for example, 123.33 s, 130.67 s, 134.33 s, 144.67 s, or 158.00 s. Optionally, the single layer nonwoven web including a blend of fibers including the first PVOH fiber and the second non-PVOH fiber can have a time to rupture at 40° C. in a range of about 2.00 s to about 7.5 s, for example, 2.33 s, 3.33 s, 5.00 s, 5.67 s, 6.33 s, or 7.33 s. Optionally, the single layer nonwoven web including a blend of fibers including the first PVOH fiber and the second non-PVOH fiber can have a softness value in a range of 2 to 4, for example, 2, 3, or 4.

Optionally, the nonwoven web can be a single layer nonwoven web including a blend of two fibers, each fiber comprising a sole PVOH homopolymer fiber forming material having a DH selected from the group consisting of 88%, 96%, 98%, and 99.9% and at least one of the fibers having a PVOH homopolymer fiber forming material having a DH of 98% or 99.9%. Optionally, the single layer nonwoven web including a blend of two fibers including the at least one fiber having a PVOH homopolymer fiber forming material having a DH of 98% or 99.9% can have a basis weight of 40 GSM. Optionally, the single layer nonwoven web including a blend of two fibers includes at least one fiber having a PVOH homopolymer having a DH of 98% and the second PVOH homopolymer fiber has a DH of 88% or 96% and the nonwoven web can have a time to rupture at 80° C. in a range of about 1.50 s to about 10.5 s, for example, 1.67 s, 2.00 s, 2.33 s, 2.67 s, 3.00 s, 3.33 s, 4.33 s, 4.67 s, 5.00 s, or 10.33 s. Optionally, the single layer nonwoven web including a blend of two fibers includes at least one fiber having a PVOH homopolymer having a DH of 98% and the second PVOH homopolymer fiber has a DH of 88% or 96% and the nonwoven web can have a disintegration time at 80° C. in a range of about 4.00 s to about 32.00 s, for example, 4.00 s, 4.33 s, 5.00 s, 5.33 s, 6.00 s, 6.67 s, 7.67 s, 9.33 s, 10.00 s, 13.67 s, 21.00 s, 21.33 s, or 32.00 s. Optionally, the single layer nonwoven web including a blend of two fibers includes at least one fiber having a PVOH homopolymer having a DH of 99.9% and the second PVOH homopolymer fiber has a DH of 88%, 96%, or 98% and the nonwoven web can have a time to rupture at 90° C. in a range of about 2.00 s to about 93.5 s, for example, 2.00 s, 3.00 s, 3.33 s, 4.33 s, 5.33 s, 6.67 s, 7.00 s, 7.33 s, 7.67 s, 8.00 s, 11.67 s, 13.67 s, 15.00 s, 16.33 s, 17.00 s, 18.33 s, 23.33 s, or 93.33 s. Optionally, the single layer nonwoven web including a blend of two fibers includes at least one fiber having a PVOH homopolymer having a DH of 99.9% and the second PVOH homopolymer fiber has a DH of 88%, 96%, or 98% and the nonwoven web can have a disintegration time at 90° C. in a range of about 5.00 s to about 168.5 s, for example, 5.33 s, 6.33 s, 6.67 s, 7.00 s, 8.33 s, 9.33 s, 10.33 s, 13.00 s, 13.33 s, 16.67 s, 18.33 s, 21.33 s, 21.67 s, 39.00 s, 41.00 s, 42.33 s, 19.33 s, 54.67 s, 64. S, 74.00 s, or 168.5 s.

Optionally, the nonwoven web can be a single layer nonwoven web including a blend of two fibers, each fiber comprising a sole PVOH homopolymer fiber forming material having a DH selected from the group consisting of 88%, 96%, 98%, and 99.9% and at least one of the fibers having a PVOH homopolymer fiber forming material having a DH of 98%. Optionally, the single layer nonwoven web including a blend of two fibers including the at least one fiber having a PVOH homopolymer fiber forming material having a DH of 98% can have a basis weight of 50 GSM. Optionally, the single layer nonwoven web including a blend of two fibers includes at least one fiber having a PVOH homopolymer having a DH of 98% and the second PVOH homopolymer fiber has a DH of 88% or 96% and the nonwoven web can have a thinning time at 40° C. in a range of about 5.00 s to about 18.5 s, for example, 5.33 s, 7.33 s, 10.00 s, or 18.33 s.

Optionally, the nonwoven web can be a multilayer nonwoven web comprising two layers of nonwoven webs, each layer comprising a sole fiber having a sole fiber forming material comprising a PVOH homopolymer having a DH or 88%, 96%, 98%, or 99.9% and having a basis weight of 100 GSM or 60 GSM. Optionally, the multilayer nonwoven includes one layer of a nonwoven web comprising a sole fiber having a sole fiber forming material comprising a PVOH homopolymer having an 88% DH and one layer comprising a sole fiber having a sole fiber forming material comprising a PVOH homopolymer having a DH of 96%, 98%, or 99.9%. Optionally, the multilayer nonwoven includes one layer of a nonwoven web comprising a sole fiber having a sole fiber forming material comprising a PVOH homopolymer having a 96% DH and one layer comprising a sole fiber having a sole fiber forming material comprising a PVOH homopolymer having a DH of 88%, 98%, or 99.9%. Optionally, the multilayer nonwoven includes one layer of a nonwoven web comprising a sole fiber having a sole fiber forming material comprising a PVOH homopolymer having a 98% DH and one layer comprising a sole fiber having a sole fiber forming material comprising a PVOH homopolymer having a DH of 88% or 96%. Optionally, the multilayer nonwoven includes one layer of a nonwoven web comprising a sole fiber having a sole fiber forming material comprising a PVOH homopolymer having a 99.9% DH and one layer comprising a sole fiber having a sole fiber forming material comprising a PVOH homopolymer having a DH of 88% or 96%. Optionally, the multilayer nonwoven includes one layer of a nonwoven web comprising a sole fiber having a sole fiber forming material comprising a PVOH homopolymer having an 88% DH and one layer comprising a sole fiber having a sole fiber forming material comprising a PVOH homopolymer having a DH of 98%, the multilayer nonwoven having a total basis weigh to 100 GSM and a thinning time at 40° C. in a range of 98.00 s to 134.00 s, for example, 98.00 s or 133.67 s. Optionally, the multilayer nonwoven web comprising two layers of nonwoven webs, each layer comprising a sole fiber having a sole fiber forming material comprising a PVOH homopolymer having a DH or 88%, 96%, 98%, or 99.9% and having a basis weight of 60 GSM can have a thinning time at 40° C. in a range of about 6.00 s to about 140.5 s, for example, 6.00 s, 7.00 s, 29.67 s, 44.33 s, 46.33 s, 63.33 s, 73.67 s, 94.67 s, 133.67 s, or 140.33 s.

Optionally, the nonwoven web can be a single layer nonwoven having a sole fiber having a sole fiber forming material including PVOH homopolymer having a degree of hydrolysis of 99.9%, the nonwoven having a basis weight of 40 GSM and having a degradation of at least 20% as determined by the Flushability test herein. Optionally, the nonwoven web can be a (a) single layer nonwoven having a sole fiber having a sole fiber forming material including a PVOH homopolymer having a degree of hydrolysis of 88%, 96%, or 98% and a basis weight of about 20 to about 40 GSM or (b) a multilayer nonwoven web having a basis weight in a range of about 30 GSM to about 50 GSM, wherein both layers include a sole fiber having a sole fiber forming material that is a PVOH homopolymer, the layers having PVOH homopolymers with a degree of hydrolysis of: (i) 88% and 96%; (ii) 88% and 98%; (iii) 88% and 99.9%; or (iv) 96% and 98%, the multilayer nonwoven webs having a disintegration of at least 40% as determined by the Flushability test herein.

The following types of embodiments are specifically contemplated:

| | Embodiment 1 | Embodiment 2 | Embodiment 3 | Embodiment 4 | Embodiment 5 | Embodiment 6 |
|---|---|---|---|---|---|---|
| Fiber composition | 30-85 wt. % AMPS[1] (80%-99% DH); 15-70 wt. % PVOH homopolymer (80%-99% DH) | 50-85 wt. % AMPS[1] (80%-99% DH); 15-50 wt. % PVOH homopolymer (80%-99% DH) | 60-80 wt. % AMPS[1] (80%-99% DH); 20-40 wt. % PVOH homopolymer (80%-99% DH) | PVOH homopolymer 80-99% DH, or 98% DH | PVOH homopolymer 96-98% DH, or 96% DH | PVOH homopolymer 80-96% DH, or 80-90% DH, or 88% DH |
| Basis weight (g/m$^2$) | 20-80, or 30-70, or 30-60, or 30-45, or 45-60, or 30, or 45, or 60 | 20-80, or 30-70, or 30-60, or 30-45, or 45-60, or 30, or 45, or 60 | 20-80, or 30-70, or 30-60, or 30-45, or 45-60, or 30, or 45, or 60 | 20-80, or 30-70, or 30-50, or 35-40, or 35, or 40 | 20-80, or 30-70, or 30-50, or 35-40, or 35, or 40 | 20-80, or 30-70, or 30-50, or 35-40, or 35, or 40 |
| Fineness (dtex) | 1-10, 1-3, or 1.7-2.2, or 1.7, or 2.2 | 1-10, 1-3, or 1.7-2.2, or 1.7, or 2.2 | 1-10, 1-3, or 1.7-2.2, or 1.7, or 2.2 | 1-10, 1-3, or 1.7-2.2, or 1.7, or 2.2 | 1-10, 1-3, or 1.7-2.2, or 1.7, or 2.2 | 1-10, 1-3, or 1.7-2.2, or 1.7, or 2.2 |
| Tenacity (cN/dtex) | 1-10, or 3-8, or 4.36 | 1-10, or 3-8, or 4.36 | 1-10, or 3-8, or 4.36 | 1-10, or 5-7, or 5, or 6, or 7 | 1-10, or 5-7, or 5, or 6, or 7 | 1-10, or 5-7, or 5, or 6, or 7 |
| Elongation (%) | 2-50, or 5-40, or 5-20, or 5-10, or 7.8-20, or 7.8-15, or 7.8-12, or 7.8. or 12, or 15, or 20 | 2-50, or 5-40, or 5-20, or 5-10, or 7.8-20, or 7.8-15, or 7.8-12, or 7.8. or 12, or 15, or 20 | 2-50, or 5-40, or 5-20, or 5-10, or 7.8-20, or 7.8-15, or 7.8-12, or 7.8. or 12, or 15, or 20 | 2-50, or 5-40, or 5-20, or 5-10, or 7.8-20, or 12-20, or 12-15, or 12, or 15, or 20 | 2-50, or 5-40, or 5-20, or 5-10, or 7.8-20, or 12-20, or 12-15, or 5-20, or 12, or 15, or 20 | 2-50, or 5-40, or 5-20, or 5-10, or 7.8-20, or 12-20, or 12-15, or 5-20, or 12, or 15, or 20 |

[1]AMPS = 2-acrylamido-2-methylpropane sulfonic acid modified PVOH having 2 mol % modification In general, all water-dispersible webs that are water-soluble can be flushable, provided that any additives added to the webs are suitable for disposal in a liquid sewage system. Water-dispersible webs of the disclosure can also be flushable, for example, when the web includes a water-soluble fiber in an amount relative to any water-insoluble fibers to allow sufficient breakdown of the web and/or when the water-insoluble fibers include a sufficient amount of water-soluble resins in the fiber to allow sufficient breakdown of the web, i.e., at least 20% disintegration as determined by the Flushability Test disclosed herein. The following types of embodiments are specifically contemplated:

| | Web Flushable (F) or Water- | Water-Soluble Fiber(s) | | | | Water-Insoluble Fiber(s) | | | | | |
|---|---|---|---|---|---|---|---|---|---|---|---|
| | | Single Resin(s) | | Resin Blend(s) | | Single Resin(s) | | Resin Blend(s) | | Web | |
| Embodiment | Dispersible and Flushable (WF) | Additives | Additive Free | Additives | Additive Free | Additives | Additive Free | Additives | Additive Free | Additives | Additive Free |
| 7 | F | X | | | | X | | | | | X |
| 8 | F | X | | | | | X | | | | X |
| 9 | F | X | | | | | | X | | | X |
| 10 | F | X | | | | | | | X | | X |
| 11 | F | X | | | | | | | | | X |
| 12 | F | | X | | | X | | | | | X |
| 13 | F | | X | | | | X | | | | X |
| 14 | F | | X | | | | | X | | | X |
| 15 | F | | X | | | | | | X | | X |
| 16 | F | | X | | | | | | | | X |
| 17 | F | | | X | | X | | | | | X |
| 18 | F | | | X | | | X | | | | X |
| 19 | F | | | X | | | | X | | | X |
| 20 | F | | | X | | | | | X | | X |
| 21 | F | | | X | | | | | | | X |
| 22 | F | | | | X | X | | | | | X |
| 23 | F | | | | X | | X | | | | X |
| 24 | F | | | | X | | | X | | | X |
| 25 | F | | | | X | | | | X | | X |
| 26 | F | | | | X | | | | | | X |
| 27 | F | X | | | | X | | | | X | |
| 28 | F | X | | | | | X | | | X | |
| 29 | F | X | | | | | | X | | X | |
| 30 | F | X | | | | | | | X | X | |
| 31 | F | X | | | | | | | | X | |
| 32 | F | | X | | | X | | | | X | |
| 33 | F | | X | | | | X | | | X | |
| 34 | F | | X | | | | | X | | X | |
| 35 | F | | X | | | | | | X | X | |
| 36 | F | | X | | | | | | | X | |

-continued

| | | Water-Soluble Fiber(s) | | | | Water-Insoluble Fiber(s) | | | | | |
|---|---|---|---|---|---|---|---|---|---|---|---|
| | Web Flushable (F) or Water- | Single Resin(s) | | Resin Blend(s) | | Single Resin(s) | | Resin Blend(s) | | Web | |
| Embodiment | Dispersible and Flushable (WF) | Additives | Additive Free | Additives | Additive Free | Additives | Additive Free | Additives | Additive Free | Additives | Additive Free |
| 37 | F | | | X | | X | | | | X | |
| 38 | F | | | X | | | X | | | X | |
| 39 | F | | | X | | | | X | | X | |
| 40 | F | | | X | | | | | X | X | |
| 41 | F | | | X | | | | | | X | |
| 42 | F | | | | X | X | | | | X | |
| 43 | F | | | | X | | X | | | X | |
| 44 | F | | | | X | | | X | | X | |
| 45 | F | | | | X | | | | X | X | |
| 46 | F | | | | X | | | | | X | |
| 47 | WF | X | | | | X | | | | | X |
| 48 | WF | X | | | | | X | | | | X |
| 49 | WF | X | | | | | | X | | | X |
| 50 | WF | X | | | | | | | X | | X |
| 51 | WF | X | | | | | | | | | X |
| 52 | WF | | X | | | X | | | | | X |
| 53 | WF | | X | | | | X | | | | X |
| 54 | WF | | X | | | | | X | | | X |
| 55 | WF | | X | | | | | | X | | X |
| 56 | WF | | X | | | | | | | | X |
| 57 | WF | | | X | | X | | | | | X |
| 58 | WF | | | X | | | X | | | | X |
| 59 | WF | | | X | | | | X | | | X |
| 60 | WF | | | X | | | | | X | | X |
| 61 | WF | | | X | | | | | | | X |
| 62 | WF | | | | X | X | | | | | X |
| 63 | WF | | | | X | | X | | | | X |
| 64 | WF | | | | X | | | X | | | X |
| 65 | WF | | | | X | | | | X | | X |
| 66 | WF | | | | X | | | | | | X |
| 67 | WF | X | | | | X | | | | X | |
| 68 | WF | X | | | | | X | - | | X | |
| 69 | WF | X | | | | | | X | | X | |
| 70 | WF | X | | | | | | | X | X | |
| 71 | WF | X | | | | | | | | X | |
| 72 | WF | | X | | | X | | | | X | |
| 73 | WF | | X | | | | X | | | X | |
| 74 | WF | | X | | | | | X | | X | |
| 75 | WF | | X | | | | | | X | X | |
| 76 | WF | | X | | | | | | | X | |
| 77 | WF | | | X | | X | | | | X | |
| 78 | WF | | | X | | | X | | | X | |
| 79 | WF | | | X | | | | X | | X | |
| 80 | WF | | | X | | | | | X | X | |
| 81 | WF | | | X | | | | | | X | |
| 82 | WF | | | | X | X | | | | X | |
| 83 | WF | | | | X | | X | | | X | |
| 84 | WF | | | | X | | | X | | X | |
| 85 | WF | | | | X | | | | X | X | |
| 86 | WF | | | | X | | | | | X | |
| 87 | F | X | | X | | X | | | | | X |
| 88 | F | X | | X | | | X | | | | X |
| 89 | F | X | | X | | | | X | | | X |
| 90 | F | X | | X | | | | | X | | X |
| 91 | F | X | | X | | | | | | | X |
| 92 | F | X | | | X | X | | | | | X |
| 93 | F | X | | | X | | X | | | | X |
| 94 | F | X | | | X | | | X | | | X |
| 95 | F | X | | | X | | | | X | | X |
| 96 | F | X | | | X | | | | | | X |
| 97 | F | | X | X | | X | | | | | X |
| 98 | F | | X | X | | | X | | | | X |
| 99 | F | | X | X | | | | X | | | X |
| 100 | F | | X | X | | | | | X | | X |
| 101 | F | | X | X | | | | | | | X |
| 102 | F | | X | | X | X | | | | | X |
| 103 | F | | X | | X | | X | | | | X |
| 104 | F | | X | | X | | | X | | | X |
| 105 | F | | X | | X | | | | X | | X |
| 106 | F | | X | | X | | | | | | X |
| 107 | F | X | | X | | X | | | | X | |

-continued

| Embodiment | Web Flushable (F) or Water-Dispersible and Flushable (WF) | Water-Soluble Fiber(s) | | | | Water-Insoluble Fiber(s) | | | | Web | |
|---|---|---|---|---|---|---|---|---|---|---|---|
| | | Single Resin(s) | | Resin Blend(s) | | Single Resin(s) | | Resin Blend(s) | | | |
| | | Additives | Additive Free | Additives | Additive Free | Additives | Additive Free | Additives | Additive Free | Additives | Additive Free |
| 108 | F | X | | X | | | X | | | X | |
| 109 | F | X | | X | | | | X | | X | |
| 110 | F | X | | X | | | | | X | X | |
| 111 | F | X | | X | | | | | | X | |
| 112 | F | X | | | X | X | | | | X | |
| 113 | F | X | | | X | | X | | | X | |
| 114 | F | X | | | X | | | X | | X | |
| 115 | F | X | | | X | | | | X | X | |
| 116 | F | X | | | X | | | | | X | |
| 117 | F | | X | X | | X | | | | X | |
| 118 | F | | X | X | | | X | | | X | |
| 119 | F | | X | X | | | | X | | X | |
| 120 | F | | X | X | | | | | X | X | |
| 121 | F | | X | X | | | | | | X | |
| 122 | F | | X | | X | X | | | | X | |
| 123 | F | | X | | X | | X | | | X | |
| 124 | F | | X | | X | | | X | | X | |
| 125 | F | | X | | X | | | | X | X | |
| 126 | F | | X | | X | | | | | X | |
| 127 | F | X | | | | X | | X | | | X |
| 128 | F | | X | | | X | | X | | | X |
| 129 | F | | | X | | X | | X | | | X |
| 130 | F | | | | X | X | | X | | | X |
| 131 | F | X | | | | | X | X | | | X |
| 132 | F | | X | | | | X | X | | | X |
| 133 | F | | | X | | | X | X | | | X |
| 134 | F | | | | X | | X | X | | | X |
| 135 | F | X | | | | X | | | X | | X |
| 136 | F | | X | | | X | | | X | | X |
| 137 | F | | | X | | X | | | X | | X |
| 138 | F | | | | X | X | | | X | | X |
| 139 | F | X | | | | | X | | X | | X |
| 140 | F | | X | | | | X | | X | | X |
| 141 | F | | | X | | | X | | X | | X |
| 142 | F | | | | X | | X | | X | | X |
| 143 | F | X | | | | X | | X | | X | |
| 144 | F | | X | | | X | | X | | X | |
| 145 | F | | | X | | X | | X | | X | |
| 146 | F | | | | X | X | | X | | X | |
| 147 | F | X | | | | | X | X | | X | |
| 148 | F | | X | | | | X | X | | X | |
| 149 | F | | | X | | | X | X | | X | |
| 150 | F | | | | X | | X | X | | X | |
| 151 | F | X | | | | X | | | X | X | |
| 152 | F | | X | | | X | | | X | X | |
| 153 | F | | | X | | X | | | X | X | |
| 154 | F | | | | X | X | | | X | X | |
| 155 | F | X | | | | | X | | X | X | |
| 156 | F | | X | | | | X | | X | X | |
| 157 | F | | | X | | | X | | X | X | |
| 158 | F | | | | X | | X | | X | X | |
| 159 | WF | X | | X | | X | | | | | X |
| 160 | WF | X | | X | | | X | | | | X |
| 161 | WF | X | | X | | | | X | | | X |
| 162 | WF | X | | X | | | | | X | | X |
| 163 | WF | X | | X | | | | | | | X |
| 164 | WF | X | | | X | X | | | | | X |
| 165 | WF | X | | | X | | X | | | | X |
| 166 | WF | X | | | X | | | X | | | X |
| 167 | WF | X | | | X | | | | X | | X |
| 168 | WF | X | | | X | | | | | | X |
| 169 | WF | | X | X | | X | | | | | X |
| 170 | WF | | X | X | | | X | | | | X |
| 171 | WF | | X | X | | | | X | | | X |
| 172 | WF | | X | X | | | | | X | | X |
| 173 | WF | | X | X | | | | | | | X |
| 174 | WF | | X | | X | X | | | | | X |
| 175 | WF | | X | | X | | X | | | | X |
| 176 | WF | | X | | X | | | X | | | X |
| 177 | WF | | X | | X | | | | X | | X |
| 178 | WF | | X | | X | | | | | | X |

-continued

| Embodiment | Web Flushable (F) or Water-Dispersible and Flushable (WF) | Water-Soluble Fiber(s) | | | | Water-Insoluble Fiber(s) | | | | Web | |
|---|---|---|---|---|---|---|---|---|---|---|---|
| | | Single Resin(s) | | Resin Blend(s) | | Single Resin(s) | | Resin Blend(s) | | | |
| | | Additives | Additive Free | Additives | Additive Free | Additives | Additive Free | Additives | Additive Free | Additives | Additive Free |
| 179 | WF | X | | X | | X | | | | X | |
| 180 | WF | X | | X | | | X | | | X | |
| 181 | WF | X | | X | | | | X | | X | |
| 182 | WF | X | | X | | | | | X | X | |
| 183 | WF | X | | X | | | | | | X | |
| 184 | WF | X | | | X | X | | | | X | |
| 185 | WF | X | | | X | | X | | | X | |
| 186 | WF | X | | | X | | | X | | X | |
| 187 | WF | X | | | X | | | | X | X | |
| 188 | WF | X | | | X | | | | | X | |
| 189 | WF | | X | X | | X | | | | X | |
| 190 | WF | | X | X | | | X | | | X | |
| 191 | WF | | X | X | | | | X | | X | |
| 192 | WF | | X | X | | | | | X | X | |
| 193 | WF | | X | X | | | | | | X | |
| 194 | WF | | X | | X | X | | | | X | |
| 195 | WF | | X | | X | | X | | | X | |
| 196 | WF | | X | | X | | | X | | X | |
| 197 | WF | | X | | X | | | | X | X | |
| 198 | WF | | X | | X | | | | | X | |
| 199 | WF | X | | | | X | | X | | | X |
| 200 | WF | | X | | | X | | X | | | X |
| 201 | WF | | | X | | X | | X | | | X |
| 202 | WF | | | | X | X | | X | | | X |
| 203 | WF | X | | | | | X | X | | | X |
| 204 | WF | | X | | | | X | X | | | X |
| 205 | WF | | | X | | | X | X | | | X |
| 206 | WF | | | | X | | X | X | | | X |
| 207 | WF | X | | | | X | | | X | | X |
| 208 | WF | | X | | | X | | | X | | X |
| 209 | WF | | | X | | X | | | X | | X |
| 210 | WF | | | | X | X | | | X | | X |
| 211 | WF | X | | | | | X | | X | | X |
| 212 | WF | | X | | | | X | | X | | X |
| 213 | WF | | | X | | | X | | X | | X |
| 214 | WF | | | | X | | X | | X | | X |
| 215 | WF | X | | | | X | | X | | X | |
| 216 | WF | | X | | | X | | X | | X | |
| 217 | WF | | | X | | X | | X | | X | |
| 218 | WF | | | | X | X | | X | | X | |
| 219 | WF | X | | | | | X | X | | X | |
| 220 | WF | | X | | | | X | X | | X | |
| 221 | WF | | | X | | | X | X | | X | |
| 222 | WF | | | | X | | X | X | | X | |
| 223 | WF | X | | | | X | | | X | X | |
| 224 | WF | | X | | | X | | | X | X | |
| 225 | WF | | | X | | X | | | X | X | |
| 226 | WF | | | | X | X | | | X | X | |
| 227 | WF | X | | | | | X | | X | X | |
| 228 | WF | | X | | | | X | | X | X | |
| 229 | WF | | | X | | | X | | X | X | |
| 230 | WF | | | | X | | X | | X | X | |
| 231 | F | X | | X | | X | | X | | | X |
| 232 | F | X | | | X | X | | X | | | X |
| 233 | F | | X | X | | X | | X | | | X |
| 234 | F | | X | | X | X | | X | | | X |
| 235 | F | X | | X | | | X | X | | | X |
| 236 | F | X | | | X | | X | X | | | X |
| 237 | F | | X | X | | | X | X | | | X |
| 238 | F | | X | | X | | X | X | | | X |
| 239 | F | X | | X | | X | | | X | | X |
| 240 | F | X | | | X | X | | | X | | X |
| 241 | F | | X | X | | X | | | X | | X |
| 242 | F | | X | | X | X | | | X | | X |
| 243 | F | X | | X | | | X | | X | | X |
| 244 | F | X | | | X | | X | | X | | X |
| 245 | F | | X | X | | | X | | X | | X |
| 246 | F | | X | | X | | X | | X | | X |
| 247 | F | X | | X | | X | | X | | X | |
| 248 | F | X | | | X | X | | X | | X | |
| 249 | F | | X | X | | X | | X | | X | |

-continued

| Embodiment | Web Flushable (F) or Water-Dispersible and Flushable (WF) | Water-Soluble Fiber(s) Single Resin(s) Additives | Water-Soluble Fiber(s) Single Resin(s) Additive Free | Water-Soluble Fiber(s) Resin Blend(s) Additives | Water-Soluble Fiber(s) Resin Blend(s) Additive Free | Water-Insoluble Fiber(s) Single Resin(s) Additives | Water-Insoluble Fiber(s) Single Resin(s) Additive Free | Water-Insoluble Fiber(s) Resin Blend(s) Additives | Water-Insoluble Fiber(s) Resin Blend(s) Additive Free | Web Additives | Web Additive Free |
|---|---|---|---|---|---|---|---|---|---|---|---|
| 250 | F | | X | | X | X | | X | | X | |
| 251 | F | X | | X | | | X | X | | X | |
| 252 | F | X | | | X | | X | X | | X | |
| 253 | F | | X | X | | | X | X | | X | |
| 254 | F | | X | | X | | X | X | | X | |
| 255 | F | X | | X | | X | | | X | X | |
| 256 | F | X | | | X | X | | | X | X | |
| 257 | F | | X | X | | X | | | X | X | |
| 258 | F | | X | | X | X | | | X | X | |
| 259 | F | X | | X | | | X | | X | X | |
| 260 | F | X | | | X | | X | | X | X | |
| 261 | F | | X | X | | | X | | X | X | |
| 262 | F | | X | | X | | X | | X | X | |
| 263 | WF | X | | X | | X | | X | | | X |
| 264 | WF | X | | | X | X | | X | | | X |
| 265 | WF | | X | X | | X | | X | | | X |
| 266 | WF | | X | | X | X | | X | | | X |
| 267 | WF | X | | X | | | X | X | | | X |
| 268 | WF | X | | | X | | X | X | | | X |
| 269 | WF | | X | X | | | X | X | | | X |
| 270 | WF | | X | | X | | X | X | | | X |
| 271 | WF | X | | X | | X | | | X | | X |
| 272 | WF | X | | | X | X | | | X | | X |
| 273 | WF | | X | X | | X | | | X | | X |
| 274 | WF | | X | | X | X | | | X | | X |
| 275 | WF | X | | X | | | X | | X | | X |
| 276 | WF | X | | | X | | X | | X | | X |
| 277 | WF | | X | X | | | X | | X | | X |
| 278 | WF | | X | | X | | X | | X | | X |
| 279 | WF | X | | X | | X | | X | | X | |
| 280 | WF | X | | | X | X | | X | | X | |
| 281 | WF | | X | X | | X | | X | | X | |
| 282 | WF | | X | | X | X | | X | | X | |
| 283 | WF | X | | X | | | X | X | | X | |
| 284 | WF | X | | | X | | X | X | | X | |
| 285 | WF | | X | X | | | X | X | | X | |
| 286 | WF | | X | | X | | X | X | | X | |
| 287 | WF | X | | X | | X | | | X | X | |
| 288 | WF | X | | | X | X | | | X | X | |
| 289 | WF | | X | X | | X | | | X | X | |
| 290 | WF | | X | | X | X | | | X | X | |
| 291 | WF | X | | X | | | X | | X | X | |
| 292 | WF | X | | | X | | X | | X | X | |
| 293 | WF | | X | X | | | X | | X | X | |
| 294 | WF | | X | | X | | X | | X | X | |

In the foregoing embodiments including a blend of water-soluble fiber forming materials in the water-soluble fibers, the water-soluble fiber forming materials can include one or more PVOH homopolymers, one or more PVOH copolymers, one or more non-PVOH polymers or a combination thereof. The follow types of refinements of the foregoing embodiments are contemplated, wherein in refinements wherein only one type of polymer is identified, it is intended to refer to a blend of the identified polymer type:

Contemplated resin combinations for water-soluble fibers including a blend of fiber forming materials

| Polymer Type | 17 a | 17 b | 17 c | 17 d | 17 e | 17 f | 17 g | 18 a | 18 b | 18 c | 18 d | 18 e | 18 f | 18 g | 19 a | 19 b | 19 c | 19 d | 19 e | 19 f | 19 g |
|---|---|---|---|---|---|---|---|---|---|---|---|---|---|---|---|---|---|---|---|---|---|
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

-continued

Contemplated resin combinations for water-soluble fibers including a blend of fiber forming materials

| | 22 | | | | | | | 23 | | | | | | | 24 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 38 | | | | | | | 39 | | | | | | | 40 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 43 | | | | | | | 44 | | | | | | | 45 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 58 | | | | | | | 59 | | | | | | | 60 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 63 | | | | | | | 64 | | | | | | | 65 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 78 | | | | | | | 79 | | | | | | | 80 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 83 | | | | | | | 84 | | | | | | | 85 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 88 | | | | | | | 89 | | | | | | | 90 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 93 | | | | | | | 94 | | | | | | | 95 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

-continued

Contemplated resin combinations for water-soluble fibers including a blend of fiber forming materials

| | 98 | | | | | | | 99 | | | | | | | 100 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 103 | | | | | | | 104 | | | | | | | 105 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 108 | | | | | | | 109 | | | | | | | 110 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 113 | | | | | | | 114 | | | | | | | 115 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 118 | | | | | | | 119 | | | | | | | 120 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 123 | | | | | | | 124 | | | | | | | 125 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 130 | | | | | | | 133 | | | | | | | 134 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 141 | | | | | | | 142 | | | | | | | 145 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 150 | | | | | | | 153 | | | | | | | 154 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

-continued

Contemplated resin combinations for water-soluble fibers including a blend of fiber forming materials

| | 159 | | | | | | | 160 | | | | | | | 161 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 164 | | | | | | | 165 | | | | | | | 166 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 169 | | | | | | | 170 | | | | | | | 171 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 174 | | | | | | | 175 | | | | | | | 176 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 179 | | | | | | | 180 | | | | | | | 181 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 184 | | | | | | | 185 | | | | | | | 186 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 189 | | | | | | | 190 | | | | | | | 191 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 194 | | | | | | | 195 | | | | | | | 196 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 201 | | | | | | | 202 | | | | | | | 205 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

-continued

Contemplated resin combinations for water-soluble fibers including a blend of fiber forming materials

| | 210 | | | | | | | 213 | | | | | | | 214 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 221 | | | | | | | 222 | | | | | | | 225 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 230 | | | | | | | 231 | | | | | | | 232 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 235 | | | | | | | 236 | | | | | | | 237 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 240 | | | | | | | 241 | | | | | | | 242 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 245 | | | | | | | 246 | | | | | | | 247 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 250 | | | | | | | 251 | | | | | | | 252 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 255 | | | | | | | 256 | | | | | | | 257 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | 260 | | | | | | | 261 | | | | | | | 262 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

-continued

Contemplated resin combinations for water-soluble fibers including a blend of fiber forming materials

| | 265 | | | | | | | 266 | | | | | | | 267 | | | | | | |
|---|---|---|---|---|---|---|---|---|---|---|---|---|---|---|---|---|---|---|---|---|---|
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 273 | | | | | | | 271 | | | | | | | 272 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 275 | | | | | | | 276 | | | | | | | 277 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 281 | | | | | | | 282 | | | | | | | 283 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |
| | 286 | | | | | | | 287 | | | | | | | 288 | | | | | | |
| | a | b | c | d | e | f | g | a | b | c | d | e | f | g | a | b | c | d | e | f | g |
| PVOH homopolymer(s) | X | X | | X | X | | | X | X | | X | X | | | X | X | | X | X | | |
| PVOH copolymer(s) | X | | X | X | | X | | X | | X | X | | X | | X | | X | X | | X | |
| non-PVOH polymer(s) | | X | X | X | | | X | | X | X | X | | | X | | X | X | X | | | X |

| | Embodiments | | | | | | | | | | | | | |
|---|---|---|---|---|---|---|---|---|---|---|---|---|---|---|
| | 20 | | | | | | | 21 | | | | | | |
| Polymer Type | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 25 | | | | | | | 26 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 41 | | | | | | | 42 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 46 | | | | | | | 57 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

-continued

Contemplated resin combinations for water-soluble fibers including a blend of fiber forming materials

| | 61 | | | | | | | 62 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 66 | | | | | | | 77 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 81 | | | | | | | 82 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 86 | | | | | | | 87 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 91 | | | | | | | 92 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 96 | | | | | | | 97 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 101 | | | | | | | 102 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 106 | | | | | | | 107 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 111 | | | | | | | 112 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

-continued

Contemplated resin combinations for water-soluble fibers including a blend of fiber forming materials

| | 116 | | | | | | | 117 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 121 | | | | | | | 122 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 126 | | | | | | | 129 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 137 | | | | | | | 138 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 146 | | | | | | | 149 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 157 | | | | | | | 158 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 162 | | | | | | | 163 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 167 | | | | | | | 168 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 172 | | | | | | | 173 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

-continued

Contemplated resin combinations for water-soluble fibers including a blend of fiber forming materials

| | 177 | | | | | | | 178 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 182 | | | | | | | 183 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 187 | | | | | | | 188 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 192 | | | | | | | 193 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 197 | | | | | | | 198 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 206 | | | | | | | 209 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 217 | | | | | | | 218 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 226 | | | | | | | 229 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 233 | | | | | | | 234 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

-continued

Contemplated resin combinations for water-soluble fibers including a blend of fiber forming materials

| | 238 | | | | | | | 239 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 243 | | | | | | | 244 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 248 | | | | | | | 249 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 253 | | | | | | | 254 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 258 | | | | | | | 259 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 263 | | | | | | | 264 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 268 | | | | | | | 269 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 273 | | | | | | | 274 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

| | 278 | | | | | | | 279 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

-continued

Contemplated resin combinations for water-soluble fibers including a blend of fiber forming materials

| | 284 | | | | | | | 285 | | | | | | |
|---|---|---|---|---|---|---|---|---|---|---|---|---|---|---|
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 289 | | | | | | | 290 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 291 | | | | | | | 292 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |
| | 293 | | | | | | | 294 | | | | | | |
| | a | b | c | d | e | f | g | a | b | c | d | e | f | g |
| PVOH homopolymer(s) | X | X | | X | X | | | X | X | | X | X | | |
| PVOH copolymer(s) | X | | X | X | | X | | X | | X | X | | X | |
| non-PVOH polymer(s) | | X | X | X | | | X | | X | X | X | | | X |

In the foregoing embodiments including a blend of fiber forming materials in the water-insoluble fibers, the fiber forming materials can include one or more water-insoluble polymers and, optionally, one or more water-soluble polymers, wherein the one or more water-soluble polymers can include one or more PVOH homopolymers, one or more PVOH copolymers, one or more non-PVOH polymers or a combination thereof. The follow types of refinements of the foregoing embodiments are contemplated, wherein in refinements wherein only one type of polymer is identified, it is intended to refer to a blend of the identified polymer type:

Contemplated resin combinations for water insoluble fibers including a blend of resins

| | | Embodiments | | | | | | | | | | | | | | | |
|---|---|---|---|---|---|---|---|---|---|---|---|---|---|---|---|---|---|
| | | 9 | | | | | | | | 10 | | | | | | | |
| Polymer type | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 19 | | | | | | | | 20 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 29 | | | | | | | | 30 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | | | | | | | | | | | | | | | | |
|---|---|---|---|---|---|---|---|---|---|---|---|---|---|---|---|---|---|
| | | 39 | | | | | | | | 40 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 49 | | | | | | | | 50 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 59 | | | | | | | | 60 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 69 | | | | | | | | 70 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 79 | | | | | | | | 80 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 89 | | | | | | | | 90 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 99 | | | | | | | | 100 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 109 | | | | | | | | 110 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

| Contemplated resin combinations for water insoluble fibers including a blend of resins | | | | | | | | | | | | | | | | | |
|---|---|---|---|---|---|---|---|---|---|---|---|---|---|---|---|---|---|
| | | 119 | | | | | | | | 120 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 126 | | | | | | | | 127 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 130 | | | | | | | | 131 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 134 | | | | | | | | 135 | | | | | | | |
| | | h | i | j | k | l | m | n | o | h | i | j | k | l | m | n | o |
| Water-insolublepolymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 138 | | | | | | | | 139 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 142 | | | | | | | | 143 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 146 | | | | | | | | 147 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 150 | | | | | | | | 151 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | 154 | | | | | | | | 155 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 158 | | | | | | | | 161 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 167 | | | | | | | | 171 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 177 | | | | | | | | 181 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 187 | | | | | | | | 191 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 197 | | | | | | | | 199 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 202 | | | | | | | | 203 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 206 | | | | | | | | 206 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | 210 | | | | | | | | 211 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 214 | | | | | | | | 215 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 218 | | | | | | | | 219 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 222 | | | | | | | | 223 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 226 | | | | | | | | 227 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 230 | | | | | | | | 231 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 234 | | | | | | | | 235 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 238 | | | | | | | | 239 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | 242 | | | | | | | | 243 | | | | | | | |
|---|---|---|---|---|---|---|---|---|---|---|---|---|---|---|---|---|
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 246 | | | | | | | | 247 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 250 | | | | | | | | 251 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 254 | | | | | | | | 255 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 258 | | | | | | | | 259 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 262 | | | | | | | | 263 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 266 | | | | | | | | 267 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 270 | | | | | | | | 271 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |

-continued

Contemplated resin combinations for water insoluble fibers including a blend of resins

| | 274 | | | | | | | | 275 | | | | | | | |
|---|---|---|---|---|---|---|---|---|---|---|---|---|---|---|---|---|
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 278 | | | | | | | | 279 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 282 | | | | | | | | 283 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 286 | | | | | | | | 287 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 290 | | | | | | | | 291 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |

| | Embodiments | | | | | | | | | | | | | | | |
|---|---|---|---|---|---|---|---|---|---|---|---|---|---|---|---|---|
| | 14 | | | | | | | | 15 | | | | | | | |
| Polymer type | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 24 | | | | | | | | 25 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |
| | 34 | | | | | | | | 35 | | | | | | | |
| | h | i | j | k | l | m | n | o | h | i | j | k | l | m | n | o |
| Water-insoluble polymer(s) | x | x | x | x | x | x | x | x | x | x | x | x | x | x | x | x |
| Water PVOH homopolymer(s) | | x | | | x | x | | x | | x | | | x | x | | x |
| Soluble PVOH copolymer(s) | | | x | | x | | x | x | | | x | | x | | x | x |
| polymer non-PVOH polymer(s) | | | | x | | x | x | x | | | | x | | x | x | x |

-continued

Contemplated resin combinations for water insoluble fibers including a blend of resins

| | | 44 | | | | | | | | 45 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 54 | | | | | | | | 55 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 64 | | | | | | | | 65 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 74 | | | | | | | | 75 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 84 | | | | | | | | 85 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 94 | | | | | | | | 95 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 104 | | | | | | | | 105 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 114 | | | | | | | | 115 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | 124 | | | | | | | | 125 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 128 | | | | | | | | 129 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 132 | | | | | | | | 133 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 136 | | | | | | | | 137 | | | | | | | |
| | | h | i | j | k | l | m | n | o | h | i | j | k | l | m | n | o |
| Water-insolublepolymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 140 | | | | | | | | 141 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 144 | | | | | | | | 145 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 148 | | | | | | | | 149 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 152 | | | | | | | | 153 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | 156 | | | | | | | | 157 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 162 | | | | | | | | 166 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 172 | | | | | | | | 176 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 182 | | | | | | | | 186 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 192 | | | | | | | | 196 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 200 | | | | | | | | 201 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 204 | | | | | | | | 205 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 208 | | | | | | | | 209 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

| Contemplated resin combinations for water insoluble fibers including a blend of resins | | | | | | | | | | | | | | | | | |
|---|---|---|---|---|---|---|---|---|---|---|---|---|---|---|---|---|---|
| | | 212 | | | | | | | | 213 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 216 | | | | | | | | 217 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 220 | | | | | | | | 221 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 224 | | | | | | | | 225 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 228 | | | | | | | | 229 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 232 | | | | | | | | 233 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 236 | | | | | | | | 237 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 240 | | | | | | | | 241 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | 244 | | | | | | | | 245 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 248 | | | | | | | | 249 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 252 | | | | | | | | 253 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 256 | | | | | | | | 257 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 260 | | | | | | | | 261 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 264 | | | | | | | | 265 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 268 | | | | | | | | 269 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |
| | | 272 | | | | | | | | 273 | | | | | | | |
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

-continued

Contemplated resin combinations for water insoluble fibers including a blend of resins

| | | 276 | | | | | | | | 277 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 280 | | | | | | | | 281 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 284 | | | | | | | | 285 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 288 | | | | | | | | 289 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 292 | | | | | | | | 293 | | | | | | | |
|---|---|---|---|---|---|---|---|---|---|---|---|---|---|---|---|---|---|
| | | h | i | j | k | l | m | n | o | h | i | j | k | l | m | n | o |
| Water-insoluble polymer(s) | | x | x | x | x | x | x | x | x | x | x | x | x | x | x | x | x |
| Water | PVOH homopolymer(s) | | x | | | x | x | | x | | x | | | x | x | | x |
| Soluble | PVOH copolymer(s) | | | x | | x | | x | x | | | x | | x | | x | x |
| polymer | non-PVOH polymer(s) | | | | x | | x | x | x | | | | x | | x | x | x |

| | | 294 | | | | | | | |
|---|---|---|---|---|---|---|---|---|---|
| | | h | i | j | k | l | m | n | o |
| Water-insoluble polymer(s) | | x | x | x | x | x | x | x | x |
| Water | PVOH homopolymer(s) | | x | | | x | x | | x |
| Soluble | PVOH copolymer(s) | | | x | | x | | x | x |
| polymer | non-PVOH polymer(s) | | | | x | | x | x | x |

Specifically contemplated embodiments of the disclosure are herein described in the following numbered paragraphs. These embodiments are intended to be illustrative in nature and not intended to be limiting.

1. A water-dispersible nonwoven web, said web comprising a plurality of water-soluble fibers.

2. The water-dispersible nonwoven web of paragraph 1, wherein the plurality of water-soluble fibers comprise a blend of water-soluble polymers.

3. The water-dispersible nonwoven web of paragraph 1 or paragraph 2, wherein the plurality of water-soluble fibers comprise a fiber comprising a polyvinyl alcohol polymer fiber forming material.

4. The water-dispersible nonwoven web of paragraph 3, wherein the polyvinyl alcohol polymer comprises a polyvinyl alcohol homopolymer, a polyvinyl alcohol copolymer, or a combination thereof.

5. The water-dispersible nonwoven web of paragraph 3 or 4, wherein the polyvinyl alcohol copolymer comprises an anionic modified polyvinyl alcohol copolymer.

6. The water-dispersible nonwoven web of paragraph 5, wherein the anionic modified polyvinyl alcohol copolymer has a degree of modification in a range of about 1 mol. % to about 10 mol. %.

7. The water-dispersible nonwoven web of any one of paragraphs 3 to 6, wherein the polyvinyl alcohol polymer comprises a polyvinyl alcohol homopolymer and a polyvinyl alcohol copolymer.

8. The water-dispersible nonwoven web of paragraph 7, wherein the polyvinyl alcohol homopolymer comprises about 15 wt % to about 70 wt %, based on the total weight of the polyvinyl alcohol polymer and the copolymer comprises about 30 wt % to about 85 wt. %, based on the total weight of the polyvinyl alcohol polymer.

9. The water-dispersible nonwoven web of any one of paragraphs 3 to 8, wherein the polyvinyl alcohol polymer has a degree of hydrolysis in a range of about 75% to about 99.9%.

10. The water-dispersible nonwoven web of paragraph 9, wherein the polyvinyl alcohol polymer has a degree of hydrolysis in a range of about 80% to about 90%.

11. The water-dispersible nonwoven web of paragraph 9, wherein the polyvinyl alcohol polymer has a degree of hydrolysis in a range of about 92% to about 99%, optionally about 98% to about 99%, optionally about 98% to about 99.9%.

12. The water-dispersible nonwoven web of any one of paragraphs 1 to 11, wherein the plurality of water-soluble fibers comprises:

a first water-soluble fiber; and a second water-soluble fiber, wherein the first and second water-soluble fibers have a difference in diameter, length, tenacity, shape, rigidness, elasticity, solubility, melting point, glass transition temperature ($T_g$), fiber chemistry, color, or a combination thereof.

13. The water-dispersible nonwoven web of any one of paragraphs 1 to 12, further comprising a plurality of water-insoluble fibers.

14. The water-dispersible nonwoven web of paragraph 13, wherein the plurality of water-soluble fibers comprise about 20% to about 80% by weight of the total weight of the fibers and the plurality of water-insoluble fibers comprise about 20% to about 80% by weight of the total weight of the fiber.

15. The water-dispersible nonwoven web of paragraph 13 or paragraph 14, wherein the plurality of water-insoluble fibers comprise cotton, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, polylactide, polyethylene terephthalate, or a combination thereof.

16. The water-dispersible nonwoven web of any one of paragraphs 1 to 15, wherein the water-dispersible nonwoven web is biodegradable.

17. The water-dispersible nonwoven web of any one of paragraphs 1 to 16, wherein the plurality of water-soluble fibers have a tenacity in a range of about 3 cN/dtex to about 10 cN/dtex, optionally about 7 cN/dtex to about 10 cN/dtex.

18. The water-dispersible nonwoven web of paragraph 17, wherein the plurality of water-soluble fibers have a tenacity in a range of about 4 cN/dtex to 8 cN/dtex, optionally about 6 cN/dtex to about 8 cN/dtex.

19. The water-dispersible nonwoven web of anyone of paragraphs 1 to 18, wherein the plurality of water-soluble fibers comprise a water-soluble fiber comprising a plasticizer.

20. The water-dispersible nonwoven web of anyone of paragraphs 1 to 19, further comprising an active agent.

21. The water-dispersible nonwoven web of paragraph 20, wherein the active agent is provided as part of the water-soluble fibers, dispersed within the nonwoven web, provided on a face of the nonwoven web, or a combination thereof.

22. The water-dispersible nonwoven web of paragraph 20 or paragraph 21, wherein the active agent is selected from an enzyme, oil, flavor, colorant, odor absorber, fragrance, pesticide, fertilizer, activator, acid catalyst, metal catalyst, ion scavenger, detergent, disinfectant, surfactant, bleach, bleach component, fabric softener or a combination thereof.

23. The water-dispersible nonwoven web of any one of paragraphs 1 to 22, wherein the plurality of water-soluble fibers have a diameter in a range of about 10 micron to about 300 micron, optionally about 50 micron to about 300 micron, optionally greater than 100 micron to about 300 micron.

24. The water-dispersible nonwoven web of any one of paragraphs 1 to 23, wherein the plurality of water-soluble fibers have diameters that are substantially uniform.

25. The water-dispersible nonwoven web of any one of paragraphs 1 to 24, wherein the plurality of water-soluble fibers have a length in a range of about 30 mm to about 100 mm, or about 30 mm to about 60 mm.

26. The water-dispersible nonwoven web of any one of paragraphs 1 to 24, wherein the plurality of water-soluble fibers have a length of less than about 30 mm, or in a range of about 0.25 mm to less than 30 mm.

27. The water-dispersible nonwoven web of anyone of paragraphs 1 to 26, wherein the nonwoven web is porous.

26. The water-dispersible nonwoven web of anyone of paragraphs 1 to 20, wherein the nonwoven web is nonporous.

27. The water-dispersible nonwoven web of anyone of paragraphs 1 to 26, wherein the nonwoven web is colored, dyed, pigmented, or a combination thereof.

28. The water-dispersible nonwoven web of anyone of paragraphs 1 to 27, wherein the nonwoven web has a basis weight of about 1 $g/m^2$ to about 100 $g/m^2$, about 20 $g/m^2$ to about 80 $g/m^2$, about 30 $g/m^2$ to about 100 $g/m^2$, or about 25 $g/m^2$ to about 70 $g/m^2$.

29. The water-dispersible nonwoven web of anyone of paragraphs 1 to 28, wherein at a given temperature, the water-dispersible nonwoven web dissolves at least about 5 times faster than a water-soluble film prepared from the same water-soluble polymer as the water-soluble fiber of the water-dispersible nonwoven web.

30. The water-dispersible nonwoven web according to any one of paragraphs 1 to 29, wherein the plurality of water-soluble fibers comprises water-soluble fibers prepared by a wet cooled gel spinning process, the wet cool gel spinning process comprising:

a) dissolving a polymer in solution to form a polymer mixture;

b) extruding the polymer mixture through a spinning nozzle to a solidification bath to form an extruded polymer mixture;

c) passing the extruded polymer mixture through a solvent exchange bath;

d) wet drawing the extruded polymer mixture; and e) finishing the extruded polymer mixture to provide the water-soluble fibers.

31. The water-dispersible nonwoven web of paragraph 30, wherein the finishing comprises cutting or crimping the extruded polymer mixture to provide the water-soluble fiber.

32. The water-dispersible nonwoven web of paragraph 30 or 31, wherein the solidification bath comprises a mixture of solvents comprising a first solvent in which the water-soluble polymer is soluble and a second solvent in which the water-soluble polymer is not soluble.

33. The water-dispersible nonwoven web of any one of paragraphs 30 to 32, wherein the solvent exchange bath consists essentially of a solvent in which the water-soluble polymer is not soluble.

34. The water-dispersible nonwoven web of any one of paragraphs 30 to 33, wherein the water-soluble polymer comprises a blend of two or more different polymers.

35. The water-dispersible nonwoven web of any one of paragraphs 30 to 34, wherein the degree of polymerization of the water-soluble polymer is at least 1000.

36. The water-dispersible nonwoven web of any one of paragraphs 30 to 35, wherein the water-soluble fibers have a fiber diameter in a range of 10-300 micron, 25-300 micron, 50-300 micron, or 75-100 micron.

37. The water-dispersible nonwoven web of any one of paragraphs 30 to 36, wherein the water-soluble fibers have a tenacity in a range of about 5 cN/dtex to about 10 cN/dtex, or about 6 cN/dtex to about 10 cN/dtex, or about 7 cN/dtex to about 10 cN/dtex.

38. The water-dispersible nonwoven web of any one of paragraphs 30 to 37, further comprising a filament prepared by a process selected from the group consisting of melt blowing, spun bonding, electro-spinning, rotary spinning, continuous filament producing operations, tow fiber producing operations, and combinations thereof.

39. The water-dispersible nonwoven web of any one of paragraphs 1 to 38, wherein the water-dispersible nonwoven web is flushable.

40. A multilayer water-dispersible nonwoven web comprising a first water-dispersible nonwoven web according to any one of paragraphs 1 to 39.

41. The multilayer water-dispersible nonwoven web of paragraph 40, further comprising a second water-dispersible nonwoven web according to any one of paragraphs 1 to 39.

42. The multilayer water-dispersible nonwoven web of paragraph 41, wherein the first water-dispersible nonwoven web and the second water-dispersible nonwoven web comprise the same fibers and have the same basis weight.

43. The multilayer water-dispersible nonwoven web of paragraph 41, wherein the first water-dispersible nonwoven web and the second water-dispersible nonwoven web comprise different fibers and have the same basis weight.

44. The multilayer water-dispersible nonwoven web of paragraph 41, wherein the first water-dispersible nonwoven web and the second water-dispersible nonwoven web comprise different fibers and have different basis weights.

45. The multilayer water-dispersible nonwoven web of any one of paragraphs 41 to 43, wherein the first water-dispersible nonwoven web and the second water-dispersible nonwoven web are laminated to each other.

46. The multilayer water-dispersible nonwoven web of any one of paragraphs 40 to 45, further comprising a water-soluble film laminated to the first water-dispersible nonwoven web.

47. The multilayer water-dispersible nonwoven web of paragraph 46, wherein the fiber of the first water-dispersible nonwoven web and the water-soluble film comprise the same water-soluble polymer.

48. The multilayer water-dispersible nonwoven web of paragraph 46, wherein the fiber of the first water-dispersible nonwoven web and the water-soluble film comprise different water-soluble polymers.

49. The multilayer water-dispersible nonwoven web of any one of paragraphs 40 to 48, wherein the multilayer water-dispersible nonwoven web has a basis weight of about 1 $g/m^2$ to about 100 $g/m^2$.

50. The multilayer water-dispersible nonwoven web of any one of paragraphs 40 to 48, wherein the first multilayer water-dispersible nonwoven web is porous.

51. The multilayer water-dispersible nonwoven web of any one of paragraphs 40 to 48, wherein the multilayer water-dispersible nonwoven web is nonporous.

52. The multilayer water-dispersible nonwoven web of any one of paragraphs 40 to 51, wherein the multilayer water-dispersible nonwoven web is flushable.

53. A water-dispersible pouch comprising a water-dispersible nonwoven web according to any one of paragraphs 1 to 39 in the form of a pouch defining an interior pouch volume.

54. A water-dispersible pouch comprising a multilayer water-dispersible nonwoven web according to any one of paragraphs 40 to 51 in the form of a pouch defining an interior pouch volume.

55. The water-dispersible pouch of paragraph 54, wherein the multilayer water-dispersible nonwoven web comprises a first water-dispersible nonwoven web and a water-soluble film, and the water-soluble film forms the inner surface of the pouch.

56. A water-dispersible sealed article comprising the water-dispersible pouch of any one of paragraphs 53 to 55.

57. The water-dispersible sealed article of paragraph 56, further comprising a composition enclosed in the interior pouch volume.

58. The water-dispersible sealed article of paragraph 56, wherein the composition enclosed in the interior pouch volume comprises a solid, liquid, or a combination thereof.

59. The water-dispersible sealed article of paragraph 58, wherein the composition enclosed in the interior pouch volume comprises a liquid.

60. The water-dispersible sealed article of paragraph 58, wherein the composition enclosed in the interior pouch volume comprises a solid.

61. The water-dispersible sealed article of any one of paragraphs 57 to 60, wherein the composition enclosed in the interior pouch volume comprises a liquid laundry detergent, an agricultural composition, an automatic dish washing composition, a household cleaning composition, a water-treatment composition, a personal care composition, a food and nutritive composition, a medical composition, an industrial cleaning composition, a disinfectant composition, a pet composition, an office composition, a livestock composition, an industrial composition, a marine composition, a mercantile composition, a military composition, a recreational composition, or a combination thereof.

62. The water-dispersible sealed article of paragraph 61, wherein the composition enclosed in the interior pouch volume comprises a liquid laundry detergent, an agricultural composition, an automatic dish washing composition, a household cleaning composition, a water-treatment composition, a personal care composition, a food and nutritive composition, an industrial cleaning composition, or a combination thereof.

63. A method of preparing a water-dispersible sealed article according to any one of paragraphs 57 to 62, the method comprising:

forming the water-dispersible nonwoven web into the form of a pouch;

filling the pouch with a composition to be enclosed therein; and sealing the pouch to form a sealed article.

64. The method of paragraph 63, wherein sealing the pouch comprises heat sealing, solvent welding, adhesive sealing, or a combination thereof.

65. The multilayer water-dispersible nonwoven web of paragraph 46 or paragraph 47, wherein the water-soluble fibers of the first water-dispersible nonwoven web comprises a first polyvinyl alcohol homopolymer and the water-soluble film comprises a second polyvinyl alcohol homopolymer and the first and second polyvinyl alcohol homopolymers have the same degree of hydrolysis, wherein the multilayer water-dispersible nonwoven web has a similar or faster 10° C. dissolution time than a water-soluble film comprising an anionic modified polyvinyl alcohol copolymer having the same degree of hydrolysis of the first and second polyvinyl alcohol homopolymers, and the water-dispersible nonwoven web has a higher biodegradability than the water-soluble film comprising the anionic modified polyvinyl alcohol.

66. A water-soluble fiber, said fiber comprising a blend of water-soluble polymers.

67. The water-soluble fiber of paragraph 66, wherein the blend of water-soluble polymers comprises a polyvinyl alcohol polymer.

68. The water-soluble fiber of paragraph 66 or 67, wherein the water-soluble fiber is prepared by a wet cooled gel spinning process, the wet cool gel spinning process comprising:

a) dissolving two or more polymers in solution to form a polymer mixture;

b) extruding the polymer mixture through a spinning nozzle to a solidification bath to form an extruded polymer mixture;

c) passing the extruded polymer mixture through a solvent exchange bath;

d) wet drawing the extruded polymer mixture; and e) finishing the extruded polymer mixture to provide the water-soluble fibers.

69. The water-soluble fiber of any one of paragraphs 67 to 68, wherein the polyvinyl alcohol polymer has a degree of polymerization of at least 1000.

70. The water-soluble fiber of any one of paragraphs 66 to 69, wherein the blend of water-soluble polymers comprises a blend of polyvinyl alcohol polymers.

71. The water-soluble fiber of paragraph 70, wherein the blend of polyvinyl alcohol polymers comprises a polyvinyl alcohol homopolymer, a polyvinyl alcohol copolymer, or a combination thereof.

72. The water-soluble fiber of any one of paragraphs 66 to 71, wherein the water-soluble fiber has a fiber diameter in a range of about 10 to about 300 micron, about 25 to about 300 micron, about 50 to about 300 micron, or at least about 100 to about 300 micron.

73. The water-soluble fiber of any one of paragraphs 66 to 71 having a tenacity in a range of about 5 cN/dtex to about 10 cN/dtex, about 6 cN/dtex to about 10 cN/dtex, or about 7 cN/dtex to about 10 cN/dtex.

74. A water-dispersible nonwoven web comprising a water-soluble fiber according to any one of paragraphs 67 to 73.

75. A multi-layer water-dispersible nonwoven web comprising a first layer comprising a water-soluble web according to paragraph 74 and (a) a second layer comprising a water-soluble web according to paragraph 74; or (b) a second layer comprising a water-soluble film.

76. A water-dispersible pouch comprising the water-dispersible nonwoven web according to paragraph 74 in the form of a pouch defining an interior pouch volume.

77. A water-dispersible pouch comprising the multi-layer water-dispersible nonwoven web according to paragraph 75 in the form of a pouch defining an interior pouch volume.

78. A water-dispersible sealed article comprising the water-dispersible pouch of paragraph 76 or paragraph 77.

79. The water-dispersible sealed article according to paragraph 78, further comprising a composition enclosed in the interior pouch volume.

80. The water-dispersible sealed article according to paragraph 79, wherein the composition enclosed in the interior pouch volume comprises a solid, liquid, or a combination thereof.

81. The water-dispersible sealed article according to paragraph 79 or paragraph 80, wherein the composition enclosed in the interior pouch volume comprises a liquid laundry detergent, an agricultural composition, an automatic dish washing composition, a water-treatment composition, a personal care composition, a food and nutritive composition, a medical composition, a pet composition, an office composition, a livestock composition, an industrial composition, a marine composition, a mercantile composition, a military composition, a recreational composition, or a combination thereof.

82. The water-dispersible sealed article of paragraph 81, wherein the composition enclosed in the interior pouch volume comprises a liquid laundry detergent, an agricultural composition, an automatic dish washing composition, a water-treatment composition, a personal care composition, a food and nutritive composition or a combination thereof.

83. A method of preparing a water-dispersible sealed article according to any one of paragraphs 78 to 81, the method comprising:

forming the water-dispersible nonwoven web into the form of a pouch;

filling the pouch with a composition to be enclosed therein; and sealing the pouch to form a sealed article.

84. The method of paragraph 83, wherein sealing the pouch comprises heat sealing, solvent welding, adhesive sealing, or a combination thereof.

85. A method of preparing a water-soluble fiber according to any one of paragraphs 66, 67, or 69 to 73 comprising a wet cooled gel spinning process, the wet cool gel spinning process comprising:

a) dissolving the water-soluble polymer in solution to form a polymer mixture;

b) extruding the polymer mixture through a spinning nozzle to a solidification bath to form an extruded polymer mixture;

c) passing the extruded polymer mixture through a solvent exchange bath;

d) wet drawing the extruded polymer mixture; and e) finishing the extruded polymer mixture to provide the water-soluble fibers.

86. The method of paragraph 85, wherein the finishing comprises cutting or crimping the extruded polymer mixture to provide the water-soluble fiber.

87. The method of paragraph 85 or paragraph 86, wherein the solidification bath comprises a mixture of solvents comprising a first solvent in which the water-soluble polymer is soluble and a second solvent in which the water-soluble polymer is not soluble.

88. The method of any one of paragraphs 85 to 87, wherein the solvent exchange bath consists essentially of a solvent in which the water-soluble polymer is not soluble.

89. A method of controlling the hand-feel of a water-dispersible pouch or packet comprising preparing a pouch or packet from a water-dispersible nonwoven web, wherein the water-dispersible nonwoven web comprises a plurality of water-soluble fibers comprising a water-soluble polymer.

Although the embodiments described above are specifically contemplated, they are not meant to limit the scope of the water-dispersible nonwoven webs in accordance with the disclosure in any way.

The water-dispersible nonwoven webs in accordance with the disclosure can be better understood in light of the following examples, which are merely intended to illustrate the water-dispersible nonwoven webs and are not meant to limit the scope thereof in any way.

EXAMPLES

Example 1: Preparation of Nonwoven Webs

Single-layer nonwoven webs were prepared from various water-soluble fibers as described in Table 1, below. Briefly, water-soluble staple fibers were carded and then calendar or chemically bonded. Calendar bonding was performed using emboss rolls at a temperature between 160° C. and 190° C. and a pressure of about 2 kg/m$^2$. A traditional heated calendar roll made of cast iron or steel was used. Chemical bonding was performed as follows: using the same polyvinyl alcohol used to prepare the fibers, an aqueous polyvinyl alcohol solution is prepared. Sponge rollers coated with the polyvinyl alcohol solution from a dip pan were then used to coat the polyvinyl alcohol solution onto the unbounded nonwoven web using a pressure of about 2 kg/m$^2$.

TABLE 1

| | Sample 1 | Sample 2 | Sample 3 | Sample 4 | Sample 5 | Sample 6 |
|---|---|---|---|---|---|---|
| Fiber composition | 70 wt. % AMPS[1] (88% DH); 30 wt. % PVOH homopolymer (88% DH) | 70 wt. % AMPS (88% DH); 30 wt. % PVOH homopolymer (88% DH) | 70 wt. % AMPS (88% DH); 30 wt. % PVOH homopolymer (88% DH) | PVOH homopolymer (98% DH) | PVOH homopolymer (96% DH) | PVOH homopolymer (88% DH) |
| Basis weight (g/m$^2$) | 35 | 45 | 60 | 35 | 35 | 40 |
| Bonding type | Thermal | Thermal | Thermal | Chemical | Thermal | Thermal |
| Fineness (dtex) | Not determined | Not determined | Not determined | 1.7 | 1.7 | 1.7 |
| Tenacity (cN/dtex) | 4.36 | 4.36 | 4.36 | 7 | 7 | 5 |
| Elongation (%) | 7.8 | 7.8 | 7.8 | 12 | 15 | 20 |
| Complete dissolution temperature of fiber (° C.) | 20 | 20 | 20 | 70 | 40 | 20 |

[1]AMPS = 2-acrylamido-2-methylpropane sulfonic acid modified PVOH having 2 mol % modification Thus, Example 1 shows formation of water-dispersible nonwoven webs of the disclosure.

Example 2: Nonwoven Web Properties

The nonwoven webs prepared according to Example 1 were tested for various mechanical and physical properties in accordance with the methods described herein. The results are provided in Table 2. Table 2 also includes the mechanical and physical properties for a water-soluble film having a thickness of 3 mil, the water-soluble film prepared from a polyvinyl alcohol homopolymer having a degree of hydrolysis of 88. The water-soluble film further included about 26.5 PHR plasticizer, about 0.4 PHR surfactant, and about 0.2 PHR other auxiliary agents.

TABLE 2

| | Dynamic COF[2] | Static COF | Static:Dynamic COF | Max Stress (N/mm$^2$) (MD[3]) | Max Stress (N/mm$^2$) (TD[4]) | MD:TD Max Stress | Strain at Break (%) (MD) | Strain at Break (%) (TD) | MD:TD Strain at Break |
|---|---|---|---|---|---|---|---|---|---|
| Sample 1 | 0.77 | 0.78 | 1.01 | 1.00 | 0.22 | 4.64 | 358.84 | 195.34 | 1.84 |
| Sample 2 | 0.78 | 0.79 | 1.02 | 1.53 | 0.51 | 3.02 | 129.73 | 163.84 | 0.79 |
| Sample 3 | 0.82 | 0.83 | 1.01 | 1.64 | 0.42 | 3.91 | 144.39 | 130.17 | 1.11 |
| Sample 4 | 0.31 | 0.34 | 1.09 | 11.11 | 5.86 | 1.90 | 6.83 | 173.75 | 0.04 |
| Sample 5 | 0.62 | 0.65 | 1.04 | 5.99 | 4.28 | 1.40 | 58.19 | 250.02 | 0.23 |
| Sample 6 | 0.86 | 0.90 | 1.05 | 7.36 | 2.76 | 2.67 | 59.91 | 299.42 | 0.20 |
| Film 1 | 0.43 | 1.00 | 2.30 | 20.31 | 18.78 | 1.08 | 272.23 | 251.64 | 1.08 |

[2]Coefficient of Friction

[3]Machine Direction

[4]Transverse Direction

Thus, Example 2 demonstrates that water-dispersible webs of the disclosure have lower static CoF values and ratios of static to dynamic CoF values compared to a water-soluble film prepared with a similar PVOH polymer (comparing Sample 6 and Film 1, both prepared from PVOH homopolymers having a degree of hydrolysis of 88), signaling higher slip, elevated hand-feel, and easier processing, e.g., into pouches. Example 2 further demonstrates the general trend of higher CoF values for nonwoven webs prepared from fibers with lower tenacities (comparing Samples 1, 2, 3, and 6 to Samples 4 and 5).

Example 3: Color Index

The color index of the nonwoven webs prepared according to Example 1 were tested according to procedures commonly used in the art: ASTM E313 (yellowness and whiteness) and TAPPI 452 (brightness).

TABLE 3

| Color | Sample 1 | Sample 2 | Sample 3 | Sample 4 | Sample 5 | Sample 6 |
|---|---|---|---|---|---|---|
| Yellowness* | 3.20 | 3.21 | 3.52 | 2.58 | 2.56 | 2.56 |
| Whiteness** | 56.98 | 48.90 | 42.36 | 51.24 | 51.74 | 54.41 |
| Brightness*** | 62.35 | 54.67 | 47.88 | 56.01 | 56.50 | 59.42 |

Thus, Table 3 shows that the nonwoven webs of the disclosure have suitable yellowness index values, whiteness values, and brightness values. Example 3 further shows that the use of a copolymer as the fiber, having an increased number of substituents relative to the fibers comprising homopolymers provides an increase in the yellowness values, which is the expectation when there is an increase in the substituent functionalities on the PVOH backbone.

Example 4: Surface Resistivity

The surface resistivity of the nonwoven webs prepared according to Example 1 were tested as described above.

TABLE 4

| | Surface Resistivity (Ω/square) | PVOH Film | Surface Resistivity (Ω/square) |
|---|---|---|---|
| Sample 4 | $1 \times 10^{11}$ | Film 2 | $1 \times 10^{8}$ |
| Sample 5 | $1 \times 10^{12}$ | Film 3 | $1 \times 10^{7}$ |
| Sample 6 | $1 \times 10^{11}$ | Film 1 | $3 \times 10^{8}$ |
| Sample 1 | $1 \times 10^{10}$ | Film 4 | $1 \times 10^{7}$ |
| Sample 2 | $1 \times 10^{10}$ | Film 5 | $1 \times 10^{8}$ |
| Sample 3 | $1 \times 10^{10}$ | | |

Thus, Example 4 shows that nonwovens according to the disclosure generally exhibit higher surface resistivity when compared to water-soluble films. Example 4 further shows that the use of a fiber comprising an anionic modified polyvinyl alcohol copolymer may provide a nonwoven having a slightly decreased surface resistivity relative to a nonwoven made of polyvinyl alcohol homopolymer fibers.

Example 5: Ageing and Conditioning

The water-dispersible nonwoven web samples as prepared according to Example 1 were exposed to various temperature and humidity environments as described in Table 5, for 24 hours. All samples were then conditioned in ambient environment (i.e., 23° C., 35% RH) for 24 hours prior to testing. The mechanical properties of the conditioned samples were obtained as described above and the results are provided in Table 5.

TABLE 5

| | Conditioning Environment | Solubility @ 10 C. (s) | Percent Moisture | Ultimate Tensile Strength (N mm$^{-2}$) | Modulus at 10% Elongation (N mm$^{-2}$) | Percent Elongation at Break | Tear Strength (gf/GSM) |
|---|---|---|---|---|---|---|---|
| Sample 4 | 21° C., 32% RH | X | 1.35 | 5.25 | 41.80 | 25.57 | 7.20 |
| | 23° C., 35% RH | | 1.39 | 5.31 | 53.07 | 35.20 | 4.40 |
| | 38° C., 80% RH | | 2.40 | 4.77 | 41.80 | 40.61 | 8.80 |
| Sample 5 | 21° C., 32% RH | X | 1.76 | 5.25 | 47.33 | 25.57 | 12.80 |
| | 23° C., 35% RH | | 1.24 | 4.67 | 45.00 | 32.62 | 7.01 |
| | 38° C., 80% RH | | 3.11 | 3.76 | 28.07 | 32.18 | 17.83 |
| Sample 6 | 21° C., 32% RH | 12 | 2.54 | 8.60 | 63.03 | 21.16 | 10.40 |
| | 23° C., 35% RH | 14 | 3.86 | 6.51 | 52.50 | 48.90 | 15.73 |
| | 38° C., 80% RH | 5 | 6.95 | 9.29 | 42.97 | 34.94 | 9.20 |
| Sample 7 | 21° C., 32% RH | X | 1.30 | 4.84 | 23.90 | 63.00 | 11.43 |
| (Sample 5 | 23° C., 35% RH | | 1.63 | 5.42 | 40.20 | 62.81 | 14.02 |
| chemically bonded instead of thermally) | 38° C., 80% RH | | 1.82 | 14.83 | 146.20 | 10.52 | 13.26 |

Table 5 shows that, as expected, Samples 4 and 5, prepared from fibers comprising PVOH homopolymers having a degree of hydrolysis of 98% and 96%, respectively, were not cold water-soluble. In contrast, Sample 6, prepared from fibers comprising PVOH homopolymers having a degree of hydrolysis of 88% were cold water-soluble, even after exposure to elevated temperature and humidity conditions. Comparison of Sample 5 and Sample 7 shows that the mechanical properties and influence of humidity and temperature conditioning environments on the mechanical properties can be controlled by simply changing the bonding technology applied. Table 5 further shows that when exposed to high temperature and humidity environments, the mechanical properties of the water-dispersible nonwoven webs of the disclosure are maintained and/or positively influenced.

Example 6: ATR Crystallinity Ratio

Water-dispersible nonwoven web samples as prepared according to Example 1 were tested for crystallinity using FTIR-ATR and the results are provided in Table 6. The absorbance of the shoulder/peak at 1141 is an indicator of crystallinity and the ratio of the peak height at 1141 to that of reference peak 1420 provides a relative crystallinity between samples. It is well known in the art that polyvinyl alcohol, when measured via FTIR (including FTIR-ATR), has a peak associated with crystallinity at 1141 $cm^{-1}$. The ratio of this peak absorbance to a reference peak absorbance, typically the peak max in the range of 1420-1430 $cm^{-1}$ (associated with a CH2 bending absorption expected to be present in all polyvinyl alcohol homopolymers) provides a comparison of the relative difference in crystallinity between different samples.

TABLE 6A

| | Unsealed | | | | | |
|---|---|---|---|---|---|---|
| | Trial | A1420 | A1141 | Ratio | Average | StDev |
| Sample 4 | 1 | 0.087 | 0.099 | 1.138 | 1.089 | 0.052 |
| | 2 | 0.073 | 0.080 | 1.096 | | |
| | 3 | 0.088 | 0.091 | 1.034 | | |
| Sample 5 | 1 | 0.090 | 0.095 | 1.056 | 1.024 | 0.028 |
| | 2 | 0.097 | 0.097 | 1.000 | | |
| | 3 | 0.116 | 0.118 | 1.017 | | |
| Sample 6 | 1 | 0.102 | 0.102 | 1.000 | 1.007 | 0.020 |
| | 2 | 0.106 | 0.105 | 0.991 | | |
| | 3 | 0.101 | 0.104 | 1.030 | | |

TABLE 6B

| | Heat Sealed | | | | | |
|---|---|---|---|---|---|---|
| | Trial | A1420 | A1141 | Ratio | Average | StDev |
| Sample 4 | 1 | 0.073 | 0.079 | 1.082 | 1.115 | 0.050 |
| | 2 | 0.059 | 0.069 | 1.173 | | |
| | 3 | 0.063 | 0.069 | 1.089 | | |
| Sample 5 | 1 | 0.078 | 0.083 | 1.064 | 1.062 | 0.032 |
| | 2 | 0.069 | 0.071 | 1.029 | | |
| | 3 | 0.046 | 0.050 | 1.094 | | |
| Sample 6 | 1 | 0.063 | 0.074 | 1.180 | 1.081 | 0.096 |
| | 2 | 0.089 | 0.088 | 0.989 | | |
| | 3 | 0.095 | 0.102 | 1.074 | | |

Table 6 shows the expected trend of increasing crystallinity with increasing degree of hydrolysis of the PVOH polymer used to prepare the fibers that were used, in turn, to prepare the water-dispersible nonwoven webs of the disclosure. Comparison of Table 6A with Table 6B further shows that the crystallinity ratio increases after heat sealing.

Example 7: Single-Layer Nonwoven Comprising a Single Fiber Type Comprising a Single Fiber Forming Material Single-layer nonwoven webs were prepared from various water-soluble fibers as described in Table 7A, below. Briefly, water-soluble staple fibers were carded and then calendar bonded. Calendar bonding was performed using emboss rolls at a temperature between 120° C. and 140° C. and a pressure of about 25 to 50 PSI. A traditional heated calendar roll made of cast iron or steel was used. The calendar speed was between about 1 to 5 FPM. The fibers formed from the PVOH homopolymer having 88% degree of hydrolysis have a complete dissolution temperature of 20° C. and the fibers formed from the PVOH homopolymer having 96% degree of hydrolysis have a complete dissolution temperature of 40° C.

TABLE 7A

| | Fiber Forming Composition | | Calendar Bonding Settings | | | |
|---|---|---|---|---|---|---|
| | PVOH Homopolymer | PVOH Homopolymer | | | | |
| Sample | 88% DH - 2.2 dpf × 51 mm (wt %) | 96% DH - 2.2 dpf × 51 mm (wt %) | Calendar Speed (FPM) | Calendar Pressure (PSI) | Calendar Temperature (Centigrade) | Basis Weight (GSM) |
| 8 | 100 | | 2 | 40 | 120 | 33.4 |
| 9 | 100 | | 5 | 40 | 120 | 38 |
| 10 | 100 | | 5 | 25 | 120 | 32.4 |
| 11 | | 100 | 2 | 40 | 120 | 44.7 |
| 12 | | 100 | 5 | 40 | 120 | 39.7 |
| 13 | | 100 | 5 | 25 | 120 | 41.8 |
| 14 | 100 | | 2 | 40 | 120 | 15.5 |
| 15 | 100 | | 5 | 40 | 120 | 16.8 |
| 16 | 100 | | 5 | 25 | 120 | 18.9 |
| 17 | | 100 | 2 | 40 | 120 | 19.5 |
| 18 | | 100 | 5 | 40 | 120 | 21 |
| 19 | | 100 | 5 | 25 | 120 | 23.1 |
| 20 | 100 | | 2 | 40 | 140 | 40.1 |
| 21 | 100 | | 5 | 40 | 140 | 42.5 |
| 22 | 100 | | 5 | 25 | 140 | 41.8 |
| 23 | | 100 | 2 | 40 | 140 | 42.5 |
| 24 | | 100 | 5 | 40 | 140 | 43.8 |
| 25 | | 100 | 5 | 25 | 140 | 45.3 |
| 26 | 100 | | 2 | 40 | 140 | 23.5 |
| 27 | 100 | | 1 | 40 | 140 | 25.1 |
| 28 | 100 | | 2 | 50 | 140 | 19.6 |
| 29 | | 100 | 2 | 40 | 140 | 27.7 |
| 50 | | 100 | 1 | 40 | 140 | 22.9 |
| 51 | | 100 | 2 | 50 | 140 | 22.2 |

TABLE 7A-continued

| | Fiber Forming Composition | | | | | |
|---|---|---|---|---|---|---|
| | PVOH Homopolymer | PVOH Homopolymer | Calendar Bonding Settings | | | |
| Sample | 88% DH - 2.2 dpf × 51 mm (wt %) | 96% DH - 2.2 dpf × 51 mm (wt %) | Calendar Speed (FPM) | Calendar Pressure (PSI) | Calendar Temperature (Centigrade) | Basis Weight (GSM) |
| 52 | 100 | | 2 | 40 | 140 | 19.7 |
| 53 | | 100 | 2 | 40 | 140 | 19.3 |

The nonwoven webs were tested for solubility at 23° C. and 40° C. In particular, the time to rupture and disintegration of the nonwoven webs were determined according to the MSTM-205 set forth herein. The solubility, reported as the time to rupture, is provided in the Table 7B, below.

TABLE 7B

| | Fiber Forming Composition | | | | | | |
|---|---|---|---|---|---|---|---|
| | PVOH Homopolymer | PVOH Homopolymer | | Solubility at 23° C. | | Solubility at 40° C. | |
| Sample | 88% DH - 2.2 dpf × 51 mm (wt %) | 96% DH - 2.2 dpf × 51 mm (wt %) | Basis Weight (GSM) | Time to Rupture (s) | Disintegration (s) | Time to Rupture (s) | Disintegration (s) |
| 8 | 100 | | 33.4 | 13.33 | 30.67 | 2.67 | 5.33 |
| 9 | 100 | | 38 | 10.33 | 21.33 | 1.33 | 3.33 |
| 10 | 100 | | 32.4 | 18.33 | 31.33 | 3.33 | 6.67 |
| 11 | | 100 | 44.7 | 97.00 | | 6.67 | 16.00 |
| 12 | | 100 | 39.7 | 90.00 | | 5.67 | 15.67 |
| 13 | | 100 | 41.8 | 90.33 | | 6.33 | 26.67 |
| 14 | 100 | | 15.5 | 8.00 | 19.00 | 1.67 | 3.00 |
| 15 | 100 | | 16.8 | 8.67 | 24.00 | 2.00 | 3.33 |
| 16 | 100 | | 18.9 | 10.33 | 23.00 | 2.00 | 3.00 |
| 17 | | 100 | 19.5 | 68.33 | 127.50 | 4.33 | 7.67 |
| 18 | | 100 | 21 | 73.67 | 140.50 | 4.33 | 8.33 |
| 19 | | 100 | 23.1 | 85.33 | 134.50 | 5.00 | 10.67 |
| 20 | 100 | | 40.1 | 24.67 | 42.67 | 3.00 | 7.00 |
| 21 | 100 | | 42.5 | 21.33 | 34.67 | 2.33 | 5.00 |
| 22 | 100 | | 41.8 | 22.33 | 35.00 | 2.33 | 4.00 |
| 23 | | 100 | 42.5 | 138.67 | 209.00 | 11.00 | 20.33 |
| 24 | | 100 | 43.8 | 133.67 | 175.67 | 5.67 | 13.33 |
| 25 | | 100 | 45.3 | 131.00 | 189.00 | 5.33 | 14.33 |
| 26 | 100 | | 23.5 | 13.67 | 28.00 | 2.00 | 3.67 |
| 27 | 100 | | 25.1 | 16.67 | 28.67 | 2.67 | 4.67 |
| 28 | 100 | | 19.6 | 15.67 | 29.00 | 3.00 | 5.33 |
| 29 | | 100 | 27.7 | 136.33 | 189.00 | 5.33 | 9.67 |
| 50 | | 100 | 22.9 | 140.00 | 193.33 | 8.67 | 15.67 |
| 51 | | 100 | 22.2 | 128.33 | 191.67 | 9.00 | 15.33 |
| 52 | 100 | | 19.7 | 20.67 | | 2.00 | |
| 53 | | 100 | 19.3 | 92.33 | | 6.67 | |

Thus, Example 7 shows that the solubility of the nonwoven web generally follows the same water solubility profile as that of the PVOH fiber forming material from which they are constructed. In particular, for PVOH homopolymer fiber forming materials, as the degree of hydrolysis increases (e.g., from 88% to 96%), the solubility of the fibers and nonwoven webs increase (e.g., requiring hotter temperatures or take more time to rupture/disintegrate). Example 7 further shows for a given calendar temperature and pressure, the solubility time of a nonwoven web generally increases as the basis weight increases. This relationship was especially prominent when the temperature of the water for dissolution was lower than the complete dissolution temperature of the fibers that made up the nonwoven web. For example, compare Samples 12 and 18, and 13 and 19, wherein each nonwoven web was prepared from a water-soluble fiber having a complete dissolution temperature of 40° C. At 23° C., Samples 12 and 13, having a basis weight of 39.7 and 41.8, respectively, were slower to rupture (90 and 90.33 seconds, respectively), than Samples 18 and 19, having a basis weight of 21 and 23.1, respectively (73.67 and 85.33 seconds, respectively). Example 7 further shows that for nonwoven webs having identical fiber chemistry and similar basis weights, at a given calendar pressure, the solubility time of a nonwoven web generally increases with increasing calendar temperature. This relationship was especially prominent when the temperature of the water for dissolution was lower than the complete dissolution temperature of the fibers that made up the nonwoven web. For example, comparing Samples 11 and 23, and 17 and 53, each nonwoven web having been prepared from a water-soluble fiber having a complete dissolution temperature of 40° C. At 40° C., the samples that were calendared at 140° C. have longer solubility times than the samples calendared at 120° C. (11 seconds compared to 6.67 seconds for samples having basis weights of 42.5 and 44.7, respectively; 6.67 seconds compared to 4.33 seconds for samples having basis weights of 19.3 and 19.5, respectively). The same trend was more pronounced at 23° C., wherein the samples calendared at 140° C. had solubility times of 138.67 and 92.33 seconds (for nonwovens having basis weights of 42.5 and 19.3, respectively), compared to solubility times of 97 and 68.33 seconds for nonwovens calendared at 120° C. (having basis weights of 44.7 and 19.5, respectively).

Example 8: Single-Layer Nonwoven Comprising a Blend of Fiber Types, Each Fiber Type Comprising a Single Fiber Forming Material Single-layer nonwoven webs were prepared from various blends of water-soluble fibers as described in Table 8A, below. Briefly, water-soluble staple fibers were carded and then calendar bonded. Calendar bonding was performed using emboss rolls at a temperature of 140° C. and a pressure of about 40 to 50 PSI. A traditional heated calendar roll made of cast iron or steel was used. The calendar speed was between about 1 to 2 FPM.

TABLE 8A

| | Nonwoven Composition | | | | | |
|---|---|---|---|---|---|---|
| | PVOH Homopolymer | PVOH Homopolymer | Calendar Bonding Settings | | | |
| Sample | 88% DH - 2.2 dpf × 51 mm (wt %) | 96% DH - 2.2 dpf × 51 mm (wt %) | Calendar Speed (FPM) | Calendar Pressure (PSI) | Calendar Temperature (Centigrade) | Basis Weight (GSM) |
| 54 | 25 | 75 | 2 | 40 | 140 | 47.9 |
| 55 | 25 | 75 | 1 | 40 | 140 | 43.7 |
| 56 | 25 | 75 | 2 | 50 | 140 | 45.3 |
| 57 | 50 | 50 | 2 | 40 | 140 | 43.8 |
| 58 | 50 | 50 | 1 | 40 | 140 | 43.9 |
| 59 | 50 | 50 | 2 | 50 | 140 | 43.7 |
| 60 | 75 | 25 | 2 | 40 | 140 | 32.9 |
| 61 | 75 | 25 | 1 | 40 | 140 | 45.9 |
| 62 | 75 | 25 | 2 | 50 | 140 | 44.9 |
| 63 | 25 | 75 | 2 | 40 | 140 | 40.2 |
| 64 | 50 | 50 | 2 | 40 | 140 | 41.6 |
| 65 | 75 | 25 | 2 | 40 | 140 | 44.5 |

The nonwoven webs were tested for solubility at 23° C. and 40° C. In particular, the time to rupture and disintegration of the nonwoven webs were determined according to the MSTM-205 set forth herein. The solubility is provided in the Table 8B, below.

TABLE 8B

| | Nonwoven Composition | | | | | | |
|---|---|---|---|---|---|---|---|
| | PVOH Homopolymer | PVOH Homopolymer | | Solubility at 23° C. | | Solubility at 40° C. | |
| Sample | 88% DH - 2.2 dpf × 51 mm (wt %) | 96% DH - 2.2 dpf × 51 mm (wt %) | Basis Weight (GSM) | Time to Rupture (s) | Disintegration (s) | Time to Rupture (s) | Disintegration (s) |
| 54 | 25 | 75 | 47.9 | 99.00 | 134.67 | 7.00 | 19.00 |
| 55 | 25 | 75 | 43.7 | 93.67 | 121.00 | 7.67 | 18.00 |
| 56 | 25 | 75 | 45.3 | 108.67 | 154.33 | 5.33 | 12.00 |
| 57 | 50 | 50 | 43.8 | 101.00 | 146.67 | 5.33 | 9.67 |
| 58 | 50 | 50 | 43.9 | 107.67 | 156.00 | 5.33 | 11.00 |
| 59 | 50 | 50 | 43.7 | 121.33 | 164.00 | 5.67 | 12.67 |
| 60 | 75 | 25 | 32.9 | 69.00 | 122.67 | 5.67 | 12.67 |
| 61 | 75 | 25 | 45.9 | 93.33 | 145.00 | 5.00 | 10.00 |
| 62 | 75 | 25 | 44.9 | 102.67 | 161.33 | 7.00 | 13.00 |
| 63 | 25 | 75 | 40.2 | 78.33 | | 4.33 | |
| 64 | 50 | 50 | 41.6 | 87.00 | | 6.00 | |
| 65 | 75 | 25 | 44.5 | 76.33 | | 5.33 | |

Example 8 shows nonwoven webs of the disclosure including a blend of fibers including a first fiber comprising a first water-soluble fiber forming material and a second fiber comprising a second water-soluble fiber forming composition. Notably, Example 8 in combination with Samples 20 and 23 of Example 7, shows that when a blend of fibers are used in a nonwoven web, the solubility of the nonwoven web does not follow the rule of mixtures (compare Samples 63-65 with Samples 20 and 23). Example 8 further shows that for samples having similar basis weights and prepared using the same calendaring conditions, at temperatures below the complete dissolution temperature of the lower solubility fiber (e.g., at 23° C. for a blend including a fiber having a complete dissolution temperature of 40° C.) the rupture times of the nonwovens are substantially the same for blends having a 25:75 molar ratio of the two fibers and blends having a 75:25 molar ratio of the two fibers (compare Samples 63 and 65; 55 and 61; and 56 and 62). Unexpectedly, at all temperatures, nonwoven webs having a 50:50 blend of the two fibers demonstrated different rupture times than the 25:75 blends and 75:25 blends and, surprisingly, demonstrated longer times to rupture than the 25:75 blends and 75:25 blends (compare Sample 64 with Samples 63 and 65; 58 with 55 and 61; and 59 with 56 and 62).

Example 9: Multilayer Nonwovens

Multiple-layer nonwoven webs were prepared from various water-soluble fibers as described in Table 9A, below. In particular, each nonwoven web included a first layer (L1) and a second layer (L2). Each layer included a single fiber type, the single fiber type including a single fiber forming material. Briefly, water-soluble staple fibers were carded and then calendar bonded. Two carded webs were then overlaid and passed through the calendar rollers at the specified conditions. Optionally, the overlaid nonwoven webs were passed through a needle punch bonding station prior to passing through the calendar rollers. Calendar bonding was performed using emboss rolls at a temperature of 140° C. and a pressure of about 40 PSI. A traditional heated calendar roll made of cast iron or steel was used. The calendar speed was between about 2 FPM.

TABLE 9A

| | Fiber Forming Composition | | Calendar Bonding Settings | | | |
|---|---|---|---|---|---|---|
| | PVOH | PVOH | | | | |
| Sample | Homopolymer 88% DH - 2.2 dpf × 51 mm (mol %) | Homopolymer 96% DH - 2.2 dpf × 51 mm (mol %) | Calendar Speed (FPM) | Calendar Pressure (PSI) | Calendar Temperature (Centigrade) | Total Basis Weight (GSM) |
| 66 | 100 (L1), 100 (L2) | | 2 | 40 | 140 | 40 |
| 67* | 100 (L1), 100 (L2) | | 2 | 40 | 140 | 40 |
| 68 | | 100 (L1), 100 (L2) | 2 | 40 | 140 | 40 |
| 69* | | 100 (L1), 100 (L2) | 2 | 40 | 140 | 40 |
| 70 | 100 (L1) | 100 (L2) | 2 | 40 | 140 | 40 |
| 71 | 100 (L1) | 100 (L2) | 2 | 40 | 140 | 40 |

*Needle punched

The nonwoven webs were tested for solubility at 23° C. and 40° C. In particular, the time to rupture and disintegration of the nonwoven webs were determined according to the MSTM-205 set forth herein. The solubility is provided in the Table 9B, below.

TABLE 9B

| | Fiber Forming Composition | | | Solubility at 23° C. | | Solubility at 40° C. | |
|---|---|---|---|---|---|---|---|
| | PVOH Homopolymer | PVOH Homopolymer | | | | | |
| Sample | 88% DH - 2.2 dpf × 51 mm (mol %) | 96% DH - 2.2 dpf × 51 mm (mol %) | Basis Weight (GSM) | Time to Rupture (s) | Disintegration (s) | Time to Rupture (s) | Disintegration (s) |
| 20 | 100 | | 40 | 24.67 | 42.67 | 3.00 | 7.00 |
| 66 | 100 (L1), 100 (L2) | | 40 | 18.67 | 46.67 | 2.33 | 4.00 |
| 67* | 100 (L1), 100 (L2) | | 40 | 23.00 | 38.67 | 3.33 | 17.00 |
| 23 | | 100 | 40 | 138.67 | 209.00 | 11.00 | 20.33 |
| 68 | | 100 (L1), 100 (L2) | 40 | 103.33 | | 7.33 | |
| 69* | | 100 (L1), 100 (L2) | 40 | 108.33 | | 5.67 | 15.67 |
| 70 | 100 (L1) | 100 (L2) | 40 | 101.00 | | 6.33 | 16.00 |
| 71 | 100 (L1) | 100 (L2) | 40 | 94.67 | | 5.00 | 14.33 |

*Needle punched

Thus, Example 9 shows multilayer nonwoven webs according to the disclosure. Example 9 further shows that multilayer nonwoven webs having two layers of the same nonwoven webs have generally the same solubility characteristics of a single nonwoven web of the same material when the multilayer nonwoven web and single layer nonwoven web have the similar basis weights (compare Samples 66 and 67 with Sample 20 of Example 7; and Samples 68 and 69 with Sample 23 of Example 7). Example 9 further shows that when a multilayer nonwoven web has two different layers, the solubility characteristics of the multilayer nonwoven web do not follow the rule of mixtures (compare Samples 70 and 71 with Samples 20 and 23 of Example 7). Instead, at temperatures below the complete dissolution temperature of the fibers of the nonwoven web that is less soluble, the solubility of the multilayer nonwoven web generally behaves more similar to the solubility of the nonwoven web that is less soluble (compare Samples 70, 71, 20, and 23: the less soluble nonwoven Sample (23) includes fibers having a complete dissolution temperature of 40° C., and at temperatures less than 40° C. (e.g., 23° C.), a multilayer nonwoven web including a layer of Sample 23 and a layer of Sample 20 (i.e., Samples 70 and 71), have enhanced solubility relative to Sample 23, but not to the extent of an arithmetic weight average (i.e., does not follow the rule of mixtures)).

Example 10: Single-Layer Nonwoven Comprising a Blend of Fiber Types, Each Fiber Type Comprising a Single Fiber Forming Material Single-layer nonwoven webs were prepared from various blends of water-soluble fibers as described in Table 8A, below. Briefly, water-soluble staple fibers were carded and then calendar bonded. Calendar bonding was performed using emboss rolls at a temperature of 140° C. and a pressure of about 40 to 50 PSI. A traditional heated calendar roll made of cast iron or steel was used. The calendar speed was between about 1 to 2 FPM. The nonwoven webs include a first fiber including a water-soluble polyvinyl alcohol film forming material and a second fiber including a non-polyvinyl alcohol water-insoluble fiber forming material. The water-insoluble fiber forming material was one of Trevira 298, a 1.6 dtex×38 mm polyethylene terephthalate fiber ("PET"); a 6.6 dtex×60 mm polylactide fiber ("PLA"); a 5.5 dtex×78 mm viscose (rayon) fiber ("viscose"), a 22 dtex×38 mm PET fiber ("high PET"); and Lenzing Lyocell, a 1.65 dtex×38 mm cellulose fiber ("cellulose").

TABLE 10A

| | Nonwoven Composition | | Calendar Bonding Settings | | |
|---|---|---|---|---|---|
| Sample | PVOH Homopolymer 96% DH - 2.2 dpf × 51 mm (wt %) L/D = 23.18 | Water-insoluble fiber forming material (wt %) (L/D) | Calendar Pressure (PSI) | Calendar Temperature (Centigrade) | Target Basis Weight (GSM) |
| 72 | 50 | PET 50 (23.75) | 40 | 140 | 50 |
| 73 | 50 | PLA 50 (9.09) | 40 | 140 | 50 |
| 74 | 50 | Viscose 50 (14.18) | 40 | 140 | 50 |
| 75 | 75 | High PET 25 (1.72) | 40 | 140 | 50 |
| 76 | 50 | Cellulose 50 (23.03) | 40 | 140 | 50 |
| 77 | 50 | Cellulose 50 (23.75) | 40 | 140 | 50 |
| 78 | 50 | Cotton 50 (N/A) | 40 | 140 | 50 |

The nonwoven webs were tested for solubility at 23° C. and 40° C. and softness. In particular, the time to rupture and disintegration of the nonwoven webs were determined according to the MSTM-205 set forth herein. The solubility is provided in the Table 10B, below.

TABLE 10B

| | Nonwoven Composition | | | | | |
|---|---|---|---|---|---|---|
| Sample | PVOH Homopolymer 96% DH - 2.2 dpf × 51 mm (wt %) L/D = 23.18 | Water-insoluble fiber forming material (wt %) (L/D) | Basis Weight (GSM) | Solubility at 23° C. Time to Rupture (s) | Solubility at 40° C. Time to Rupture (s) | Softness Softest = 1 Roughest = 5 |
| 72 | 50 | PET 50 (23.75) | 50 | None | 2.33 | 2 |
| 73 | 50 | PLA 50 (9.09) | 50 | none | 3.33 | 4 |
| 74 | 50 | Viscose 50 (14.18) | 50 | 130.67 | 7.33 | 2 |
| 75 | 75 | High PET 25 (1.72) | 50 | 123.33 | 5.67 | 4 |
| 76 | 50 | Cellulose 50 (23.03) | 50 | 144.67 | 6.33 | 3 |
| 77 | 50 | Cellulose 50 (23.75) | 50 | 158.00 | 5.00 | 3 |
| 78 | 50 | Cotton 50 (N/A) | 50 | 134.33 | | 2 |

Thus, Example 10 shows water-dispersible nonwovens of the disclosure comprising a blend of a water-soluble fiber and a water-insoluble fiber. Example 10 further shows that the selection of fibers can advantageously control the tactility (e.g., softness) of the nonwoven web. In particular, for a given fiber type, as the L/D ratio decreases, the softness decreases (i.e., has a higher softness rating), as can be seen with Samples 72 and 75, where a PVOH/PET fiber mixture provides a nonwoven web with a softness rating of 2 when the PVOH has an L/D ratio of 23.18 and the PET has an L/D ratio of 23.75 (Sample 72), but a softness rating of 4 when the PVOH has the same L/D ratio of 23.18 but the PET has a lower UD ratio of 1.72 (Sample 75).

Example 11: Single Layer Nonwovens with Blends of Fiber Forming Materials

Single layer nonwoven webs were prepared from various blends of water-soluble fibers as described in Table 11A, below. Briefly, water-soluble staple fibers were carded and then calendar bonded. Calendar bonding was performed using emboss rolls under the conditions described in Table 11A.

TABLE 11A

| | Composition | | | | | | |
|---|---|---|---|---|---|---|---|
| Sample | PVOH 88% DH - 2.2 dpf × 51 mm (wt %) | PVOH 96% DH - 2.2 dpf × 51 mm (wt %) | PVOH 98% DH 1.7 dtex × 38 mm (wt %) | PVOH 98% DH 2.2 dtex × 51 mm (wt %) | PVOH 99.9% DH 1.7 dtex × 38 mm (wt %) | Calendar Bonding Conditions Calendar Temperature (Centigrade), speed (fpm), and pressure (PSI) | Basis Weight (GSM) |
| 79 | | | 100 | | | 180 C., 2 fpm, 40 PSI | 40 |
| 80 | | | 100 | | | | 40 |
| 81 | | | | 100 | | 180 C., 2 fpm, 40 PSI | 40 |
| 82 | | | | 100 | | | 40 |
| 83 | | | | | 100 | 180 C., 2 fpm, 40 PSI | 40 |
| 84 | | | | | 100 | | 40 |
| 85 | | | 100 | | | 150 C., 1 fpm, 40 PSI | 17 |
| 86 | | | 100 | | | 180 C., 1 fpm, 40 PSI | 40 |
| 87 | | | 100 | | | 180 C., 1 fpm, 50 PSI | 40 |
| 88 | | | 100 | | | 190 C., 1 fpm, 50 PSI | 40 |
| 89 | | | | | 100 | 190 C., 2 fpm, 40 PSI | 17.5 |
| 90 | | | | | 100 | 190 C., 1 fpm, 40 PSI | 40 |
| 91 | | | | | 100 | 190 C., 1 fpm, 50 PSI | 40 |
| 92 | | | 50 | 50 | | 180 C., 2 fpm, 40 PSI | 40 |
| 93 | | | 50 | 50 | | 190 C., 2 fpm, 40 PSI | 40 |
| 94 | | | 50 | | 50 | 180 C., 2 fpm, 40 PSI | 40 |
| 95 | | | 50 | | 50 | 190 C., 2 fpm, 40 PSI | 40 |
| 96 | | | | 50 | 50 | 180 C., 2 fpm, 40 PSI | 40 |
| 97 | | | | 50 | 50 | 190 C., 2 fpm, 40 PSI | 40 |
| 98 | | | 25 | 75 | | 180 C., 2 fpm, 40 PSI | 40 |
| 99 | | | 25 | 75 | | 190 C., 2 fpm, 40 PSI | 40 |
| 100 | | | 75 | 25 | | 180 C., 2 fpm, 40 PSI | 40 |
| 101 | | | 75 | 25 | | 190 C., 2 fpm, 40 PSI | 40 |
| 102 | | | 25 | | 75 | 180 C., 2 fpm, 40 PSI | 40 |
| 103 | | | 25 | | 75 | 190 C., 2 fpm, 40 PSI | 40 |
| 104 | | | 75 | | 25 | 180 C., 2 fpm, 40 PSI | 40 |
| 105 | | | 75 | | 25 | 190 C., 2 fpm, 40 PSI | 40 |
| 106 | | | | 25 | 75 | 180 C., 2 fpm, 40 PSI | 40 |
| 107 | | | | 25 | 75 | 190 C., 2 fpm, 40 PSI | 40 |
| 108 | | | | 75 | 25 | 180 C., 2 fpm, 40 PSI | 40 |
| 109 | | | | 75 | 25 | 190 C., 2 fpm, 40 PSI | 40 |
| 114 | 25 | | 75 | | | 190 C., 2 fpm, 40 PSI | 40 |
| 115 | 25 | | 75 | | | 180 C., 2 fpm, 40 PSI | 40 |
| 116 | 75 | | 25 | | | 190 C., 2 fpm, 40 PSI | 40 |
| 117 | 75 | | 25 | | | 180 C., 2 fpm, 40 PSI | 40 |
| 118 | 50 | | 50 | | | 190 C., 2 fpm, 40 PSI | 40 |
| 119 | 50 | | 50 | | | 180 C., 2 fpm, 40 PSI | 40 |
| 120 | | 25 | 75 | | | 190 C., 2 fpm, 40 PSI | 40 |
| 121 | | 25 | 75 | | | 180 C., 2 fpm, 40 PSI | 40 |
| 122 | | 75 | 25 | | | 190 C., 2 fpm, 40 PSI | 40 |
| 123 | | 75 | 25 | | | 180 C., 2 fpm, 40 PSI | 40 |
| 124 | | 50 | 50 | | | 190 C., 2 fpm, 40 PSI | 40 |
| 125 | | 50 | 50 | | | 180 C., 2 fpm, 40 PSI | 40 |
| 126 | | 25 | | | 75 | 190 C., 2 fpm, 40 PSI | 40 |
| 127 | | 25 | | | 75 | 180 C., 2 fpm, 40 PSI | 40 |
| 128 | | 75 | | | 25 | 190 C., 2 fpm, 40 PSI | 40 |
| 129 | | 75 | | | 25 | 180 C., 2 fpm, 40 PSI | 40 |
| 130 | | 50 | | | 50 | 180 C., 2 fpm, 40 PSI | 40 |
| 131 | | 50 | | | 50 | 190 C., 2 fpm, 40 PSI | 40 |
| 132 | 25 | | | | 75 | 180 C., 2 fpm, 40 PSI | 40 |
| 133 | 25 | | | | 75 | 190 C., 2 fpm, 40 PSI | 40 |
| 134 | 75 | | | | 25 | 180 C., 2 fpm, 40 PSI | 40 |
| 135 | 75 | | | | 25 | 190 C., 2 fpm, 40 PSI | 40 |
| 136 | 50 | | | | 50 | 180 C., 2 fpm, 40 PSI | 40 |
| 137 | 50 | | | | 50 | 190 C., 2 fpm, 40 PSI | 40 |

TABLE 11A-continued

| Sample | Composition: PVOH 88% DH - 2.2 dpf × 51 mm (wt %) | PVOH 96% DH - 2.2 dpf × 51 mm (wt %) | PVOH 98% DH 1.7 dtex × 38 mm (wt %) | PVOH 98% DH 2.2 dtex × 51 mm (wt %) | PVOH 99.9% DH 1.7 dtex × 38 mm (wt %) | Calendar Bonding Conditions Calendar Temperature (Centigrade), speed (fpm), and pressure (PSI) | Basis Weight (GSM) |
|---|---|---|---|---|---|---|---|
| 138 | 25 | | 75 | | | | 40 |
| 139 | 25 | | 75 | | | | 40 |
| 140 | 75 | | 25 | | | | 40 |
| 141 | 75 | | 25 | | | | 40 |
| 142 | 50 | | 50 | | | | 40 |
| 143 | 50 | | 50 | | | | 40 |
| 144 | 25 | | | | 75 | | 40 |
| 145 | 25 | | | | 75 | | 40 |
| 146 | 75 | | | | 25 | | 40 |
| 147 | 75 | | | | 25 | | 40 |
| 148 | 50 | | | | 50 | | 40 |
| 149 | 50 | | | | 50 | | 40 |

The nonwoven webs were tested for solubility at 23° C., 40° C., and 80° C. In particular, the time to rupture and disintegration of the nonwoven webs were determined according to the MSTM-205 set forth herein.

None of the samples ruptured, disintegrated, or dissolved at temperatures of 23° C. or 40° C. within 300 seconds, according to MSTM-205. Samples that included any amount of fibers comprising the fully hydrolyzed (99.9% DH) PVOH fiber forming material did not rupture, disintegrate, or dissolve at temperatures of 80° C. or less. Solubility data for samples that ruptured and/or disintegrated at temperatures of 80° C. and 90° C. are provided in Table 11B, below.

TABLE 11B

| Sample | Composition: PVOH 88% DH 2.2 dpf × 51 mm (wt %) | PVOH 96% DH 2.2 dpf × 51 mm (wt %) | PVOH 98% DH 1.7 dtex × 38 mm (wt %) | PVOH 98% DH 2.2 dtex × 51 mm (wt %) | PVOH 99.9% DH 1.7 dtex × 38 mm (wt %) | Solubility at 80° C. Time to rupture (s) | Solubility at 80° C. Disintegration (s) | Solubility at 90° C. Time to rupture (s) | Solubility at 90° C. Disintegration (s) |
|---|---|---|---|---|---|---|---|---|---|
| 79 | | | 100 | | | 4.33 | 15.33 | | |
| 81 | | | | 100 | | 7.00 | 33.67 | | |
| 83 | | | | | 100 | | | 9.33 | 36.00 |
| 85 | | | 100 | | | 2.33 | 5.33 | | |
| 86 | | | 100 | | | 3.33 | 7.67 | | |
| 87 | | | 100 | | | 2.67 | 9.00 | | |
| 88 | | | 100 | | | 4.33 | 10.33 | | |
| 89 | | | | | 100 | | | 5.33 | 9.67 |
| 90 | | | | | 100 | | | 7.67 | 15.67 |
| 91 | | | | | 100 | | | 89.67 | 179.50 |
| 92 | | | 50 | 50 | | 2.67 | 21.33 | | |
| 93 | | | 50 | 50 | | 4.67 | 21.00 | | |
| 94 | | | 50 | | 50 | | | 5.33 | 13.33 |
| 91 | | | 50 | | 50 | | | 23.33 | 74.00 |
| 96 | | | | 50 | 50 | | | 4.33 | 10.33 |
| 97 | | | | 50 | 50 | | | 13.67 | 41.00 |
| 98 | | | 25 | 75 | | 1.67 | 5.00 | | |
| 99 | | | 25 | 75 | | 2.33 | 9.33 | | |
| 100 | | | 75 | 25 | | 2.00 | 4.33 | | |
| 101 | | | 75 | 25 | | 3.33 | 6.67 | | |
| 102 | | | 25 | | 75 | | | 3.00 | 6.33 |
| 103 | | | 25 | | 75 | | | 7.00 | 16.67 |
| 104 | | | 75 | | 25 | | | 3.00 | 6.67 |
| 105 | | | 75 | | 25 | | | 5.33 | 21.33 |
| 106 | | | | 25 | 75 | | | 2.00 | 5.33 |
| 107 | | | | 25 | 75 | | | 16.33 | 64.00 |
| 109 | | | | 75 | 25 | | | 17.00 | 49.33 |
| 118 | 50 | | 50 | | | 4.33 | 13.67 | | |
| 119 | 50 | | 50 | | | 10.33 | 32.00 | | |
| 120 | | 25 | 75 | | | 2.67 | 6.00 | | |
| 121 | | 25 | 75 | | | 3.00 | 5.33 | | |
| 122 | | 75 | 25 | | | 3.00 | 5.33 | | |
| 124 | | 75 | 25 | | | 3.33 | 7.67 | | |
| 125 | | 50 | 50 | | | 5.00 | 10.00 | | |
| 126 | | 25 | | | 75 | | | 3.33 | 9.33 |
| 127 | | 25 | | | 75 | | | 7.33 | 21.67 |
| 128 | | 75 | | | 25 | | | 3.00 | 7.00 |

TABLE 11B-continued

| Sample | Composition: PVOH 88% DH 2.2 dpf × 51 mm (wt %) | PVOH 96% DH 2.2 dpf × 51 mm (wt %) | PVOH 98% DH 1.7 dtex × 38 mm (wt %) | PVOH 98% DH 2.2 dtex × 51 mm (wt %) | PVOH 99.9% DH 1.7 dtex × 38 mm (wt %) | Solubility at 80° C. Time to rupture (s) | Solubility at 80° C. Disintegration (s) | Solubility at 90° C. Time to rupture (s) | Solubility at 90° C. Disintegration (s) |
|---|---|---|---|---|---|---|---|---|---|
| 129 | | 75 | | | 25 | | | 6.67 | 18.33 |
| 130 | | 50 | | | 50 | | | 7.67 | 18.33 |
| 131 | | 50 | | | 50 | | | 15.00 | 42.33 |
| 132 | 25 | | | | 75 | | | 3.33 | 8.33 |
| 133 | 25 | | | | 75 | | | 18.33 | 54.67 |
| 134 | 75 | | | | 25 | | | 4.33 | 13.00 |
| 135 | 75 | | | | 25 | | | 11.67 | 39.00 |
| 136 | 50 | | | | 50 | | | 8.00 | 21.67 |
| 137 | 50 | | | | 50 | | | 93.33 | 168.50 |

Thus, Example 11 shows hot water soluble nonwoven webs of the disclosure including a blend of fibers including a first fiber comprising a water-soluble polyvinyl alcohol fiber forming material and a second fiber comprising a water-soluble polyvinyl alcohol fiber forming material.

Example 12: Multilayer Nonwoven Webs Having Different Fiber Chemistries

Multiple-layer nonwoven webs were prepared from various water-soluble fibers as described in Table 12A, below. In particular, each nonwoven web included two layers, each layer included a single fiber type, the single fiber type including a single fiber forming material. Briefly, water-soluble staple fibers were carded and two carded webs were overlaid and calendar bonded. Some samples were needle punched after overlaying the two carded webs and prior to calendaring, as described in Table 12A. Calendar bonding was performed using emboss rolls under the conditions described in Table 12A. Samples 156-159 were single layer nonwoven webs including a blend of fiber types, with the amount of each fiber type identified in Table 12A.

TABLE 12A

| Label | Composition: PVOH 88% DH 2.2 dpf × 51 mm (GSM) | PVOH 96% DH 2.2 dpf × 51 mm (GSM) | PVOH 98% DH 1.7 dtex × 38 mm (GSM) | PVOH 99.9% DH 1.7 dtex × 38 mm (GSM) | Needled first | Calendar Bonding Calendar Temperature (° C.), Speed (FPM), Pressure (PSI) | Basis Weight (Total) (GSM) |
|---|---|---|---|---|---|---|---|
| 144 | 50 | | 50 | | yes | 150 C., 2 fpm, 40 PSI | 100 |
| 145 | 50 | | 50 | | no | 150 C., 2 fpm, 40 PSI | 100 |
| 146 | 30 | | 30 | | yes | 150 C., 2 fpm, 40 PSI | 60 |
| 147 | 30 | | 30 | | no | 150 C., 2 fpm, 40 PSI | 60 |
| 148 | | 30 | 30 | | yes | 150 C., 2 fpm, 40 PSI | 60 |
| 149 | | 30 | 30 | | no | 150 C., 2 fpm, 40 PSI | 60 |
| 150 | 30 | | | 30 | yes | 150 C., 2 fpm, 40 PSI | 60 |
| 151 | 30 | | | 30 | no | 150 C., 2 fpm, 40 PSI | 60 |
| 152 | | 30 | | 30 | yes | 150 C., 2 fpm, 40 PSI | 60 |
| 153 | | 30 | | 30 | no | 150 C., 2 fpm, 40 PSI | 60 |
| 154 | 30 | 30 | | | yes | 150 C., 2 fpm, 40 PSI | 60 |
| 155 | 30 | 30 | | | no | 150 C., 2 fpm, 40 PSI | 60 |
| 156 | 80 (wt %) | | 20 (wt %) | | no | 150 C., 2 fpm, 40 PSI | 50 |
| 157 | | 80 (wt %) | 20 (wt %) | | no | 150 C., 2 fpm, 40 PSI | 50 |
| 158 | 90 (wt %) | | 10 (wt %) | | no | 150 C., 2 fpm, 40 PSI | 50 |
| 159 | | 90 (wt %) | 10 (wt %) | | no | 150 C., 2 fpm, 40 PSI | 50 |

The multilayer nonwoven webs were tested for solubility at 23° C. and 40° C. The thinning times were determined according to MSTM-205 and provided in the Table 12B, below.

TABLE 12B

| Label | PVOH 88% DH 2.2 dpf × 51 mm (GSM) | PVOH 96% DH 2.2 dpf × 51 mm (GSM) | PVOH 98% DH 1.7 dtex × 38 mm (GSM) | PVOH 99.9% DH 1.7 dtex × 38 mm (GSM) | Total Basis weight (GSM) | Thinning (s) at 40° C. |
|---|---|---|---|---|---|---|
| 144 | 50 | | 50 | | 100 | 133.67 |
| 145 | 50 | | 50 | | 100 | 98.00 |
| 146 | 30 | | 30 | | 60 | 46.33 |
| 147 | 30 | | 30 | | 60 | 29.67 |
| 148 | | 30 | 30 | | 60 | 44.33 |
| 149 | | 30 | 30 | | 60 | 73.67 |
| 150 | 30 | | | 30 | 60 | 63.33 |
| 151 | 30 | | | 30 | 60 | 94.67 |
| 152 | | 30 | | 30 | 60 | 140.33 |
| 153 | | 30 | | 30 | 60 | 133.67 |
| 154 | 30 | 30 | | | 60 | 7.00 |

TABLE 12B-continued

| Label | PVOH 88% DH 2.2 dpf × 51 mm (GSM) | PVOH 96% DH 2.2 dpf × 51 mm (GSM) | PVOH 98% DH 1.7 dtex × 38 mm (GSM) | PVOH 99.9% DH 1.7 dtex × 38 mm (GSM) | Total Basis weight (GSM) | Thinning (s) at 40° C. |
|---|---|---|---|---|---|---|
| 155 | 30 | 30 | | | 60 | 6.00 |
| 156 | 80 (wt %) | | 20 (wt %) | | 50 | 7.33 |
| 157 | | 80 (wt %) | 20 (wt %) | | 50 | 18.33 |
| 158 | 90 (wt %) | | 10 (wt %) | | 50 | 5.33 |
| 159 | | 90 (wt %) | 10 (wt %) | | 50 | 10.00 |

Thus, Example 12 shows that for multilayered nonwoven webs of the disclosure having the same fiber chemistry and bonding conditions, as the total basis weight of the multilayered nonwoven decreases, the thinning time generally decreases (compare Samples 144 and 146 and Samples 145 and 147). Example 12 further shows that for multilayered nonwoven webs of the disclosure having the same total basis weight and bonding conditions, as the fiber solubility of one layer decreases, the thinning time generally increases (compare Samples 146 and 150, Samples 147 and 151, Samples 148 and 152, and Samples 149 and 153). Example 12 further shows that for single layer nonwoven webs including a blend of fibers and similar basis weights, the thinning time generally increases as the overall fiber solubility decreases (compare Samples 156 and 157, and Samples 158 and 159; compare also, Samples 159 and 157, and Samples 158 and 156).

Example 13: Flushability

Various nonwoven webs prepared in the previous examples were tested for flushability using the Flushability Test described herein. Two commercially available flushable nonwoven wipes were also tested according to the Flushability Test. The commercially available flushable nonwoven wipes meet the INDA/EDANA requirements for flushability. Thus, percent degradation of the commercially available flushable wipes using the Flushability Test was considered the threshold for a nonwoven web of the disclosure to be considered flushable, as these nonwoven webs would also be expected to meet the INDA/EDANA standards for flushability, as the INDA/EDNA standards are less stringent than the Flushability Test. Nonwoven webs of the disclosure that meet or exceed the percent degradation determined for Commercial Wipe A are indicated in Table 13 with a “(+)”. Nonwoven webs of the disclosure that had a percent degradation of at least twice that of Commercial Wipe A are indicated in Table 13 with a “(++)”.

TABLE 13

| Sample | Flushability Performance |
|---|---|
| Commercial Wipe A | 20% degradation |
| Commercial Wipe B | 24% degradation |
| Sample 52 | (++) |
| Sample 53 | (++) |
| Sample 79 | (++) |
| Sample 83 | (+) |
| Sample 70 | (++) |
| Sample 54 | (++) |
| Sample 57 | (++) |
| Sample 60 | (++) |
| Sample 119 | (++) |
| Sample 136 | (++) |
| Sample 124 | (++) |

Thus, Example 13 shows that nonwoven webs of the disclosure meet or exceed the flushability demonstrated by commercially available flushable wipes. In particular, Example 13 shows that single layer nonwoven webs of the disclosure including a sole fiber type having a sole fiber forming material, single layer nonwoven webs of the disclosure including a blend of fiber types, each fiber type having a single fiber forming material, and multilayer nonwoven webs of the disclosure wherein each layer includes a sole fiber type including a sole fiber forming material all meet or exceed the flushability demonstrated by the commercially available flushable nonwoven wipes. Example 13 further shows that for most nonwoven webs of the disclosure, the flushability was significantly improved over the commercially available options, demonstrating at least twice the degradation of the commercially available samples.

Example 14: Preparation of Pouches and Sealed Articles

Pouches and sealed articles were prepared as follows. A four-sided nonwoven web according to Sample 21 was folded in half on itself and two of the non-fold sides were heat sealed at a temperature of 175° C. to provide a pouch having an opening and an interior pouch volume. A powder composition was provided through the opening, into the interior pouch volume. The opening was heat sealed at a temperature of 175° C. to provide a sealed article.

Two four-sided nonwoven webs according to Sample 21 were overlaid and folded in half such that the resulting article has a fold side and three non-fold sides. Two of the non-fold sides were heat sealed at a temperature of 175° C. to provide a pouch having an opening and an interior pouch volume. A powder composition was provided through the opening and into the interior pouch volume. The opening was heat sealed at a temperature of 175° C. to provide a sealed article comprising a laminate of two nonwoven webs.

A four-sided nonwoven webs according to Sample 21 was overlaid with a water-soluble film and folded in half such that the resulting article has a fold side and three non-fold sides, with the water-soluble film in the interior. Two of the non-fold sides were heat sealed at a temperature of 175° C. to provide a pouch having an opening and an interior pouch volume defined by the water-soluble film. A liquid and/or powder composition was provided through the opening and into the interior pouch volume. The opening was heat sealed at a temperature of 175° C. to provide a sealed article comprising a laminate of a nonwoven web and a water-soluble film.

Pouches and sealed products including a laminate of a nonwoven web and a water soluble film as follows. The nonwoven webs used were according to Sample 21. Four different polyvinyl alcohol water-soluble films were used to prepare four different pouches. The water-soluble film that is provided in the walls of the pouch is the same as that provided in the top seal. The nonwoven web was overlaid on a thermoforming cavity and the water-soluble film was overlaid on the nonwoven web. Vacuum pressure at 400 mbar and heat at 120° C. was applied to draw the nonwoven web and water-soluble film into the cavity. The cavity was then filled with a liquid and/or a solid composition. A second water-soluble film was overlaid on top of the filled cavity and a second nonwoven web according to Sample 21 was overlaid on the water-soluble film. The cavity was then heat sealed at a temperature of 175° C. to form a sealed article comprising a laminate of a nonwoven web and a water-soluble film.

The release of the contents of the thermoformed sealed articles was determined according to the Liquid Release Test described herein and compared to the release of the same contents from a thermoformed pouch prepared only from the water-soluble film. The results are shown in Table 14.

TABLE 14

| | Release Time (s) Laminate Pouch | Release Time (s) Film Pouch |
|---|---|---|
| Thermoform 1 | 167 | 96 |
| Thermoform 2 | 196.67 | 200 |
| Thermoform 3 | 108 | 30 |
| Thermoform 4 | 158.33 | 130 |

Thus, Example 14 shows the preparation of pouches and sealed articles of the disclosure using nonwoven webs of the disclosure. Example 14 further shows that sealed articles prepared from laminates of the disclosure including nonwoven webs and water-soluble films, when submerged in water maintain the contents of the pouch for longer time periods, relative to sealed articles prepared only from the water-soluble film, advantageously providing a delayed release profile relative to articles prepared only from water-soluble films.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of conflict between the present disclosure and incorporated patents, publications and references, the present disclosure should control.

What is claimed:

1. A water-dispersible nonwoven web, the water-dispersible nonwoven web comprising a plurality of fibers, wherein the plurality of fibers comprise a first fiber comprising a blend of fiber forming materials comprising a first polyvinyl alcohol fiber forming material and a second polyvinyl alcohol fiber forming material;

wherein the blend of fiber forming materials does not include carboxymethyl cellulose, hydroxypropyl methylcellulose, or starch, wherein the first polyvinyl alcohol fiber forming material comprises a polyvinyl alcohol homopolymer and the first polyvinyl alcohol fiber forming material has a degree of hydrolysis in a range of about 88% to about 92%, wherein the second polyvinyl alcohol fiber forming material comprises a polyvinyl alcohol copolymer and the second polyvinyl alcohol fiber forming material has a degree of hydrolysis in a range of about 88% to about 99.9%, and wherein the polyvinyl alcohol copolymer has a degree of modification in a range of about 1 mol. % to about 10 mol. %, wherein the polyvinyl alcohol copolymer is an anionic modified polyvinyl alcohol copolymer, wherein the anionic modified polyvinyl alcohol copolymer is present in the blend in a range of about 30 wt % to about 85 wt %, and wherein the water-dispersible nonwoven web is water-dispersible at temperatures under 50° C.

2. The water-dispersible nonwoven web of claim 1, wherein the polyvinyl alcohol homopolymer comprises about 15 wt % to about 70 wt %, based on a total weight of the first polyvinyl alcohol fiber forming material and the second polyvinyl alcohol fiber forming material and the copolymer comprises a balance of the first polyvinyl alcohol fiber forming polyvinyl alcohol fiber forming materials and the second polyvinyl alcohol fiber forming material.

3. The water-dispersible nonwoven web of claim 1, wherein the plurality of fibers comprises:

the first fiber; and a second fiber, wherein the first fiber and the second fiber have a difference in one or more of the following: a length to distance (LID) ratio, a tenacity, a shape, a rigidness, an elasticity, a solubility in water, a melting point, a glass transition temperature ($T_g$), a fiber chemistry, a color, or a combination thereof.

4. The water-dispersible nonwoven web of claim 1, wherein the plurality of fibers comprises a plurality of water-insoluble fibers.

5. The water-dispersible nonwoven web of claim 4, wherein the plurality of water-insoluble fibers comprise about 20% to about 80% by weight of a total weight of the plurality of fibers.

6. The water-dispersible nonwoven web of claim 4, wherein the plurality of water-insoluble fibers comprise one or more of the following: cotton, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, polyester, copolyester, viscose, polylactide, polyethylene terephthalate, polypropylene or a combination thereof.

7. The water-dispersible nonwoven web of claim 1, wherein the nonwoven web is biodegradable.

8. The water-dispersible nonwoven web of claim 1, wherein the fiber has a tenacity in a range of about 3 cN/dtex to about 10 cN/dtex.

9. The water-dispersible nonwoven web of claim 8, wherein the first fiber has a tenacity in a range of about 4 cN/dtex to about 8 cN/dtex.

10. The water-dispersible nonwoven web of claim 1, wherein the first fiber further comprises a plasticizer.

11. The water-dispersible nonwoven web of claim 1, further comprising an active agent.

12. The water-dispersible nonwoven web of claim 11, wherein the active agent is provided as one or more of the following: a part of the plurality of fibers, dispersed within the nonwoven web, provided on a face of the nonwoven web, or a combination thereof.

13. The water-dispersible nonwoven web of claim 11, wherein the active agent is selected from one or more of the following: an enzyme, oil, flavor, colorant, odor absorber, fragrance, pesticide, fertilizer, activator, acid catalyst, metal catalyst, ion scavenger, detergent, disinfectant, surfactant, bleach, bleach component, fabric softener, or a combination thereof.

14. The water-dispersible nonwoven web of claim 1, wherein the first fiber has a diameter in a range of about 10 microns to about 300 microns.

15. The water-dispersible nonwoven web of claim 1, wherein the plurality of fibers comprising the first fiber have diameters that are substantially uniform.

16. The water-dispersible nonwoven web of claim 1, wherein the plurality of fibers comprising the first fiber have a length in a range of about 30 millimeters (mm) to about 100 mm.

17. The water-dispersible nonwoven web of claim 1, wherein the plurality of fibers comprising the first fiber have a length of less than about 30 mm, or in a range of about 0.25 mm to less than 30 mm.

18. The water-dispersible nonwoven web of claim 1, wherein the plurality of fibers comprising the first fiber have a length to diameter (LID) ratio of about 0.5 to 15.

19. The water-dispersible nonwoven web of claim 1, wherein the nonwoven web is porous.

20. The water-dispersible nonwoven web of claim 1, wherein the nonwoven web is nonporous.

21. The water-dispersible nonwoven web of claim 1, wherein the nonwoven web is colored, dyed, pigmented, or a combination thereof.

22. The water-dispersible nonwoven web of claim 1, wherein the nonwoven web has a basis weight of about 1 $g/m^2$ to about 100 $g/m^2$.

23. The water-dispersible nonwoven web of claim 1, wherein at a given temperature, the nonwoven web dissolves at least about 5 times faster than a film prepared from the same polymer as the first fiber of the nonwoven web.

24. The water-dispersible nonwoven web of claim 1, wherein the nonwoven web is flushable.

25. A multilayer water-dispersible nonwoven web comprising a first water-dispersible nonwoven web according to claim 1.

26. The multilayer water-dispersible nonwoven web of claim 25, further comprising a second water-dispersible nonwoven web according claim 1.

27. The multilayer water-dispersible nonwoven web of claim 26, wherein the first water-dispersible nonwoven web and the second water-dispersible nonwoven web comprise the same fibers and have the same basis weight.

28. The multilayer water-dispersible nonwoven web of claim 26, wherein the first water-dispersible nonwoven web and the second water-dispersible nonwoven web comprise different fibers and have the same basis weight.

29. The multilayer water-dispersible nonwoven web of claim 26, wherein the first water-dispersible nonwoven web and the second water-dispersible nonwoven web comprise different fibers and have different basis weights.

30. The multilayer water-dispersible nonwoven web of claim 26, wherein the first water-dispersible nonwoven web and the second water-dispersible nonwoven web are laminated to each other.

31. The multilayer water-dispersible nonwoven web of claim 25, further comprising a film laminated to the first water-dispersible nonwoven web.

32. The multilayer water-dispersible nonwoven web of claim 31, wherein the plurality of fibers of the first water-dispersible nonwoven web and the film comprise the same water-soluble polymer.

33. The multilayer water-dispersible nonwoven web of claim 31, wherein the plurality of fibers of the first water-dispersible nonwoven web and the film comprise different polymers.

34. The multilayer water-dispersible nonwoven web of claim 25, the multilayer water-dispersible nonwoven web has a basis weight of about 1 $g/m^2$ to about 100 $g/m^2$.

35. The multilayer water-dispersible nonwoven web of claim 25, the multilayer water-dispersible nonwoven web is porous.

36. The multilayer water-dispersible nonwoven web of claim 25, wherein the multilayer water-dispersible nonwoven web is nonporous.

37. The multilayer water-dispersible nonwoven web of claim 25, wherein the multilayer water-dispersible nonwoven web is flushable.

38. The multilayer water-dispersible nonwoven web of claim 25, wherein the multilayer water-dispersible nonwoven web is water-dispersible.

39. A pouch comprising the water-dispersible nonwoven web according to claim 1, the pouch defining an interior pouch volume.

40. A pouch comprising a multilayer water-dispersible nonwoven web according to claim 25, the pouch defining an interior pouch volume.

41. The pouch of claim 40, wherein the multilayer water-dispersible nonwoven web comprises the first water-dispersible nonwoven web a water-soluble film, and the water-soluble film forms an inner surface of the pouch.

42. The pouch of claim 40, wherein the pouch is flushable.

* * * * *